(12) United States Patent  
Yamamoto et al.

(10) Patent No.: US 10,663,719 B2  
(45) Date of Patent: May 26, 2020

(54) OPTICAL SCANNING DEVICE AND IMAGE FORMING DEVICE PROVIDED WITH OPTICAL SCANNING DEVICE

(71) Applicant: SHARP KABUSHIKI KAISHA, Sakai, Osaka (JP)

(72) Inventors: Hiroshi Yamamoto, Sakai (JP); Atsushi Ueda, Sakai (JP); Takayuki Ohno, Sakai (JP); Atsuo Nakao, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/300,545

(22) PCT Filed: Apr. 14, 2017

(86) PCT No.: PCT/JP2017/015342  
§ 371 (c)(1),  
(2) Date: Nov. 9, 2018

(87) PCT Pub. No.: WO2017/195530  
PCT Pub. Date: Nov. 16, 2017

(65) Prior Publication Data  
US 2019/0212548 A1 Jul. 11, 2019

(30) Foreign Application Priority Data

May 10, 2016 (JP) .................................. 2016-094619  
Mar. 23, 2017 (JP) .................................. 2017-058139

(51) Int. Cl.  
*G02B 26/12* (2006.01)  
*G03G 15/01* (2006.01)  
(Continued)

(52) U.S. Cl.  
CPC ......... *G02B 26/123* (2013.01); *G02B 26/121* (2013.01); *G03G 15/011* (2013.01);  
(Continued)

(58) Field of Classification Search  
CPC ........... G03G 15/04072; G03G 15/043; G02B 26/121; G02B 26/123  
See application file for complete search history.

(56) References Cited

U.S. PATENT DOCUMENTS 6,278,471 B1 * 8/2001 Uchiyama ................ B41J 2/473  
  347/138  
2009/0115833 A1 * 5/2009 Soulliaert ................. B41J 2/45  
  347/238

(Continued)

FOREIGN PATENT DOCUMENTS

JP  S63-195340 U  12/1988  
JP  2005-084449 A  3/2005  
JP  2013-020142 A  1/2013

OTHER PUBLICATIONS

Machine Translation of JP 2005-084449 A, obtained on Sep. 20, 2019 (Year: 2005).*

*Primary Examiner* — Gregory H Curran  
(74) *Attorney, Agent, or Firm* — ScienBiziP, P.C.

(57) ABSTRACT

An optical scanning device provided with a casing, a plurality of light sources, a deflection scanning unit that deflects and scans light beams from the plurality of light sources onto a plurality of bodies to be scanned, and a plurality of optical units arranged between the deflection scanning unit and the bodies to be scanned, in which optical unit supporting members that support the optical units are provided, the optical unit supporting members support the plurality of optical units arranged at predetermined intervals, and a (Continued)

thermal expansion coefficient of the optical unit supporting members is lower than a thermal expansion coefficient of the casing.

19 Claims, 29 Drawing Sheets

(51) Int. Cl.
  *G03G 15/043* (2006.01)
  *G03G 15/04* (2006.01)
  *G03G 21/16* (2006.01)
(52) U.S. Cl.
  CPC ..... *G03G 15/043* (2013.01); *G03G 15/04072* (2013.01); *G03G 21/1619* (2013.01); *G03G 21/1666* (2013.01); *G03G 21/1685* (2013.01); *G03G 2221/1654* (2013.01)

(56) References Cited

U.S. PATENT DOCUMENTS

| | | |
|---|---|---|
| 2013/0016169 A1 | 1/2013 | Ohtoshi et al. |
| 2013/0070041 A1 | 3/2013 | Hudson et al. |
| 2014/0185118 A1 | 7/2014 | Hudson et al. |
| 2016/0187804 A1 | 6/2016 | Hudson et al. |

* cited by examiner

AMOUNT OF COLOR DEVIATION (μm/deg.) FOR EACH COLOR OF CYAN (Cy), MAGENTA (Mg), AND YELLOW (Ye) IN THE SUB-SCANNING DIRECTION Y OF AN OPTICAL SCANNING DEVICE OF THE PRIOR ART AMOUNT OF COLOR DEVIATION ($\mu$m/deg.) FOR EACH COLOR OF CYAN (Cy), MAGENTA (Mg), AND YELLOW (Ye) IN THE SUB-SCANNING DIRECTION Y OF AN OPTICAL SCANNING DEVICE OF EMBODIMENT 1

OPTICAL SCANNING DEVICE AND IMAGE FORMING DEVICE PROVIDED WITH OPTICAL SCANNING DEVICE

TECHNICAL FIELD

This invention relates to an optical scanning device that forms electrostatic latent images with the surfaces of photoreceptor drums in a charged state being irradiated with laser light that corresponds to image information composed of digital signals, and an image forming device provided with the optical scanning device, in an image forming device such as a printer, a copying machine, or a facsimile.

BACKGROUND ART

Conventionally, in an image forming device, an image is formed with images of a plurality of colors being superposed by an optical scanning device (laser scanning unit: LSU), and therefore a problem that is referred to as color deviation sometimes occurs.

For example, image forming devices having configurations such as the following are known. A light beam such as a laser is scanned on the surfaces of a plurality of latent image carriers (also referred to as drum-shaped photoreceptor units or photoreceptor drums, for example) that correspond to each color of yellow, magenta, and cyan, and respective latent images are thereby written to each latent image carrier. Those latent images are then developed for images of each color to be formed on each latent image carrier, the images of each color are transferred from each latent image carrier to an image carrier (transfer belt), and the images of each color are superposed and formed on the image carrier. In addition, the images of each color are transferred from the image carrier to a printing sheet for an image to be formed on the printing sheet. In an image forming device of this kind of configuration, the images of each color sometimes deviate when transferred from each latent image carrier to the image carrier, color deviation occurs, and image quality deteriorates.

In particular, when an image forming device is being driven, the temperature inside the casing of the image forming device rises, the casing of the optical scanning device thermally expands, and as a result the positions of optical components such as Fθ second lenses fluctuate and color deviation sometimes occurs.

To prevent this kind of color deviation caused by thermal expansion, conventionally, a method is known in which a temperature sensor such as a thermistor is provided inside the optical scanning device, and color deviation is corrected according to the temperature inside and peripheral to the optical scanning device (see PTL 1, for example).

According to this method, the positions of the images of each color are corrected by controlling the latent image writing timing with reference to a table indicating characteristics of the color deviation amounts for each color for the image carrier with respect to temperature changes in the temperature inside and peripheral to the optical scanning device.

CITATION LIST

Patent Literature

PTL 1: Japanese Unexamined Patent Application Publication No. 2013-20142

SUMMARY OF INVENTION

Technical Problem

However, there is a problem in that as the casing of the optical scanning device becomes larger, the amount of color deviation caused by thermal expansion also increases, and the precision of the color deviation correction consequently decreases.

Meanwhile, a method is also known in which thermal expansion of the casing is reduced by using a material having a low thermal expansion coefficient as the material for the casing of the optical scanning device. However, a material having a low thermal expansion coefficient is expensive compared to an ordinary material, and therefore is there is a problem in that manufacturing costs increase.

This invention has been devised in light of such problems, and a purpose thereof is to provide an optical scanning device that reduces the amount of color deviation caused by thermal expansion of a casing, even in a case where a material having a high thermal expansion coefficient is used.

Solution to Problem

This invention provides an optical scanning device provided with a casing, a plurality of light sources, a deflection scanning unit that deflects and scans light beams from the plurality of light sources onto a plurality of bodies to be scanned, and a plurality of optical units arranged between the deflection scanning unit and the bodies to be scanned, in which optical unit supporting members that support the optical units are provided, the optical unit supporting members support the plurality of optical units arranged at predetermined intervals, and a thermal expansion coefficient of the optical unit supporting members is lower than a thermal expansion coefficient of the casing. Furthermore, this invention provides an image forming device provided with the optical scanning device.

Advantageous Effects of Invention

This invention is able to realize an optical scanning device that reduces the amount of color deviation caused by thermal expansion of a casing, even in a case where a material having a high thermal expansion coefficient is used for the casing.

Figure 1A:
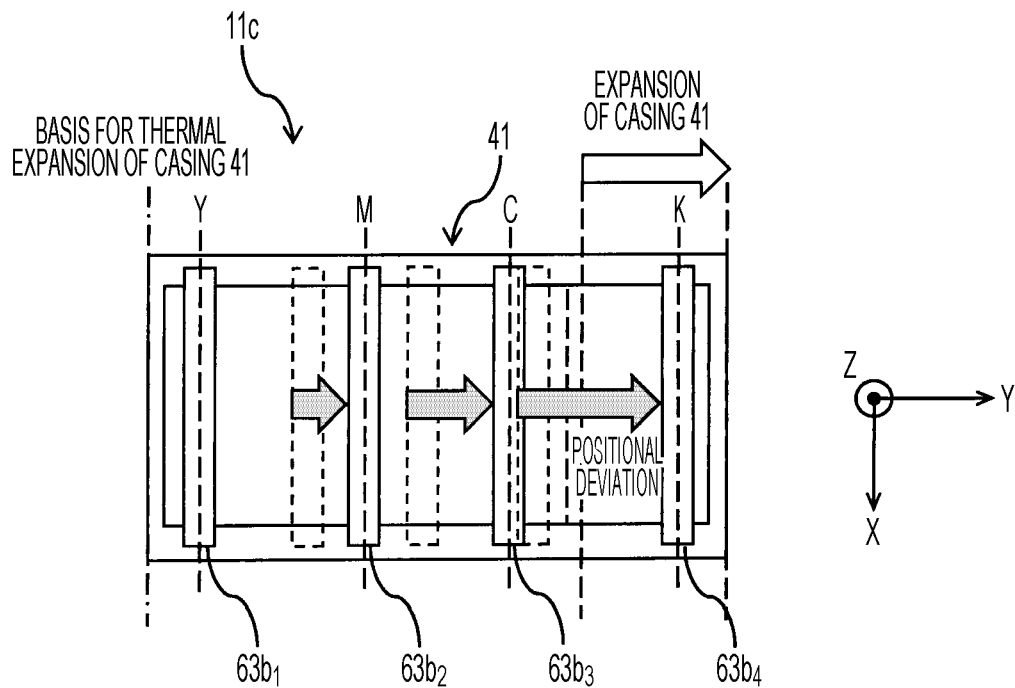
FIG. 1(A) is an explanatory diagram depicting a deviation in the positions of Fθ second lenses caused by thermal expansion of a casing of a conventional optical scanning device.

DESCRIPTION OF EMBODIMENTS (1) An optical scanning device of this invention is provided with a casing, a plurality of light sources, a deflection scanning unit that deflects and scans light beams from the plurality of light sources onto a plurality of bodies to be scanned, and a plurality of optical units arranged between the deflection scanning unit and the bodies to be scanned, in which an optical unit supporting member that supports the optical units is provided, the optical unit supporting member supports the plurality of optical units arranged at predetermined intervals, and a thermal expansion coefficient of the optical unit supporting member is lower than a thermal expansion coefficient of the casing.

Furthermore, the optical scanning device of this invention is an image forming device that is provided with the optical scanning device.

In this invention, the "optical scanning device" is a device that forms electrostatic latent images with the surfaces of photoreceptor drums in a charged state being irradiated with laser light that corresponds to image information composed of digital signals, in an image forming device such as a copying machine or a facsimile.

The "thermal expansion coefficient" is a proportion by which the volume of the casing or a lens supporting unit thermally expands due to a temperature increase. Furthermore, a linear expansion coefficient (proportion by which a length changes) in a sub-scanning direction may be used instead of the thermal expansion coefficient.

The "plurality of light sources" of this invention are light sources corresponding to yellow (Y), magenta (M), cyan (C), and black (K), for example, and are realized by a first semiconductor laser 44a, a second semiconductor laser 44b, a third semiconductor laser 44c, and a fourth semiconductor laser 44d.

Furthermore, the "bodies to be scanned" of this invention are realized by photoreceptor drums 13Y, 13M, 13C, and 13K.

Furthermore, the "deflection scanning unit" of this invention is realized by a polygon mirror 42 and a polygon motor 43 or the like.

Furthermore, the "optical units" of this invention are realized by Fθ second lenses $63b_1$ to $63b_4$ and Fθ second lens holding units $65b_1$ to $65b_4$ or the like.

Furthermore, the "optical unit supporting member" of this invention is realized by Fθ second lens supporting units 71 and 72.

Furthermore, the "image forming device" of this invention is a device that forms and outputs an image, such as a copying machine that has a copying function like a printer, or an MFP (multifunction peripheral) that includes functions other than copying.

Furthermore, the optical scanning device of this invention may have the configurations described hereinafter, or these may be combined as appropriate.

(2) The optical unit supporting member may support the plurality of optical units at both end sections thereof in a first direction in which the light beams scan the bodies to be scanned.

Thus, by means of a low cost and simple structure, it is possible to realize an optical scanning device that reduces the effect of elongation from thermal expansion of the casing without obstructing the paths of the light beams.

The "first direction in which the light beams scan the bodies to be scanned" is a direction in which the light beams scan the photoreceptor drums, and corresponds to a main scanning direction X in the embodiments of this invention.

(3) The casing may displace relative to the optical unit supporting member.

Thus, by providing the optical unit supporting member in the casing in such a way that the casing displaces relative to the optical unit supporting member, it is possible to realize an optical scanning device that reduces the amount of color deviation caused by thermal expansion of the casing.

(4) There may be further provided: a fixing unit that fixes a predetermined first portion of the optical unit supporting member to the casing; and an engaging unit that engages a predetermined second portion of the optical unit supporting member to the casing in such a way that displacement is possible relative to a second direction in which the plurality of optical units are arranged.

Thus, by providing a fixing unit that fixes the optical unit supporting member to the casing, and an engaging unit that engages the optical unit supporting member to the casing in such a way that displacement is possible relative to the direction in which the plurality of optical units are arranged, it is possible to realize an optical scanning device that reduces the amount of color deviation caused by thermal expansion of the casing.

An example of the "second direction in which the plurality of optical units are arranged" is a direction orthogonal to the direction in which the light beams scan the photoreceptor drums (first direction), and corresponds to a sub-scanning direction Y in the embodiments of this invention.

(5) The fixing unit may be provided nearer to the plurality of light sources than the engaging unit.

Thus, by providing the fixing unit nearer to the plurality of light sources than the engaging unit, it is possible to realize an optical scanning device that reduces the amount of color deviation caused by thermal expansion of the casing.

(6) The fixing unit may be configured by inserting a first screw into a first screw hole provided in the casing, via a first insertion section provided in the first portion of the optical unit supporting member.

Thus, by configuring the fixing unit using the first insertion section, the first screw hole, and the screw, it is possible to realize an optical scanning device that reduces the amount of color deviation caused by thermal expansion of the casing.

The "fixing unit" is not restricted to a screw, and, for example, a columnar-shaped boss may be provided on the casing, that boss may be inserted into a hole in sheet metal, and the sheet metal may be prevented from separating by means of an E-ring.

(7) The engaging unit may be configured by inserting a second screw into a second screw hole provided in the casing, via a second insertion section provided in the second portion of the optical unit supporting member, and the second screw may have a spring that presses the second portion of the optical unit supporting member when the second screw is inserted into the second screw hole via the second insertion section.

Thus, by configuring the engaging unit using the second insertion section, the second screw hole, and a spring or a hook, it is possible to realize an optical scanning device that reduces the amount of color deviation caused by thermal expansion of the casing.

(8) The engaging unit may have a hook that engages with the casing, via the second insertion section provided in the second portion of the optical unit supporting member.

Thus, it is possible to realize an optical scanning device that reduces the amount of color deviation caused by thermal expansion of the casing, by means of a simple configuration.

(9) The second insertion section may have an elongated hole or a notch that extends in the second direction.

Thus, it is possible to realize an optical scanning device that reduces the amount of color deviation caused by thermal expansion of the casing, by means of engagement between the second insertion section having an elongated hole or a notch that extends in the second direction, and the screw or the hook.

(10) The optical units may be composed of a lens and a lens holding member that holds the lens, the optical unit supporting member may have an insertion hole into which a protrusion provided on the casing is inserted, and, when one end in the first direction in which the light beams scan the bodies to be scanned, of the optical units is arranged on the optical unit supporting member, a lower surface of the lens holding member may make contact with a tip end of the protrusion inserted into the insertion hole.

Thus, since the lower surface of the lens holding member makes contact with the tip end of the protrusion inserted into the insertion hole, it is possible to realize an optical scanning device in which the lens holding member can be mounted easily and precisely by adjusting the tip end of the protrusion.

(11) The optical unit supporting member may have mounted thereon an adjustment unit that adjusts a position in the second direction in which the plurality of optical units are arranged, of one end in the first direction in which the light beams scan the bodies to be scanned, of the optical units when the one end of the optical units is arranged on the optical unit supporting member.

Thus, it is possible to realize an optical scanning device in which the optical unit supporting member has mounted thereon an adjustment unit that reduces the effect caused by thermal expansion of the casing.

(12) A driving unit that drives the adjustment unit may be mounted on the optical unit supporting member.

Thus, it is possible to realize an optical scanning device in which the optical unit supporting member has mounted thereon a driving unit that drives the adjustment unit while the effect caused by thermal expansion of the casing is reduced.

The "driving unit that drives the adjustment unit" is a motor, for example. Furthermore, the driving unit may be a manually driven type.

(13) The optical unit supporting member may support the optical units for black, cyan, and magenta, or the optical units for black, cyan, magenta, and yellow, from among the plurality of optical units.

Thus, by supporting the optical units for black, cyan, and magenta, or the optical units for black, cyan, magenta, and yellow, using the optical unit supporting member, it is possible to realize an optical scanning device that reduces the amount of color deviation for black, cyan, and magenta, or for black, cyan, magenta, and yellow, caused by thermal expansion of the casing.

(14) The lens supporting units may be composed of a metal material, and the casing may be composed of a resin material.

Thus, it is possible to realize an optical scanning device that reduces the effect of color deviation caused by thermal expansion of the casing with low cost.

An example of the "metal material" is SECC, and an example of the "resin material" is a PC/ABS alloy.

Hereinafter, this invention will be described in greater detail using the drawings. It should be noted that the description hereinafter is exemplary in all respects, and shall not be construed as restricting this invention.

(Differences with Prior Art)

First, the differences between a conventional optical scanning device 11c and an optical scanning device 11 of this invention will be described based on FIG. 1.

FIG. 1(A) is an explanatory diagram depicting a deviation in the positions of Fθ second lenses $63b_1$, $63b_2$, $63b_3$, and $63b_4$ caused by thermal expansion of a casing 41 of the conventional optical scanning device 11c. Furthermore, FIG. 1(B) is an explanatory diagram depicting a mechanism that suppresses a deviation in the positions of Fθ second lenses $63b_1$, $63b_2$, $63b_3$, and $63b_4$ caused by thermal expansion of a casing 41 of the optical scanning device 11 of this invention.

As depicted in FIG. 1(A), in the conventional optical scanning device 11c, the Fθ second lenses $63b_1$, $63b_2$, $63b_3$, and $63b_4$ are fixed directly to the casing 41.

Thus, in a case where the casing 41 has thermally expanded in the sub-scanning direction Y, based on an end section (basis for thermal expansion) of the casing 41 in the opposite direction to the sub-scanning direction Y (hereinafter, the −Y direction; the same is also true for the X direction and the Z direction), positional deviation occurs in the sub-scanning direction Y for each Fθ second lens $63b_1$, $63b_2$, $63b_3$, and $63b_4$, and color deviation consequently occurs.

Figure 1B:
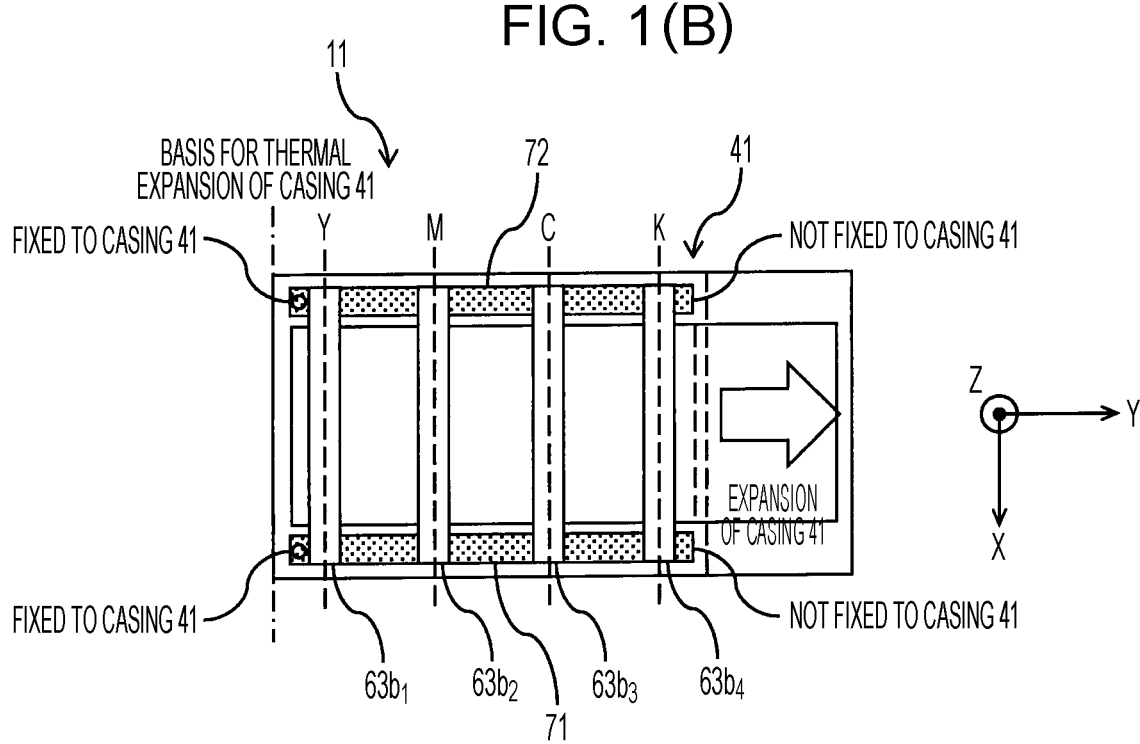
FIG. 1(B) is an explanatory diagram depicting a mechanism that suppresses a deviation in the positions of Fθ second lenses caused by thermal expansion of a casing of an optical scanning device of this invention.

To resolve this kind of problem, in this invention, rather than being provided directly on the casing 41, the Fθ second lenses $63b_1$, $63b_2$, $63b_3$, and $63b_4$ are provided on the casing 41 having arranged therebetween Fθ second lens supporting units 71 and 72 that are composed of a material having a lower thermal (linear) expansion coefficient than the casing 41, as depicted in FIG. 1(B).

At such time, in the Fθ second lens supporting units 71 and 72, only −Y direction end sections 71a and 72a are fixed to the casing 41, and end sections 71b and 72b at the sub-scanning direction Y side are not fixed to the casing 41, so that the Fθ second lens supporting units 71 and 72 are not pulled by the expansion of the casing 41.

By doing so, in the casing 41, the Fθ second lens supporting units 71 and 72 expand independently, and therefore the Fθ second lenses $63b_1$, $63b_2$, $63b_3$, and $63b_4$ provided on the Fθ second lens supporting units 71 and 72 are not affected by the thermal expansion of casing 41, and consequently color deviation caused by thermal expansion of the casing 41 is suppressed.

Embodiment 1

<Configuration of Image Forming Device 100>

Next, a configuration of an image forming device 100 provided with the optical scanning device 11 according to embodiment 1 of this invention will be described based on FIGS. 2 and 3.

Figure 2:
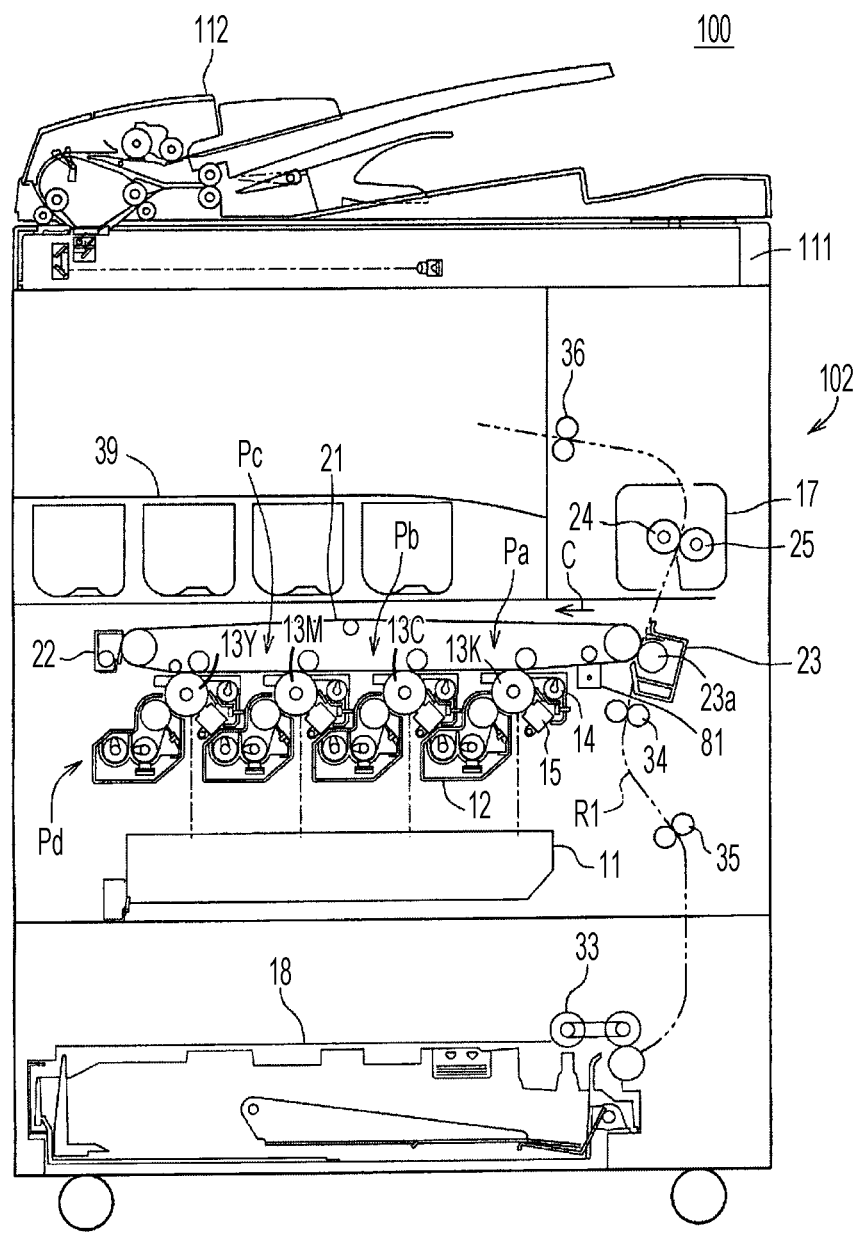
FIG. 2 is a cross-sectional view depicting a schematic configuration of an image forming device provided with an optical scanning device according to embodiment 1 of this invention.

FIG. 2 is a cross-sectional view depicting a schematic configuration of the image forming device 100 provided with the optical scanning device 11 of this invention. Furthermore, FIG. 3 is a block diagram depicting a schematic configuration of a control system of the image forming device 100 depicted in FIG. 2.

<<Configuration of Image Forming Device 100>>

In this image forming device 100, an image that uses each color of black (K), cyan (C), magenta (M), and yellow (Y) is printed on a printing sheet. Alternatively, a monochrome image that uses a single color (black, for example) is printed on a printing sheet. Therefore, four of each of a developing device 12, a photoreceptor drum 13, a drum cleaning device 14, and a charger 15 or the like are provided. These are respectively associated with black, cyan, magenta, and yellow, and four image forming stations Pa, Pb, Pc, and Pd are configured, in order to form four kinds of toner images corresponding to each color.

In any of the image forming stations Pa, Pb, Pc, and Pd, a toner image is formed as follows. The drum cleaning devices 14 remove and recover remaining toner on the surfaces of the photoreceptor drums 13Y, 13M, 13C, and 13K. Thereafter, the surfaces of the photoreceptor drums 13Y, 13M, 13C, and 13K are uniformly charged to a prescribed potential by the chargers 15. The charged surfaces are then exposed by the optical scanning device 11 and electrostatic latent images are formed on the surfaces. Thereafter, the electrostatic latent images are developed by the developing devices 12. Toner images of each color are thereby formed on the surfaces of the photoreceptor drums 13Y, 13M, 13C, and 13K.

Furthermore, an intermediate transfer belt 21 moves in a circular manner in the direction of an arrow C. A belt cleaning device 22 removes and recovers remaining toner on the intermediate transfer belt 21 moving in a circular manner. Then, the toner images of each color on the surfaces of the photoreceptor drums 13Y, 13M, 13C, and 13K are sequentially transferred and superposed on the intermediate transfer belt 21. In this way, toner images of each color are formed on the intermediate transfer belt 21.

A nip area is formed between the intermediate transfer belt 21 and a transfer roller 23a of a secondary transfer device 23. A printing sheet that has been conveyed through an S-shaped sheet conveyance path R1 has the toner images of each color on the surface of the intermediate transfer belt 21 transferred thereto while being sandwiched and conveyed in that nip area. The printing sheet having passed through the nip area is inserted between a heating roller 24 and a pressurizing roller 25 of a fixing device 17 to have heat and pressure applied thereto, and the toner images of each color are fixed on the printing sheet.

The printing sheet is extracted from a feed tray 18 by a pickup roller 33 and conveyed via the sheet conveyance path R1. The printing sheet then passes through the secondary transfer device 23 and the fixing device 17, and is taken out to a discharge tray 39 via a discharge roller 36. A resist roller 34 that momentarily stops the printing sheet and aligns the tip end of the printing sheet is arranged on this sheet conveyance path R1. The resist roller 34, after having momentarily stopped the printing sheet, conveys the printing sheet in accordance with a transfer timing for the toner images in the nip area between the intermediate transfer belt 21 and the transfer roller 23a. Furthermore, a conveying roller 35 or the like that prompts conveying of the printing sheet is arranged on the sheet conveyance path R1.

<<Configuration of Control System>>

Figure 3:
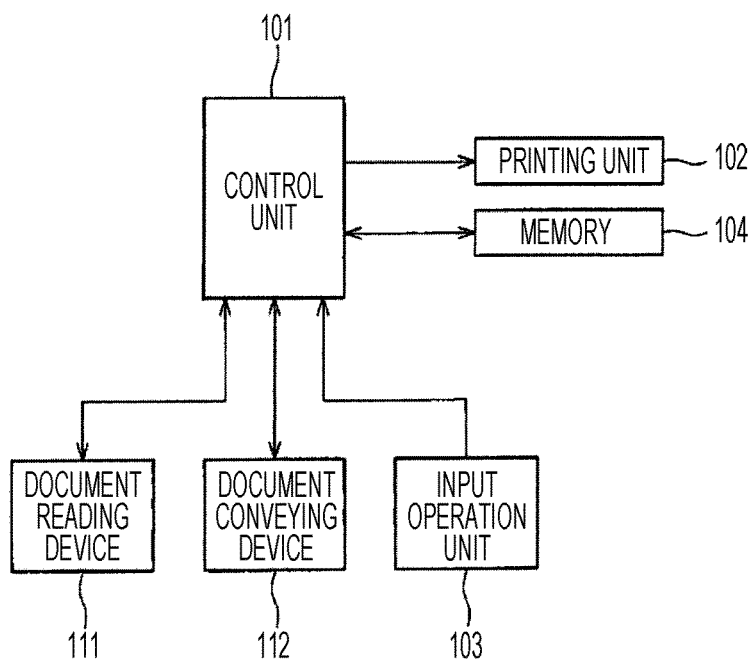
FIG. 3 is a block diagram depicting a schematic configuration of a control system of the image forming device depicted in FIG. 2.

In FIG. 3, a control unit 101 integrally controls the image forming device 100, and is composed of a CPU, a RAM, a ROM, various types of interfaces, and the like.

A printing unit 102 prints a print image on the printing sheet by means of an electrophotographic method. The printing unit 102 is configured including the optical scanning device 11, the developing devices 12, the photoreceptor drums 13Y, 13M, 13C, and 13K, the drum cleaning devices 14, and the chargers 15 in FIG. 2. In addition, the printing unit 102 is configured including the intermediate transfer belt 21, the fixing device 17, the sheet conveyance path R1, the feed tray 18, and the discharge tray 39 or the like.

Furthermore, an input operation unit 103 is composed of a plurality of input keys and a liquid crystal display device, for example.

A memory 104 is a nonvolatile storage means such as a hard disk device (HDD) or a flash memory, for example, and stores various data and programs.

For example, the control unit 101 controls an image reading device 111 and a document conveying device 112 for a document to be conveyed by the document conveying device 112. An image of the document is then read by the image reading device 111, and image data indicating the image of the document is stored in the memory 104. In addition, the printing unit 102 is controlled for the image of the document indicated by the image data within the memory 104 to be printed on a printing sheet by the printing unit 102.

Incidentally, in the image forming stations Pa, Pb, Pc, and Pd, images of the respective colors are formed on the photoreceptor drums 13Y, 13M, 13C, and 13K, and then the images on the photoreceptor drums 13Y, 13M, 13C, and 13K are sequentially transferred in such a way as to be superposed onto the intermediate transfer belt 21. Thus, the transfer positions (image positions) deviate among the images of each color on the intermediate transfer belt 21, color deviation occurs, and the image quality sometimes deteriorates.

A device that reduces this color deviation as follows is conventionally known.

Specifically, the memory 104 has stored therein data of a temperature characteristics table for color deviation amounts obtained by detecting the temperature inside and/or peripheral to the optical scanning device 11 by means of a thermistor and measuring the amount of color deviation for each color of yellow, magenta, cyan, and black in the main scanning direction X (hereinafter, the X direction) and the sub-scanning direction Y (hereinafter, the Y direction) at each temperature.

Next, the control unit 101 causes the thermistor to detect the temperature inside and/or peripheral to the optical scanning device 11, and, on the basis of the detected temperature, corrects the positions of the images of each color formed on the photoreceptor drums 13Y, 13M, 13C, and 13K with reference to the temperature characteristics table for color deviation amounts.

In this way, control is performed in such a way that the images on the photoreceptor drums 13Y, 13M, 13C, and 13K are accurately superposed, transferred, and formed on the intermediate transfer belt 21, and color deviation is prevented.

The correction of image positions on the photoreceptor drums 13Y, 13M, 13C, and 13K is ordinarily carried out by controlling, for example, the timing for writing electrostatic latent images onto the photoreceptor drums 13Y, 13M, 13C, and 13K by means of scanning beams that are emitted from laser diodes of the optical scanning device 11. Furthermore, the Y direction image position is corrected by adjusting the Y direction position of a main scanning line on the photoreceptor drums 13Y, 13M, 13C, and 13K. Furthermore, the X direction image position is corrected by adjusting the length and X direction position of the main scanning line on the photoreceptor drums 13Y, 13M, 13C, and 13K.

<Configuration of Optical Scanning Device 11 and Optical System>

Next, a detailed configuration of the optical scanning device 11 of the image forming device 100 according to the first embodiment of this invention will be described based on FIGS. 4 to 6.

Figure 4:
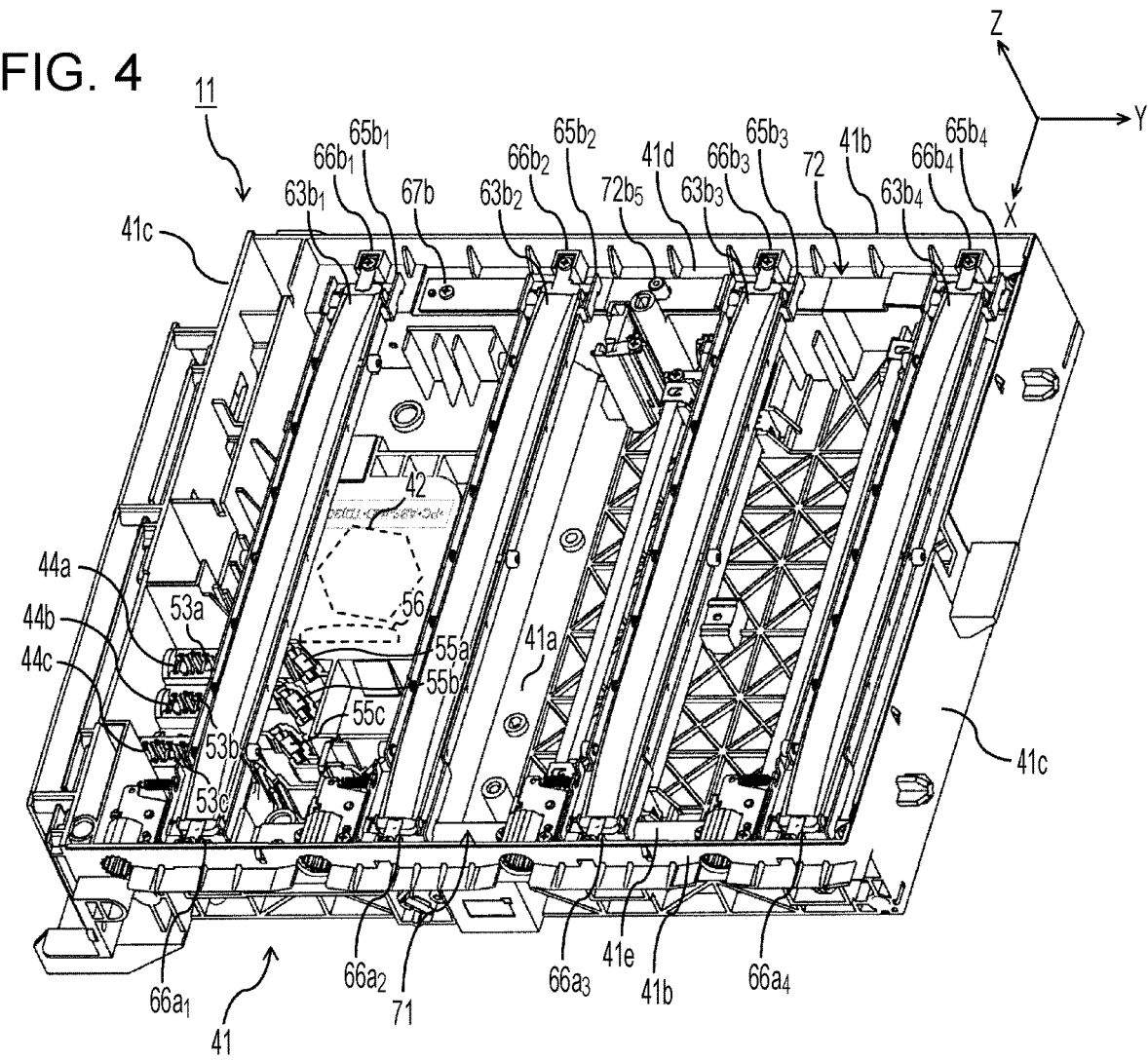
FIG. 4 is a perspective view of the interior of a casing, with an upper lid having been removed, of the optical scanning device according to this invention.

FIG. 4 is a perspective view of the interior of the casing 41, with an upper lid having been removed, of the optical scanning device 11 according to this invention. Furthermore, FIG. 5 is a plan view of the optical scanning device 11 depicted in FIG. 4. Furthermore, FIG. 6(A) is a cross-sectional view along arrow A-A of the optical scanning device 11 depicted in FIG. 5. Furthermore, FIG. 6(B) is a cross-sectional view along arrow B-B of the optical scanning device 11 depicted in FIG. 5.

It should be noted that a direction orthogonal to the X direction is taken as the Y direction, and a direction orthogonal to the X direction and the Y direction (the longitudinal direction of the rotation axis of the polygon motor 43) is taken as the height direction Z.

The casing 41 has a rectangular base plate 41a and four side plates 41b and 41c that surround the base plate 41a.

Furthermore, the polygon motor 43 (not depicted) is fixed to the base plate 41a, the center of rotation of the polygon mirror 42, which is polygonal in a plan view, is connected and fixed to a rotary shaft of the polygon motor 43 in a position that is slightly displaced in the −Y direction from the center of the base plate 41a, and the polygon mirror 42 rotates by means of the polygon motor 43.

The optical scanning device 11 is provided with first to fourth incident optical systems that guide light beams L1 to L4 of the first to fourth semiconductor lasers 44a to 44d to the polygon mirror 42.

The first incident optical system is composed of a collimator lens 53a, an aperture 54a, a mirror 55a arranged at the same height as the first semiconductor laser 44a, and a cylindrical lens 56, or the like.

The second incident optical system is composed of a collimator lens 53b, an aperture 54b, a mirror 55b arranged at the same height as the second semiconductor laser 44b, and the cylindrical lens 56, or the like.

The third incident optical system is composed of a collimator lens 53c, an aperture 54c, a mirror 55c arranged at the same height as the third semiconductor laser 44c, and the cylindrical lens 56, or the like.

The fourth incident optical system is composed of a collimator lens 53d, an aperture 54d, a mirror 55d arranged at the same height as the fourth semiconductor laser 44d, and the cylindrical lens 56, or the like.

In addition, first to fourth imaging optical systems are provided.

The first imaging optical system guides the light beam L1 of the first semiconductor laser 44a reflected by the polygon mirror 42, to the photoreceptor drum 13Y corresponding to yellow.

The second imaging optical system guides the light beam L2 of the second semiconductor laser 44b reflected by the polygon mirror 42, to the photoreceptor drum 13M corresponding to magenta.

The third imaging optical system guides the light beam L3 of the third semiconductor laser 44c reflected by the polygon mirror 42, to the photoreceptor drum 13C corresponding to cyan.

The fourth imaging optical system guides the light beam L4 of the fourth semiconductor laser 44d reflected by the polygon mirror 42, to the photoreceptor drum 13K corresponding to black.

The first imaging optical system is composed of the Fθ second lens $63b_1$ and two reflective mirrors $64a_1$ and $64a_2$ or the like.

The second imaging optical system is composed of the Fθ second lens $63b_2$ and two reflective mirrors $64b_1$ and $64b_2$ or the like.

The third imaging optical system is composed of the Fθ second lens $63b_3$ and two reflective mirrors $64c_1$ and $64c_2$ or the like.

The fourth imaging optical system is composed of the Fθ second lens $63b_4$ and a reflective mirror 64d or the like.

Next, a description will be given regarding the optical paths along which the light beams L1 to L4 of the semiconductor lasers 44a to 44d are incident on the scanning surfaces of the respective photoreceptor drums 13Y, 13M, 13C, and 13K.

First, in the first incident optical system, the light beam L1 of the first semiconductor laser 44a passes through the collimator lens 53a and is formed into parallel light, has the amount of light thereof reduced by the aperture 54a, is incident on and reflected by the mirror 55a, and passes through the cylindrical lens 56 and is incident on a reflective surface 42a of the polygon mirror 42.

Furthermore, in the second incident optical system, the light beam L2 of the second semiconductor laser 44b passes through the collimator lens 53b and is formed into parallel light, has the amount of light thereof reduced by the aperture 54b, is incident on and reflected by the mirror 55b, and passes through the cylindrical lens 56 and is incident on a reflective surface 42a of the polygon mirror 42.

Furthermore, in the third incident optical system, the light beam L3 of the third semiconductor laser 44c passes through the collimator lens 53c and is formed into parallel light, has the amount of light thereof reduced by the aperture 54c, is incident on and reflected by the mirror 55c, and passes through the cylindrical lens 56 and is incident on a reflective surface 42a of the polygon mirror 42.

Furthermore, in the fourth incident optical system, the light beam L4 of the fourth semiconductor laser 44d passes through the collimator lens 53d and is formed into parallel light, has the amount of light thereof reduced by the aperture 54d, is incident on and reflected by the mirror 55d, and passes through the cylindrical lens 56 and is incident on a reflective surface 42a of the polygon mirror 42.

The cylindrical lens 56 concentrates the light beams L1 to L4 in such a way as be substantially converged in a direction corresponding to the Y direction and forms a linear image, thereby correcting a deviation in a dot pitch in the Y direction of the scanning surfaces of the photoreceptor drums 13Y, 13M, 13C, and 13K generated by a processing error of the mirror surfaces of the polygon mirror 42 or an inclination error (plane inclination) of the reflective surfaces 42a caused by inclining or the like of the rotary shaft of the polygon motor 43.

The light beams L1, L2, L3, and L4 reflected by the reflective surfaces 42a of the polygon mirror 42 pass through an Fθ first lens 63a and are thereby respectively incident on the reflective mirrors $64a_1$, $64b_1$, $64c_1$, and 64d while the main scanning and sub-scanning light beam widths converge.

Next, in the first imaging optical system, the light beam L1 is reflected in an obliquely upward direction by a reflective surface 42a of the polygon mirror 42, is then reflected by the reflective mirrors $64a_1$ and $64a_2$, passes through the Fθ second lens $63b_1$, and is incident on the photoreceptor drum 13Y on which a yellow toner image is formed.

Furthermore, in the second imaging optical system, the light beam L2 is reflected in an obliquely downward direction by a reflective surface 42a of the polygon mirror 42, is then reflected by the reflective mirrors $64b_1$ and $64b_2$, passes through the Fθ second lens $63b_2$, and is incident on the photoreceptor drum 13M on which a magenta toner image is formed.

Furthermore, in the third imaging optical system, the light beam L3 is reflected in an obliquely downward direction by a reflective surface 42a of the polygon mirror 42, is then reflected by the reflective mirrors $64c_1$ and $64c_2$, passes through the Fθ second lens $63b_3$, and is incident on the photoreceptor drum 13C on which a cyan toner image is formed.

Furthermore, in the fourth imaging optical system, the light beam L4 is reflected in an obliquely upward direction by a reflective surface 42a of the polygon mirror 42, is then reflected by the reflective mirrors 64d, passes through the Fθ second lens 63$b_4$, and is incident on the photoreceptor drum 13K on which a black toner image is formed.

The polygon mirror 42 is a rotary polygon mirror that has a polygonal columnar shape such as a hexagonal column or an octagonal column, is provided with mirrors on side surfaces, and rotates about the central axis of a polygonal column. The polygon mirror 42 rotates at a constant angular velocity by means of the polygon motor 43, sequentially reflects the light beams L1 to L4 by means of the reflective surfaces 42a, and repeatedly deflects the light beams L1 to L4 in the X direction at the constant angular velocity.

Thus, the scanning surfaces of the photoreceptor drums 13Y, 13M, 13C, and 13K are scanned in the X direction, and dot-like electrostatic latent images are formed at equal pitches.

The Fθ second lenses 63$b_1$, 63$b_2$, 63$b_3$, and 63$b_4$ adjust focal length in such a way that the light beams L1 to L4 reflected by the reflective surfaces 42a of the polygon mirror 42 form images on the scanning surfaces of the photoreceptor drums 13Y, 13M, 13C, and 13K respectively.

Furthermore, the Fθ second lenses 63$b_1$, 63$b_2$, 63$b_3$, and 63$b_4$ convert the light beams L1 to L4 in such a way as to move at a constant linear velocity along the main scanning line on the respective photoreceptor drums 13Y, 13M, 13C, and 13K with regard to both the X direction and the Y direction.

Thus, the light beams L1 to L4 repeatedly scan the surfaces of the respective photoreceptor drums 13Y, 13M, 13C, and 13K in the X direction.

Meanwhile, the photoreceptor drums 13Y, 13M, 13C, and 13K on which yellow, magenta, cyan, and black toner images are formed are rotationally driven, two-dimensional surfaces (peripheral surfaces) of the photoreceptor drums 13Y, 13M, 13C, and 13K are scanned by the light beams L1 to L4, and respective electrostatic images are formed on the surfaces of the photoreceptor drums 13Y, 13M, 13C, and 13K.

<<Configuration of Fθ Second Lens Supporting Units 71 and 72>>

Next, a configuration of the Fθ second lens supporting units 71 and 72 of this invention will be described based on FIGS. 4 to 8.

Figure 7A:
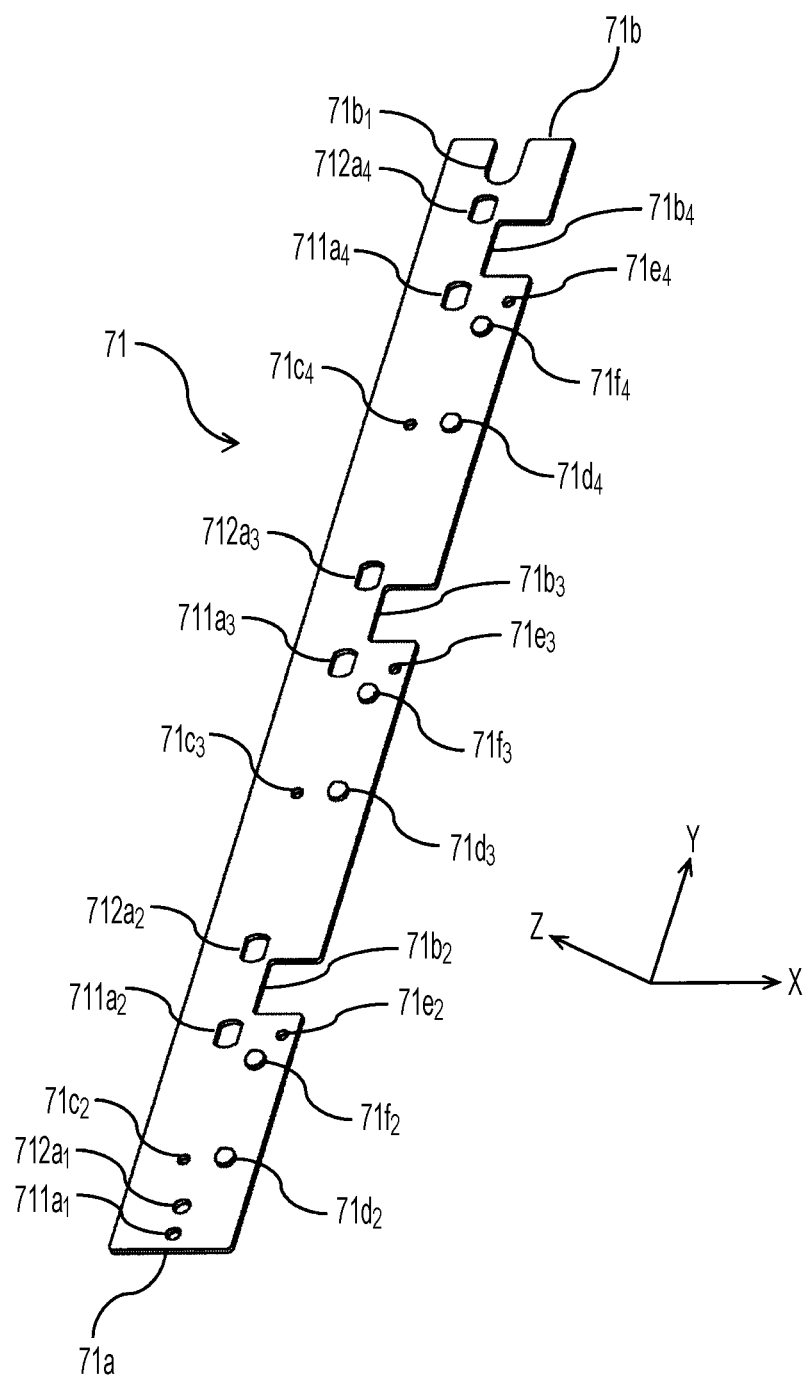
FIG. 7(A) is a perspective view of an Fθ second lens supporting unit depicted in FIG. 4.
Figure 7B:
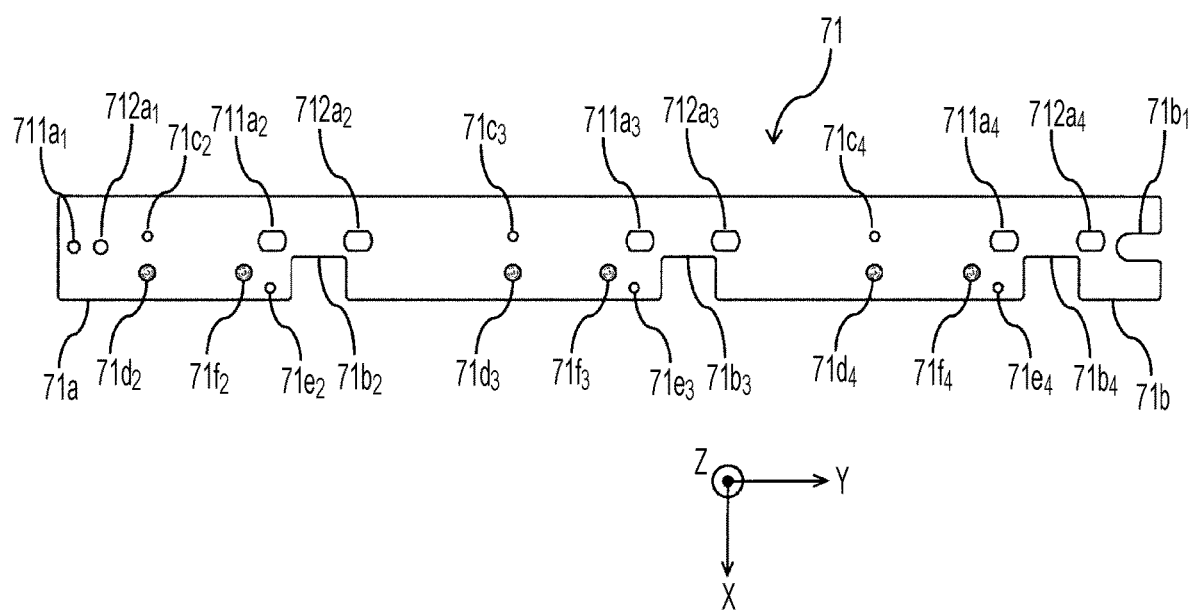
FIG. 7(B) is a plan view of the Fθ second lens supporting unit depicted in FIG. 4.
Figure 7C:
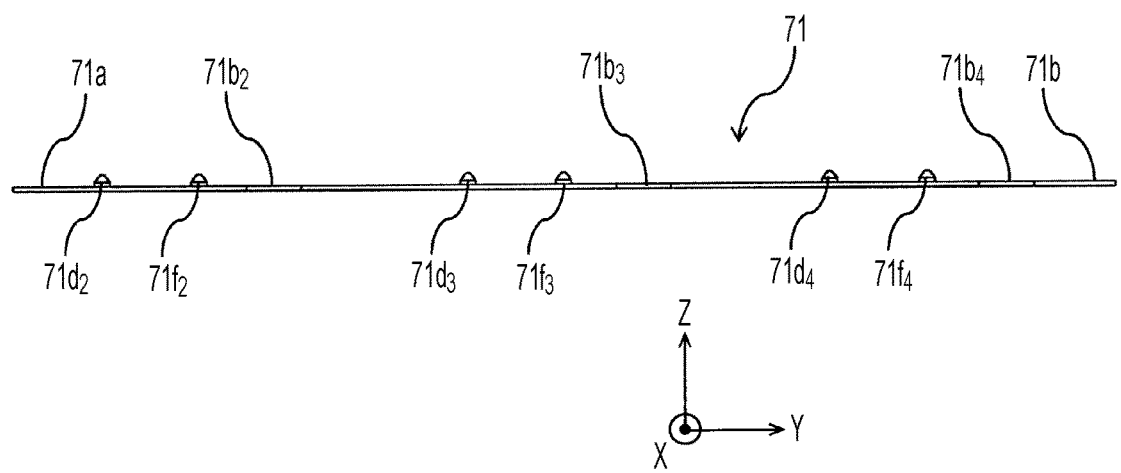
FIG. 7(C) is a side view of the Fθ second lens supporting unit depicted in FIG. 4.
Figure 8A:
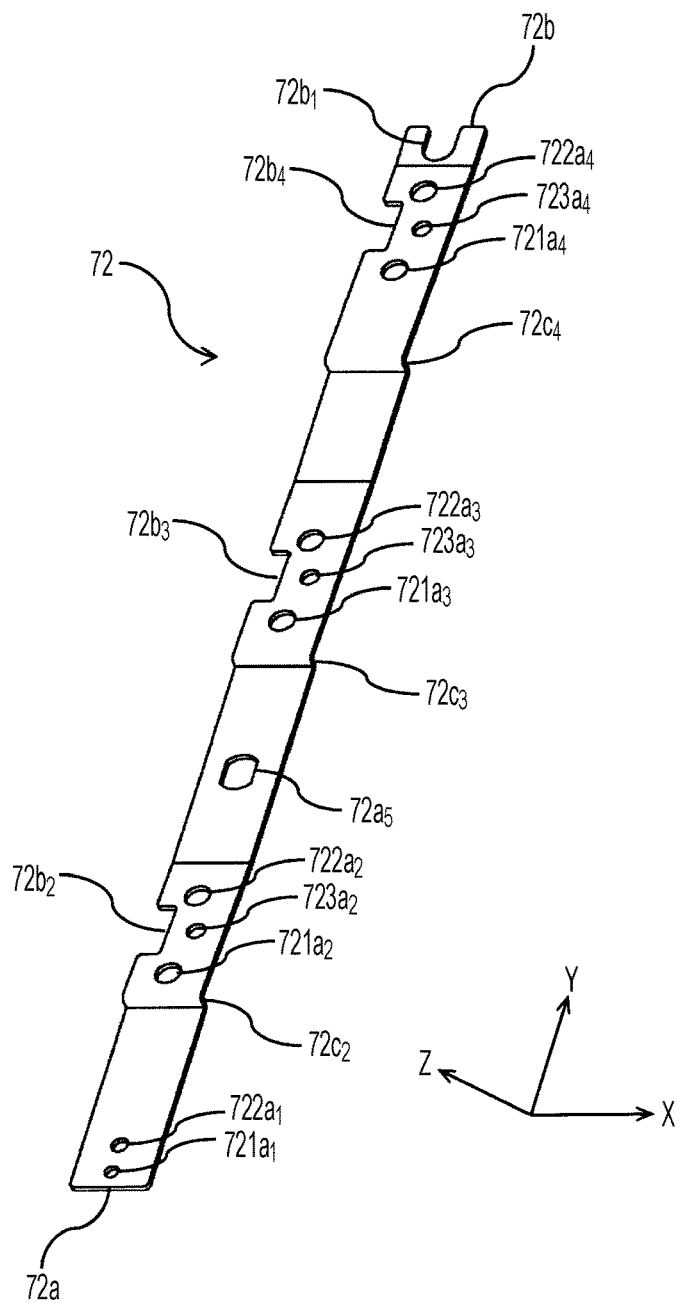
FIG. 8(A) is a perspective view of an Fθ second lens supporting unit depicted in FIG. 4.
Figure 8B:
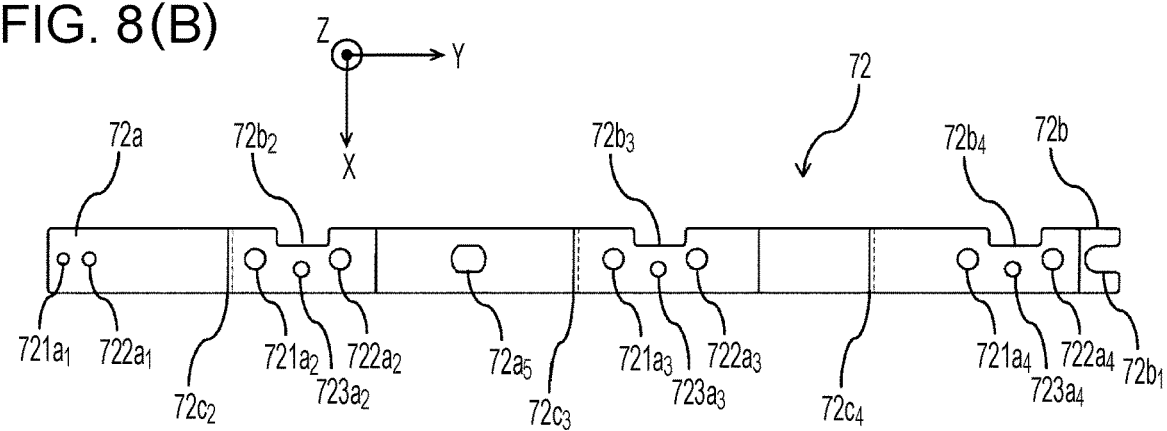
FIG. 8(B) is a plan view of the Fθ second lens supporting unit depicted in FIG. 4.
Figure 8C:
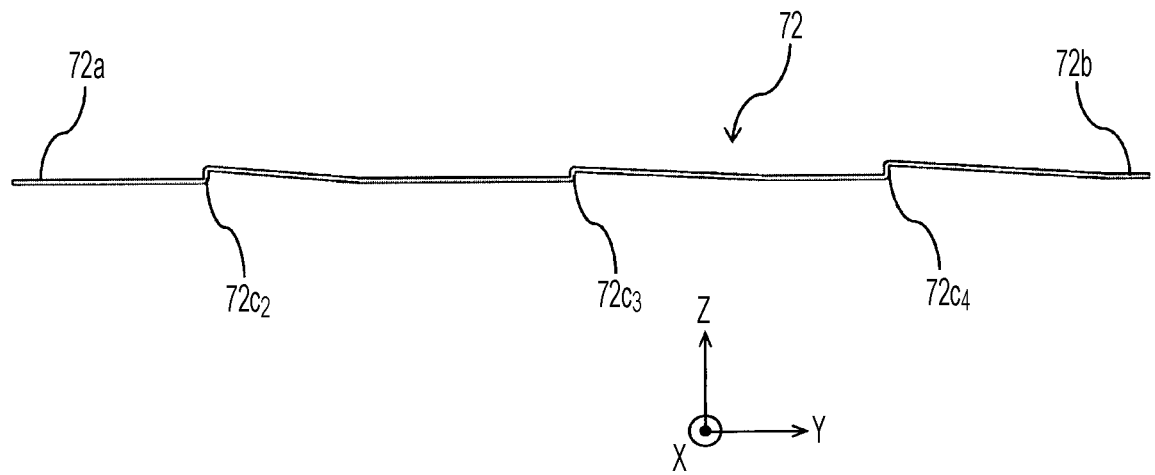
FIG. 8(C) is a side view of the Fθ second lens supporting unit depicted in FIG. 4.

FIG. 7(A) is a perspective view of the Fθ second lens supporting unit 71 depicted in FIG. 4. Furthermore, FIG. 7(B) is a plan view of the Fθ second lens supporting unit 71 depicted in FIG. 4. Furthermore, FIG. 7(C) is a side view of the Fθ second lens supporting unit 71 depicted in FIG. 4. Furthermore, FIG. 8(A) is a perspective view of the Fθ second lens supporting unit 72 depicted in FIG. 4. Furthermore, FIG. 8(B) is a plan view of the Fθ second lens supporting unit 72 depicted in FIG. 4. Furthermore, FIG. 8(C) is a side view of the Fθ second lens supporting unit 72 depicted in FIG. 4.

When the casing 41 of the optical scanning device 11 has thermally expanded, the casing 41 thermally expands equally in the X, Y, and Z directions; however, the effect of a fluctuation in the optical paths of the light beams L1 to L4 appears most in thermal expansion in the Y direction. Thus, in order to reduce the amount of color deviation, it is necessary to suppress the effect of thermal expansion exerted in the Y direction.

Furthermore, when based on the Fθ second lens 63$b_1$ in the position nearest to a laser light source, the elongation from thermal expansion of the casing 41 appears more as the distance from the Fθ second lens 63$b_1$ increases in the Y direction.

Thus, the elongation from thermal expansion appears more in the order of the Fθ second lens 63$b_4$, the Fθ second lens 63$b_3$, the Fθ second lens 63$b_2$, and the Fθ second lens 63$b_1$, and therefore the amount of color deviation increases in the order of yellow, magenta, cyan, and black that respectively correspond to the Fθ second lens 63$b_1$, the Fθ second lens 63$b_2$, the Fθ second lens 63$b_3$, and the Fθ second lens 63$b_4$.

Figure 5:
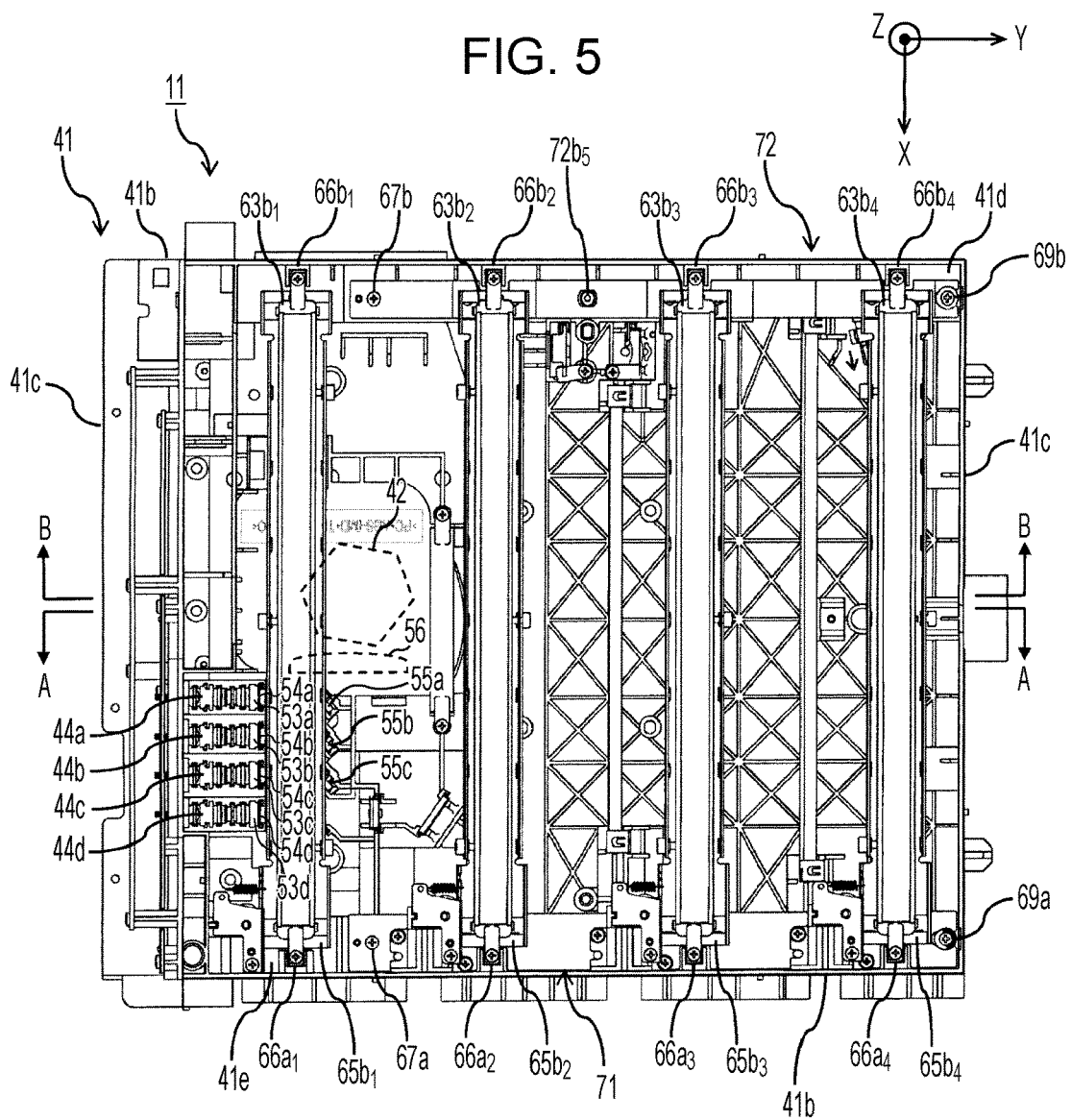
FIG. 5 is a plan view of the optical scanning device depicted in FIG. 4.
Figure 6A:
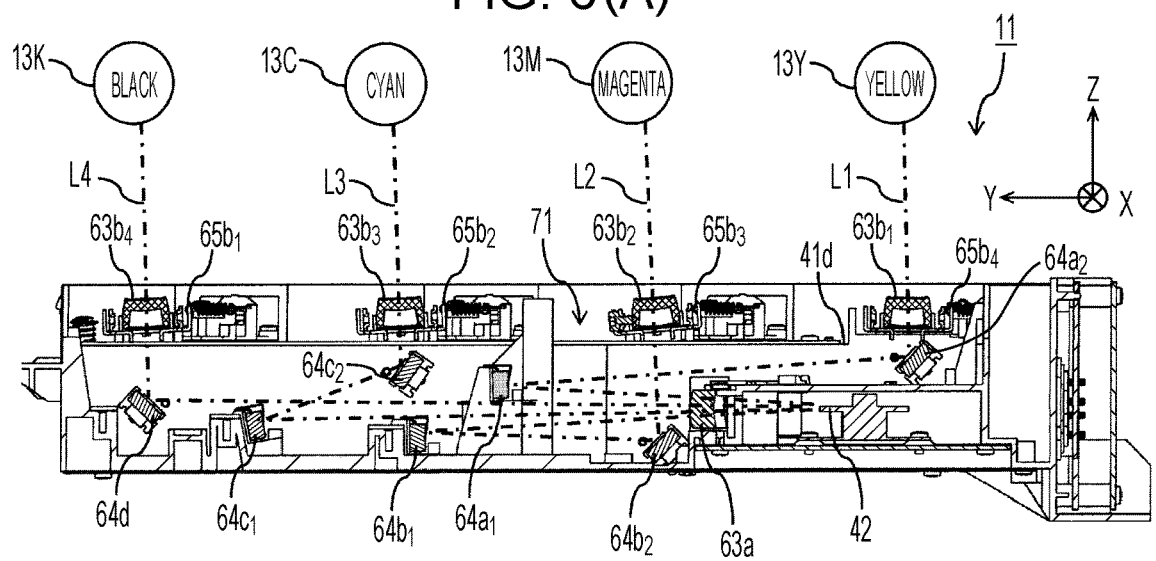
FIG. 6(A) is a cross-sectional view along arrow A-A of the optical scanning device depicted in FIG. 5.
Figure 6B:
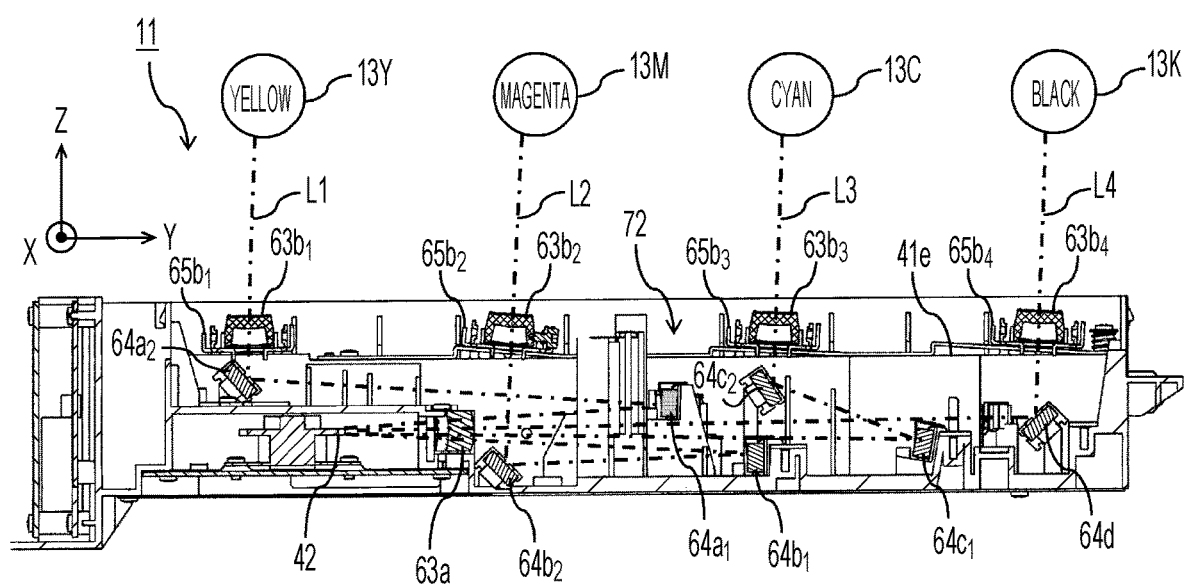
FIG. 6(B) is a cross-sectional view along arrow B-B of the optical scanning device depicted in FIG. 5.

Thus, rather than providing the Fθ second lenses 63$b_2$ and 63$b_3$ and the Fθ second lens 63$b_4$, which are likely to be affected by thermal expansion of the casing 41, directly on the casing 41, these are provided on the Fθ second lens supporting units 71 and 72, which are composed of a material having a lower thermal expansion coefficient (or linear expansion coefficient) than the casing 41, as depicted in FIGS. 4 to 6.

In FIGS. 4 to 6, the Fθ second lens supporting units 71 and 72 are respectively provided on level differences 41d and 41e that are provided on inner side portions of the side plates 41b on both sides of the casing 41 of the optical scanning device 11.

The Fθ second lens supporting units 71 and 72 are composed of a material having a lower thermal expansion coefficient (or linear expansion coefficient) than the casing 41 of the optical scanning device 11. For example, in a case where a PC/ABS alloy (linear expansion coefficient of approximately 7.8 to 8×10$^{-5}$ [cm/cm/° C.]), which is a resin material, is used for the casing 41, SECC (electrogalvanized steel sheet having a linear expansion coefficient of approximately 11.7×10$^{-6}$ [cm/cm/° C.]), which is a metal material and has a lower linear expansion coefficient than a PC/ABS alloy, is used for the Fθ second lens supporting units 71 and 72.

Generally, with [×10$^{-6}$/° C.] as a unit, the thermal expansion coefficients of resin materials are 70 to 80 for PC resin material, 80 to 110 for ABS resin, 70 for PET resin material, and so forth, the thermal expansion coefficients of alloys are 23 for aluminum, 11.7 for iron, and 16.6 for copper, and the thermal expansion coefficients of alloys are 17 to 18 for stainless steel, 10 to 12 for cast iron, 5 to 6 for cemented carbide, and so forth. Thus, in a case where a casing 41 composed of a resin material having a thermal expansion coefficient of 70 to 110 [10$^{-6}$/° C.] is used, it is desirable to use Fθ second lens supporting units 71 and 72 composed of a metal material or an alloy material of 5 to 23 [10$^{-6}$/° C.].

Furthermore, as the material of the Fθ second lens supporting units 71 and 72, other than SECC, a material having a low linear expansion coefficient such as SUS may be used.

As depicted in FIGS. 7(A) to (C), the Fθ second lens supporting unit 71 has formed therein notch sections 71$b_2$, 71$b_3$, and 71$b_4$ to allow for bosses 66$a_2$, 66$a_3$, and 66$a_4$ provided on the level difference 41e of the casing 41.

Furthermore, hole sections 711$a_4$ and 712$a_4$ of the Fθ second lens supporting unit 71 are relief holes to allow for protrusions 411$e_4$ and 412$e_4$ provided on the level difference 41e of the casing 41.

The hole sections 711$a_4$ and 712$a_4$ have a shape that extends in the Y direction in such a way that the protrusions 411$e_4$ and 412$e_4$ can displace relatively in the Y direction when the casing 41 expands.

The same is also true for hole sections 711$a_3$ and 712$a_3$ and hole sections 711$a_2$ and 712$a_2$ of the Fθ second lens supporting unit 71.

Furthermore, the Fθ second lens supporting unit 71 has screw holes $71c_2$, $71c_3$, and $71c_4$ for fixing an adjustment member for adjusting bending (inclination) of a sub-scanning line to the Fθ second lens supporting unit 71, and has protrusions $71d_2$, $71d_3$, and $71d_4$ for positioning an adjustment member for adjusting inclination on the Fθ second lens supporting unit 71.

Furthermore, the Fθ second lens supporting unit 71 has screw holes $71e_2$, $71e_3$, and $71e_4$ for fixing an adjustment member for adjusting inclination to the Fθ second lens supporting unit 71, and has protrusions $71f_2$, $71f_3$, and $71f_4$ for positioning an adjustment member for adjusting inclination on the Fθ second lens supporting unit 71.

Furthermore, the Fθ second lens supporting unit 71 has a hole section $712a_1$ for fixing one end section 71a by means of a screw 67a or the like, and has a notch section $71b_1$ for inserting a spring screw 69b at an end section 71b at the opposite side.

Furthermore, a boss (protrusion) that positions the Fθ second lens supporting unit 71 is provided on the level difference 41e of the casing 41, and the Fθ second lens supporting unit 71 is positioned by inserting the boss (protrusion) inside a hole section $711a_1$.

As depicted in FIGS. 8(A) to (C), the Fθ second lens supporting unit 72 has formed therein notch sections $72b_2$, $72b_3$, and $72b_4$ to allow for bosses $66b_2$, $66b_3$, and $66b_4$ provided on the level difference 41d of the casing 41.

Hole sections $721a_4$ and $722a_4$ of the Fθ second lens supporting unit 72 are relief holes to respectively allow for protrusions $411d_4$ and $412d_4$ provided on the level difference 41d of the casing 41.

Furthermore, a hole section $723a_4$ is a hole section for positioning a protrusion provided on the lower surface of the Fθ second lens holding unit $65b_4$.

The same is also true for hole sections $721a_3$, $722a_3$, and $723a_3$ and hole sections $721a_2$, $722a_2$, and $723a_2$ of the Fθ second lens supporting unit 72.

Furthermore, the Fθ second lens supporting unit 72 has a hole section $72a_5$ to allow for a protrusion $72b_5$ provided on the level difference 41d of the casing 41. The Fθ second lens supporting unit 72 is screwed to the protrusion $72b_5$ by means of a spring screw $69b_b$ that is not depicted, and thereby engages with the casing 41.

The hole section $72a_5$ is formed in an elliptical shape in such a way that the protrusion $72b_5$ can slide in the Y direction inside the hole section $72a_5$ when the casing 41 expands. In other words, the casing 41 displaces relative to the Fθ second lens supporting unit 72.

Furthermore, the Fθ second lens supporting unit 72 has a hole section $722a_1$ for fixing the −Y direction end section 72a by means of a screw 67a or the like, and has a notch section $72b_1$ for inserting the spring screw 69b at the end section 72b at the opposite side.

Furthermore, a boss (protrusion) that positions the Fθ second lens supporting unit 72 is provided on the level difference 41d of the casing 41, and the Fθ second lens supporting unit 72 is positioned by inserting the boss (protrusion) inside a hole section $721a_1$.

Furthermore, the Fθ second lens supporting unit 72 has three level differences $72c_2$, $72c_3$, and $72c_4$.

These level differences $72c_2$, $72c_3$, and $72c_4$ are intentionally inclined for there to be sufficient engagement between the stops for positioning the Fθ second lens holding units $65b_1$, $65b_2$, and $65b_3$ and the positioning holes of the Fθ second lens supporting unit 72.

Figure 9:
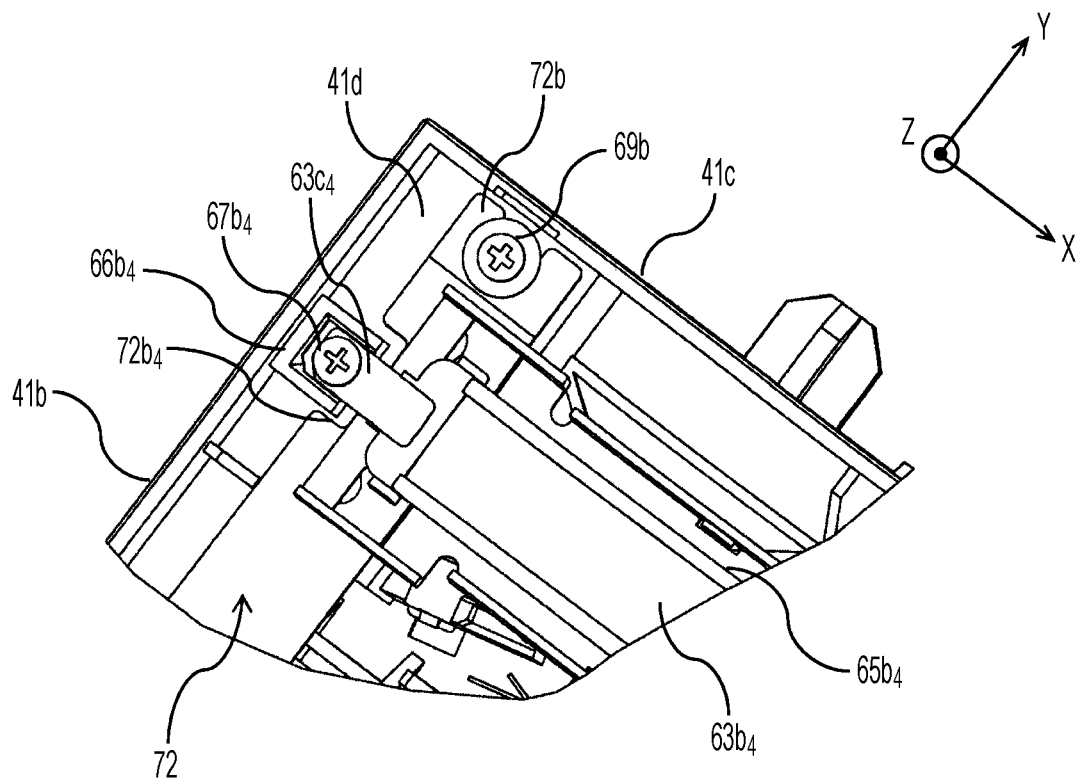
FIG. 9 is a partial enlarged view of the optical scanning device depicted in FIG. 4.

FIG. 9 is a partial enlarged view of the optical scanning device 11 depicted in FIG. 4.

As depicted in FIG. 9, the spring screw 69b is inserted into the notch section $72b_1$ of the Fθ second lens supporting unit 72.

Furthermore, a plate spring $63c_4$ is a member that supports the Fθ second lens $63b_4$ on the Fθ second lens holding unit $65b_4$.

In other words, the plate spring $63c_4$ is fixed to the boss $66b_4$ by means of a screw $67b_4$, an end section of the Fθ second lens $63b_4$ is pressed in the −Z direction by the plate spring $63c_4$, and the Fθ second lens $63b_4$ is thereby supported on the Fθ second lens holding unit $65b_4$.

Furthermore, also for the end section at the opposite side of the Fθ second lens $63b_4$, a plate spring $63d_4$ is fixed to the boss $66a_4$ by means of a screw $67a_4$, the end section at the opposite side of the Fθ second lens $63a_4$ is pressed in the −Z direction by the plate spring $63d_4$, and the end section at the opposite side of the Fθ second lens $63a_4$ is fixed on an Fθ second lens holding unit $65a_4$.

Furthermore, the same is also true for both end sections of the Fθ second lenses $63b_1$ to $63b_3$.

<Configuration of Spring Screw 69b>

Next, the spring screw 69b of this invention will be described based on FIGS. 10(A) and (B).

Figure 10A:
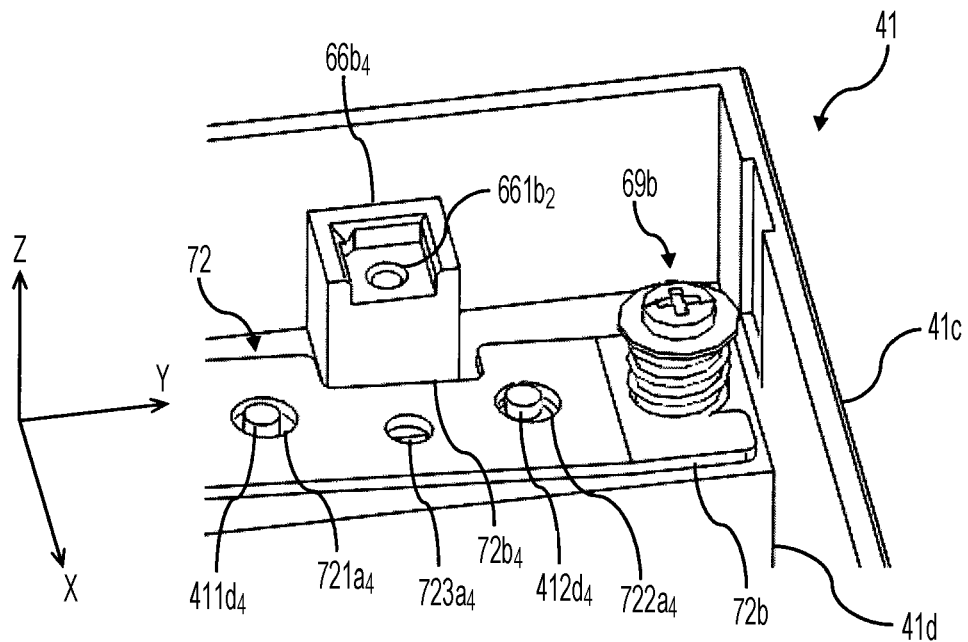
FIG. 10(A) is a partial enlarged view of the optical scanning device depicted in FIG. 4.
Figure 10B:
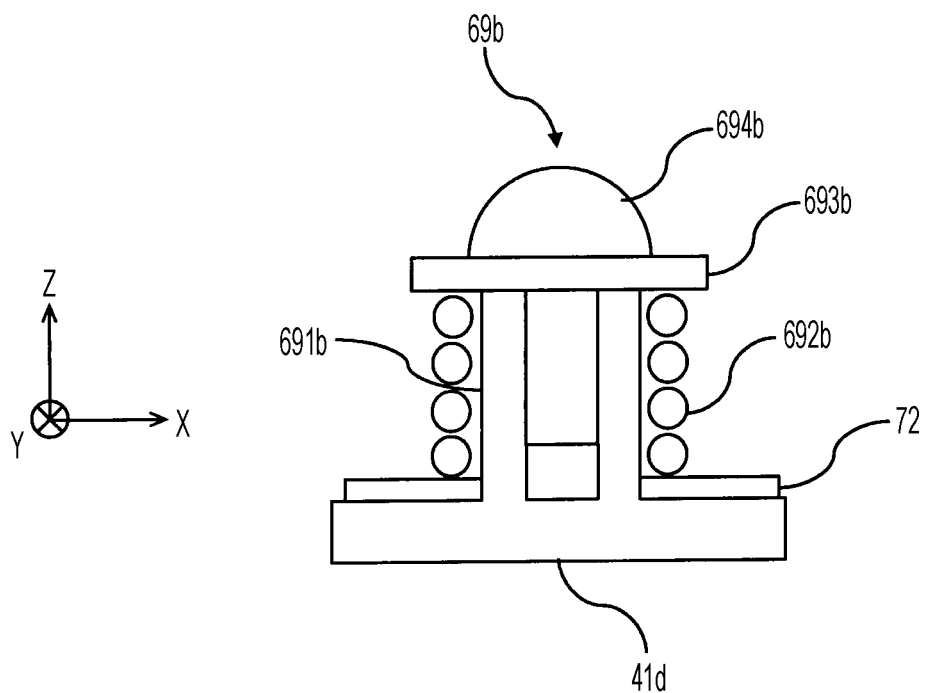
FIG. 10(B) is a cross-sectional schematic view of a spring screw of FIG. 10(A) seen from the Y direction.

FIG. 10(A) is a partial enlarged view of the optical scanning device 11 depicted in FIG. 4. Furthermore, FIG. 10(B) is a cross-sectional schematic view of the spring screw 69b of FIG. 10(A) seen from the Y direction.

As depicted in FIGS. 10(A) and (B), the spring screw 69b is configured from a protruding section 691b formed on the level difference 41d of the casing 41, a torsion spring (kick spring 692b) screwed to the protruding section 691b, a washer 693b that is provided on the top surface of the protruding section 691b and presses and compresses the kick spring 692b from above, and a screw 694b that fixes the washer 693b to the top surface of the protruding section 691b.

The spring screw 69b, due to the urging force of the kick spring 692b, urges the end section 72b of the Fθ second lens supporting unit 72 in the −Z direction and presses on the level difference 41d of the casing 41, thereby preventing the Fθ second lens supporting unit 72 from separating from the casing 41.

According to a configuration such as the aforementioned, it becomes possible for the spring screw 69b to slide freely inside the notch section $72b_1$, even if the spring screw 69b, which is fixed to the casing 41, has moved in the Y direction due to thermal expansion. The casing 41 displaces relative to the Fθ second lens supporting units 71 and 72. In other words, the spring screw 69b corresponds to an engaging unit.

<Configuration of Spring Screw 69c>

Next, a hook 69c serving as a modified example of the spring screw 69b of this invention will be described based on FIGS. 11(A) and (B).

Figure 11A:
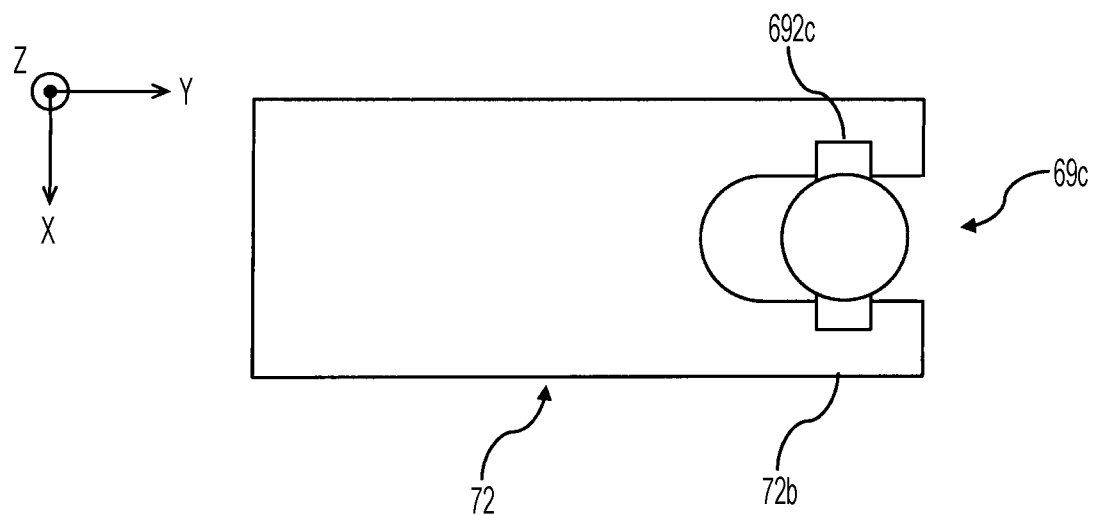
FIG. 11(A) is a partial enlarged view in which a spring screw of the optical scanning device depicted in FIG. 5 has been replaced with a hook.
Figure 11B:
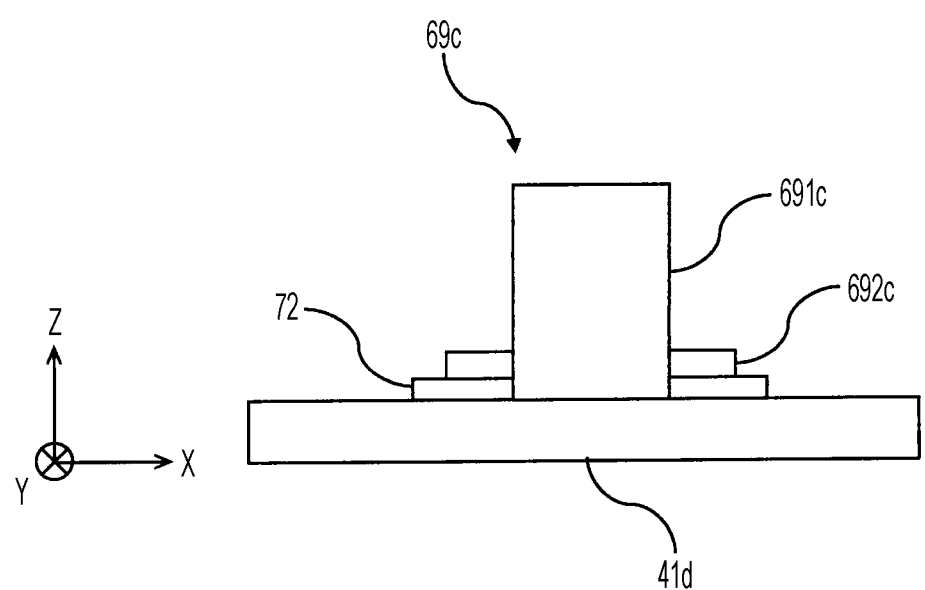
FIG. 11(B) is a schematic view of the spring screw of FIG. 11(A) seen from the Y direction.

FIG. 11(A) is a partial enlarged view in which the spring screw 69b of the optical scanning device 11 depicted in FIG. 5 has been replaced with the hook 69c. Furthermore, FIG. 11(B) is a schematic view of the hook 69c of FIG. 11(A) seen from the Y direction.

As depicted in FIGS. 11(A) and (B), the hook 69c is configured from a protruding section 691c formed on the level difference 41d of the casing 41, and a plate section 692c that is provided near the lower end of the protruding section 691c and having a slight gap from the end section 72b in such a way that the end section 72b of the Fθ second lens supporting unit 72 does not separate from the casing 41.

The hook 69c engages in such a way as to prevent the Fθ second lens supporting unit 72 from separating from the casing 41, by means of the plate section 692c. In other words, the hook 69c corresponds to an engaging unit.

Figure 12:
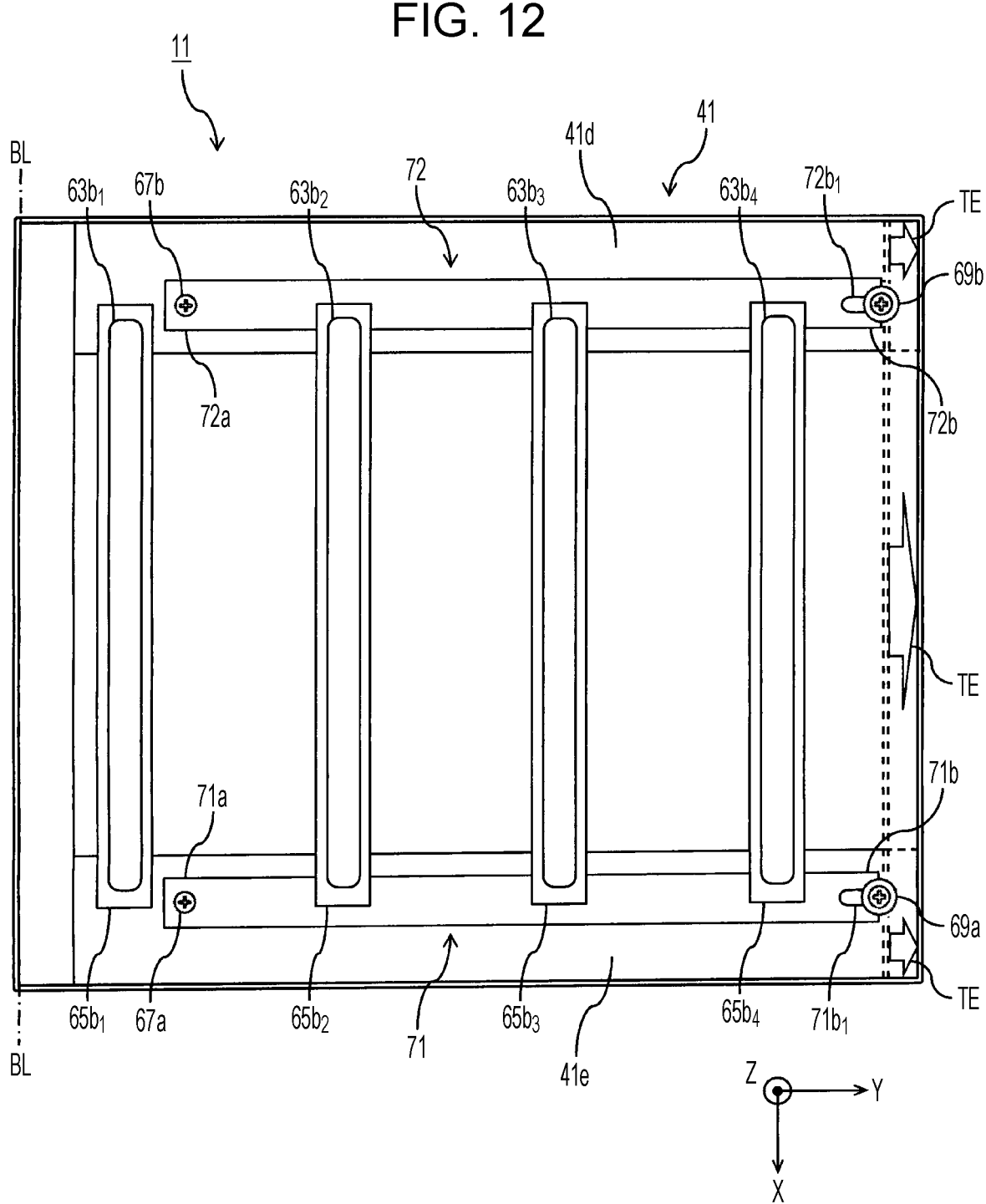
FIG. 12 is a schematic plan view of after thermal expansion of the optical scanning device depicted in FIG. 5.

FIG. 12 is a schematic plan view of after thermal expansion of the optical scanning device 11 depicted in FIG. 5.

As depicted in FIG. 12, even if the casing 41 has thermally expanded with respect to the Fθ second lens supporting unit 72, the Fθ second lens supporting unit 72 thermally expands regardless of the casing 41 in the Y direction, and therefore the effect of color deviation caused by thermal expansion of the casing 41 can be reduced.

Furthermore, the same is also true for the Fθ second lens supporting unit 71.

In FIG. 12, since laser light is radiated from the −Y direction end section of the casing 41, a basis for the thermal expansion of the casing 41 is a baseline BL that corresponds to a main body fixing unit (fastening unit) of the optical scanning device 11.

It should be noted that the baseline BL is a line that serves as a basis for where the optical scanning device 11 is mounted on the image forming device 100, specifically, a main body frame of the image forming device 100.

The amount of deviation caused by thermal expansion of the casing 41 increases as the distance from the baseline BL increases, and it is therefore thought that the Fθ second lens $63b_1$ provided at the −Y direction end section is least affected by the thermal expansion.

Consequently, due to the Fθ second lenses $63b_2$, $63b_3$, and $63b_4$ other than the Fθ second lens $63b_1$ being provided with the Fθ second lens supporting units 71 and 72 interposed, thermal fluctuation of the Fθ second lenses $63b_2$, $63b_3$, and $63b_4$ can be effectively reduced, and the amount of color deviation caused by thermal expansion of the casing 41 can be greatly reduced.

<Configuration of Lens Adjustment Members $68a_2$ to $68a_4$>

Next, lens adjustment members $68a_2$ to $68a_4$ that adjust the Y direction inclination of the Fθ second lenses $63b_2$ to $63b_4$ of this invention will be described based on FIGS. 13 to 17.

Figure 13:
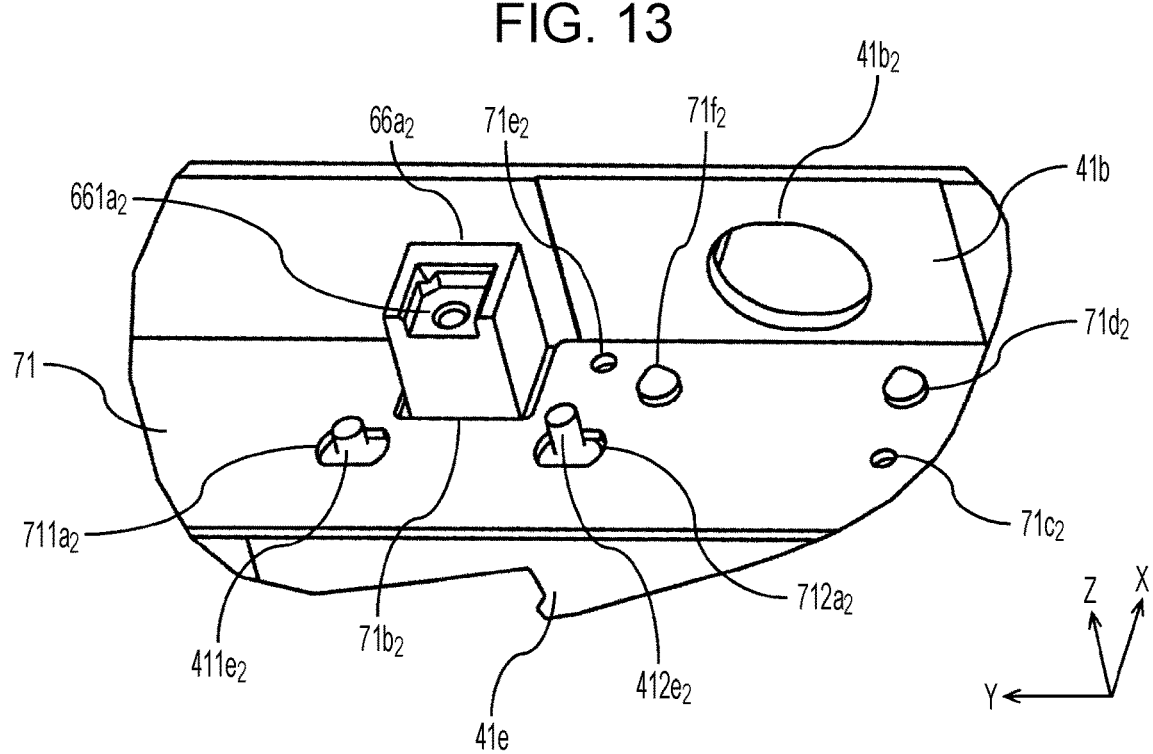
FIG. 13 is a main-part enlarged perspective view depicting mainly a portion from which an Fθ second lens, an Fθ second lens holding unit, and a lens adjustment member have been removed from the optical scanning device depicted in FIG. 4.
Figure 14:
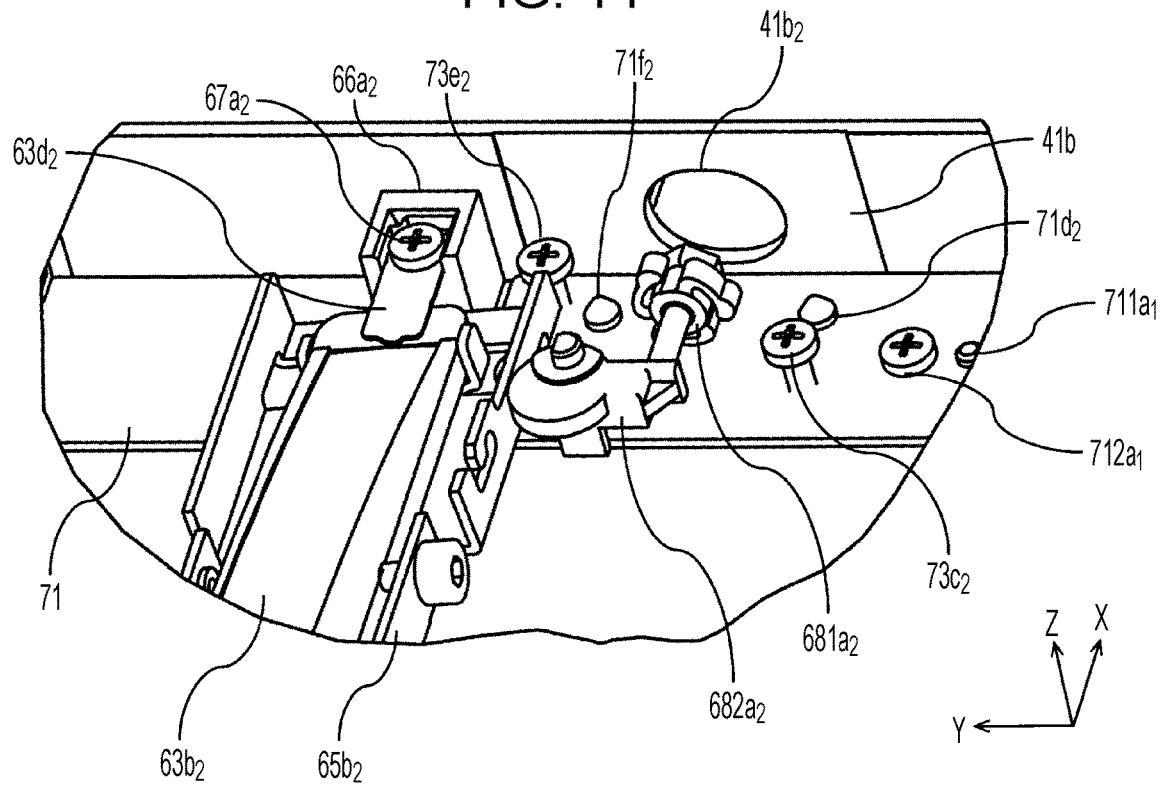
FIG. 14 is an explanatory diagram of when a mechanism of part of a lens adjustment mechanism that adjusts the Fθ second lens holding unit has been provided in the portion depicted in FIG. 13.
Figure 15:
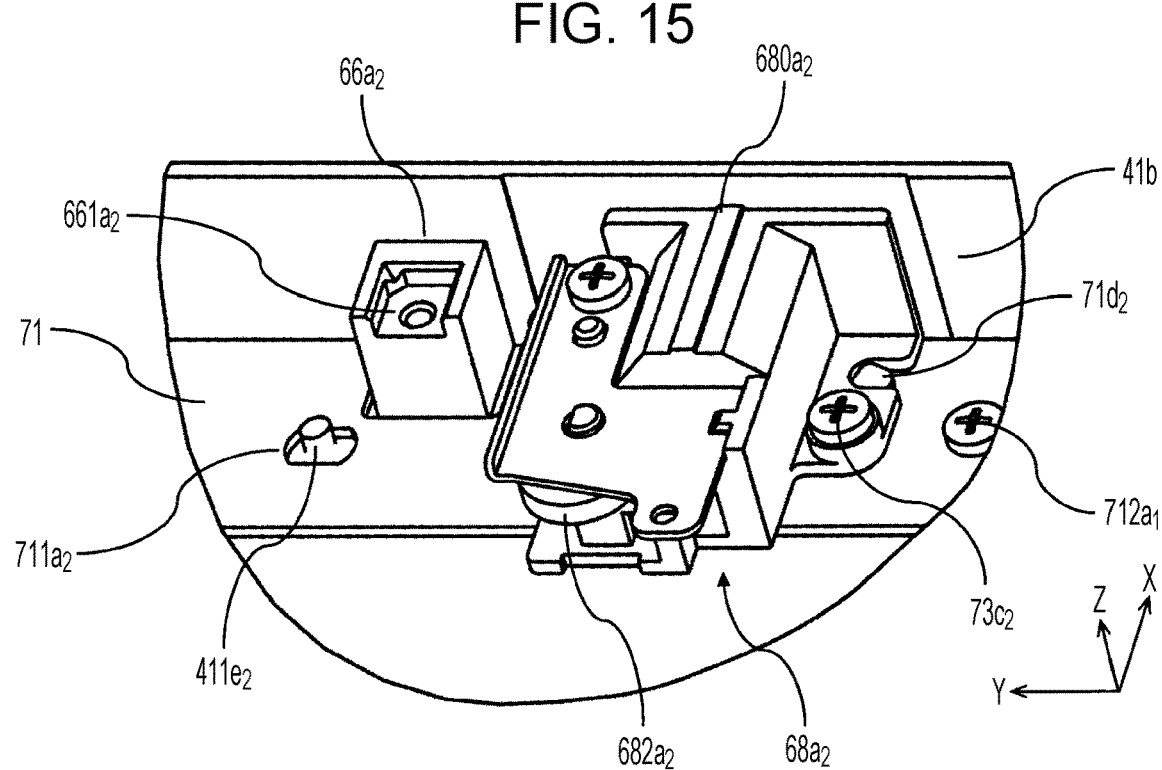
FIG. 15 is an explanatory diagram of when a lens adjustment unit has been provided in the portion depicted in FIG. 13.
Figure 16:
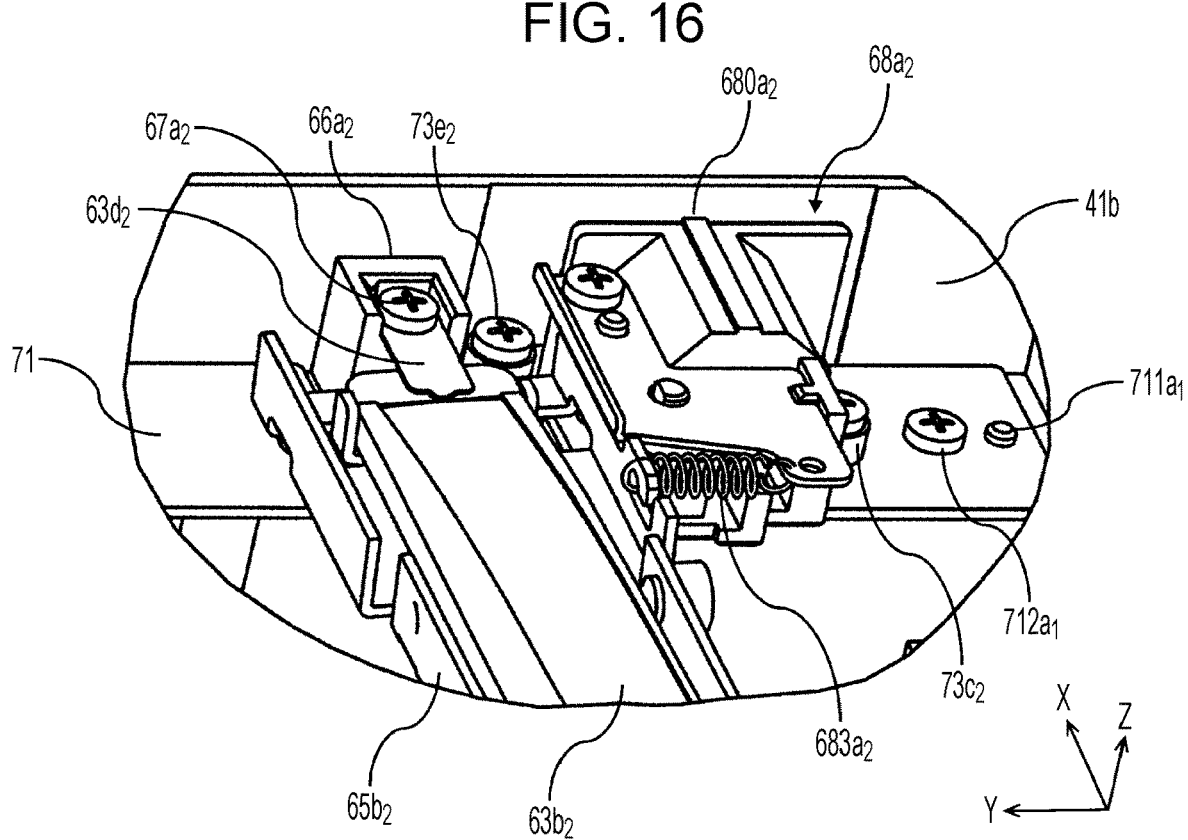
FIG. 16 is an explanatory diagram of when the Fθ second lens holding unit, which has the Fθ second lens, and the lens adjustment unit have been provided in the portion depicted in FIG. 13.
Figure 17A:
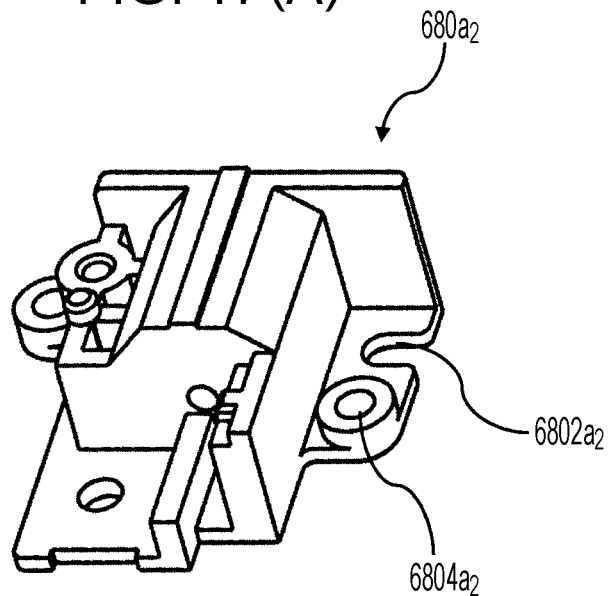
FIG. 17(A) is a perspective view seen from the upper side of a cover.
Figure 17B:
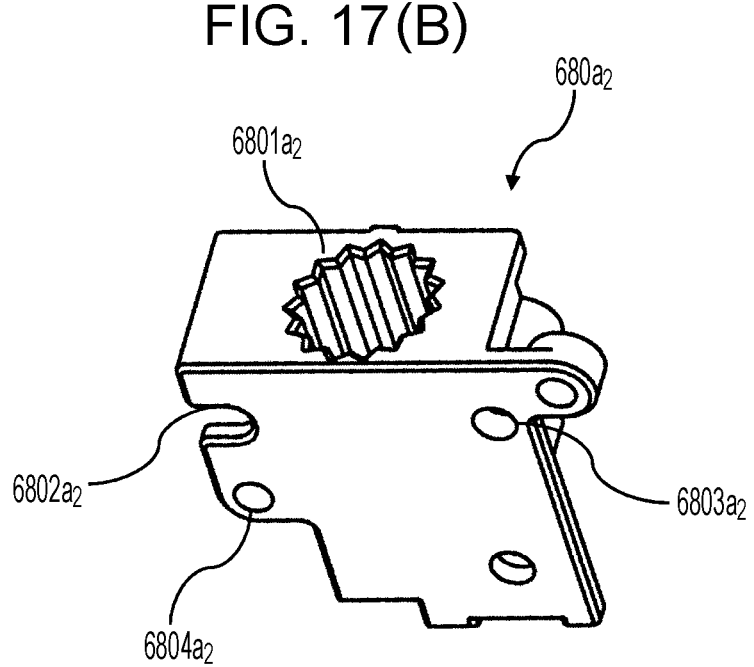
FIG. 17(B) is a perspective view seen from the lower side of the cover.

FIG. 13 is a main-part enlarged perspective view depicting mainly a portion from which the Fθ second lens $63b_2$, the Fθ second lens holding unit $65b_2$, and the lens adjustment member $68a_2$ have been removed from the optical scanning device 11 depicted in FIG. 4. Furthermore, FIG. 14 is an explanatory diagram of when a mechanism of part of the lens adjustment mechanism $68a_2$ that adjusts the Fθ second lens holding unit $65b_2$ has been provided in the portion depicted in FIG. 13. Furthermore, FIG. 15 is an explanatory diagram of when the lens adjustment unit $68a_2$ has been provided in the portion depicted in FIG. 13. Furthermore, FIG. 16 is an explanatory diagram of when the Fθ second lens holding unit $65b_2$, which has the Fθ second lens $63b_2$, and the lens adjustment unit $68a_2$ have been provided in the portion depicted in FIG. 13. Furthermore, FIG. 17(A) is a perspective view in which a cover $680a_2$ is seen from the upper side. Furthermore, FIG. 17(B) is a perspective view in which the cover $680a_2$ is seen from the lower side.

Hereinafter, the lens adjustment member $68a_2$ will be described as an example; however, the same is also true for the other lens adjustment members $68a_3$ and $68a_4$.

As depicted in FIG. 13, the Fθ second lens supporting unit 71 has formed therein the notch section $71b_2$ and the hole sections $711a_2$ and $712a_2$ to respectively allow for the boss $66a_2$ and the protrusions $411e_2$ and $412e_2$ provided on the level difference 41e of the casing 41.

The protrusions $411e_2$ and $412e_2$ have a columnar shape, and, when respectively inserted into the hole sections $711a_2$ and $712a_2$ of the Fθ 2nd lens supporting unit 71, the upper surfaces thereof are in positions higher than the upper surface of the Fθ second lens supporting unit 71.

As depicted in FIG. 14, the lower surface of the Fθ second lens holding unit $65b_2$ holding the Fθ second lens $63b_2$ is placed on the upper surfaces of the columnar-shaped protrusions $411e_2$ and $412e_2$ provided on the level difference 41e of the casing 41.

The lower surface of the Fθ second lens holding unit $65b_2$ makes contact with the upper surfaces of the protrusions $411e_2$ and $412e_2$ at positions higher than the upper surface of the Fθ second lens supporting unit 71, thereby defining the height of the Fθ second lens holding unit $65b_2$, in other words, the Fθ second lens $63b_2$.

Thus, the Fθ second lens holding unit $65b_2$ and the Fθ second lens supporting unit 71 do not make contact.

However, the Fθ second lens supporting unit 71 supports the Fθ second lens holding units $65b_2$, $65b_3$, and $65b_4$, in other words, the Fθ second lenses $63b_2$, $63b_3$, and $63b_4$, with the lens adjustment members $68a_2$, $68a_3$, and $68a_4$ interposed.

Furthermore, the Fθ second lens holding unit $65b_2$ is constantly pressed by an urging member (spring) such as a spring $683a_2$ of FIG. 16, and the Fθ second lens holding unit $65b_2$, in other words, the Fθ second lens $63b_2$, is thereby supported.

The same is also true for the Fθ second lens holding units $65b_3$ and $65b_4$, in other words, the Fθ second lenses $63b_3$ and $63b_4$.

It should be noted that the Fθ second lens supporting unit 71 may support the Fθ second lenses $63b_2$, $63b_3$, and $63b_4$ by making direct contact with the Fθ second lens holding units $65b_2$, $65b_3$, and $65b_4$.

Furthermore, an end section of the Fθ second lens $63b_2$ on the Fθ second lens holding unit $65b_2$ is pressed in the −Z direction by a plate spring $63d_2$.

Furthermore, as depicted in FIG. 14, a cam $682a_2$ is provided at a side section of the Fθ second lens holding unit $65b_2$.

As depicted in FIGS. 14 and 15, a shaft section $681a_2$ and the cam $682a_2$ are provided inside the cover $680a_2$, and a tip end of the shaft section $681a_2$ abuts one X direction end of the cam $682a_2$.

The shaft section $681a_2$ has an end section that can manually rotate about a shaft, and a male screw and a female screw are formed between the shaft section $681a_2$ and the cover $680a_2$ in such a way that the shaft section $681a_2$ advances in the −X direction when the end section is rotated clockwise.

The cam $682a_2$, which is pressed in the −X direction by the tip end of the shaft section $681a_2$, rotates clockwise about a Z direction shaft, and presses the side section of the Fθ second lens holding unit $65b_2$ in the Y direction.

The shaft section $681a_2$ can be inserted via a hole section $41b_2$ formed in the side plates 41b of the casing 41, and be rotated by a driver from outside of the casing 41.

The shaft section $681a_2$ and the cam $682a_2$ are provided inside the cover $680a_2$, and the lens adjustment member $68a_2$ is constituted.

The lens adjustment member $68a_2$ is fixed to the Fθ second lens supporting unit 71 by a screw $73c_2$.

As depicted in FIG. 16, the spring $683a_2$ is provided between the lens adjustment member $68a_2$ and the side section of the Fθ second lens holding unit $65b_2$. In FIG. 16, the Fθ second lens holding unit $65b_2$ is constantly urged in the −Y direction by the spring $683a_2$, and enters a state of constantly abutting the cam $682a_2$ of FIG. 14, and therefore rattling in the ±Y direction of the Fθ second lens holding unit $65b_2$ is prevented. Thus, the position adjusted by the shaft section $681a_2$ can be ensured.

As depicted in FIGS. 17(A) and (B), the cover $680a_2$ has a hole section $6801a_2$ for inserting the shaft section $681a_2$, a notch section $6802a_2$ and a hole section $6803a_2$ into which the protrusions $71d_2$ and $71e_2$ provided on the level difference $41d$ of the casing 41 are respectively fitted, and a hole section $6804a_2$ for inserting the screw $73c_2$.

Figure 18:
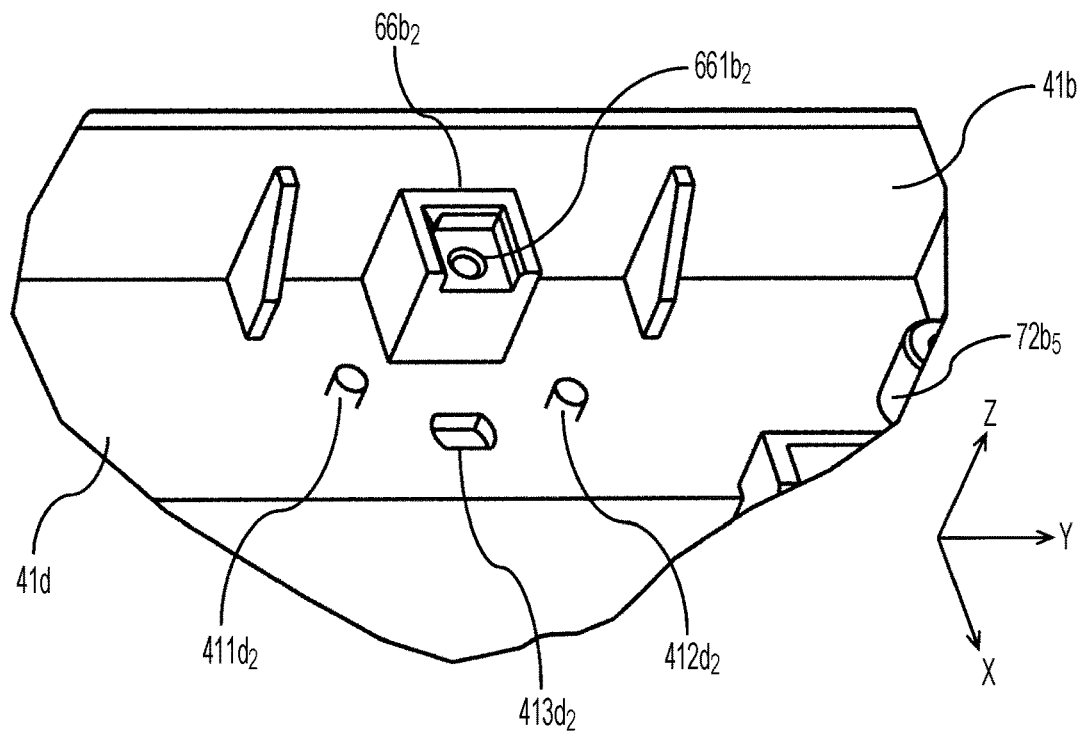
FIG. 18 is a main-part enlarged perspective view depicting mainly a portion from which an Fθ second lens holding unit has been removed from the optical scanning device depicted in FIG. 4.
Figure 19:
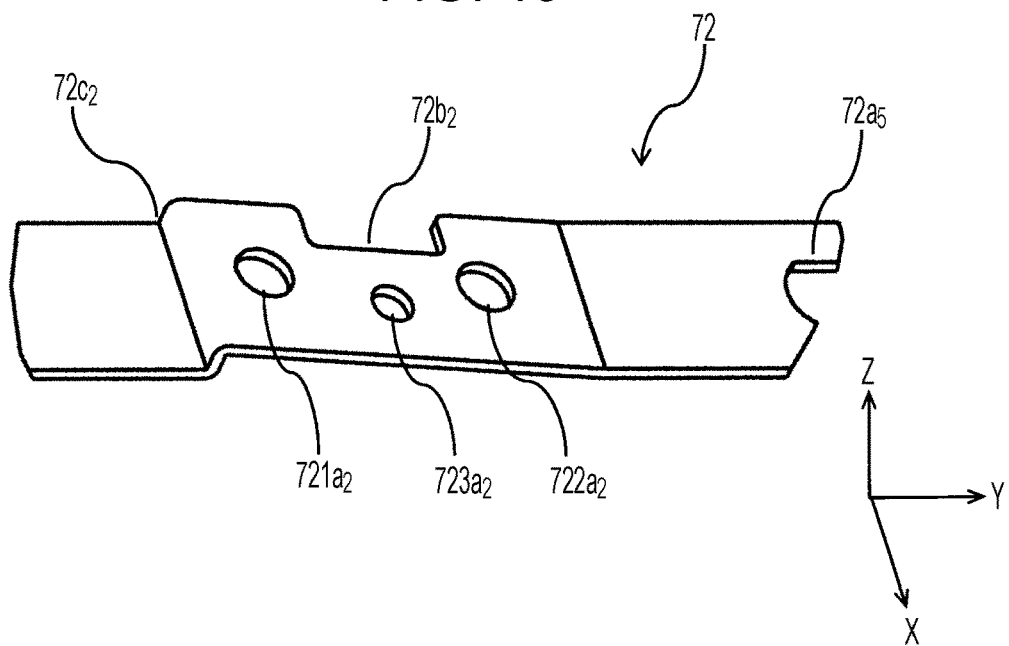
FIG. 19 is a main-part enlarged perspective view depicting a portion of the Fθ second lens holding unit that corresponds to FIG. 18.
Figure 20:
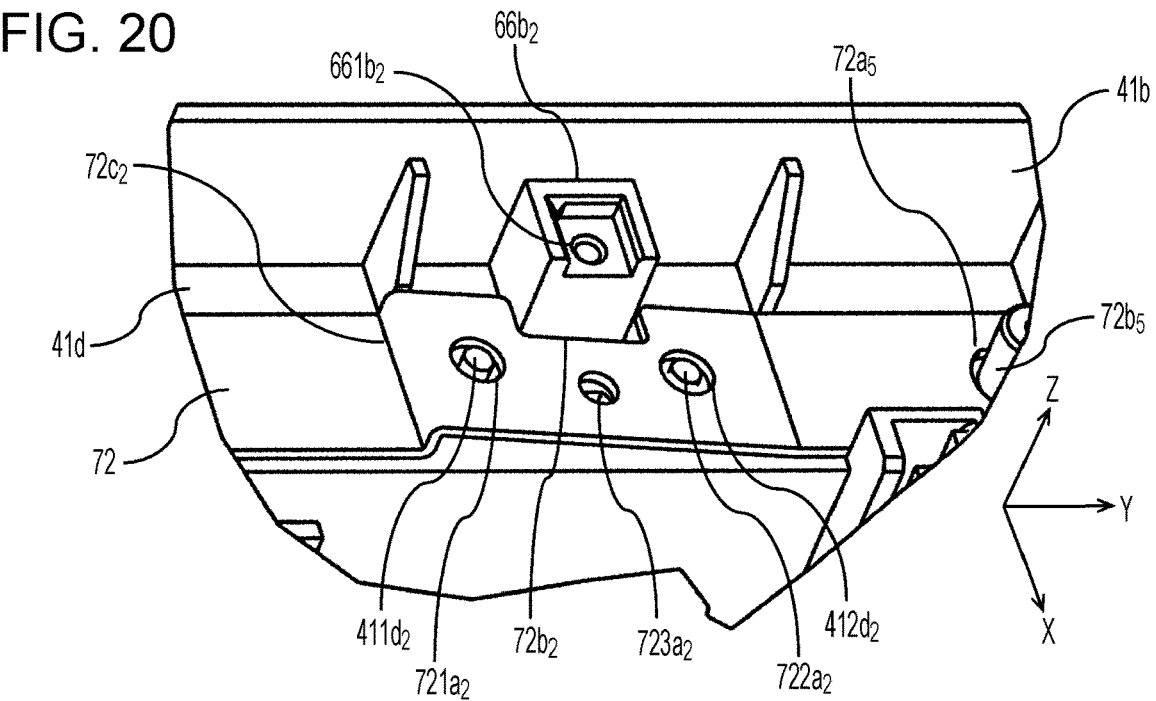
FIG. 20 is an explanatory diagram of when the portion of the Fθ second lens holding unit of FIG. 19 has been provided in the portion depicted in FIG. 18.

FIG. 18 is a main-part enlarged perspective view depicting mainly a portion from which the Fθ second lens supporting unit 72 has been removed from the optical scanning device 11 depicted in FIG. 4. Furthermore, FIG. 19 is a main-part enlarged perspective view depicting a portion of the Fθ second lens supporting unit 72 that corresponds to FIG. 18. Furthermore, FIG. 20 is an explanatory diagram of when the portion of the Fθ second lens supporting unit 72 of FIG. 19 has been provided in the portion depicted in FIG. 18.

As illustrated in FIG. 8, the hole sections $721a_2$ and $722a_2$ of the Fθ second lens supporting unit 72 are relief holes to respectively allow for protrusions $411d_2$ and $412d_2$ provided on the level difference $41d$ of the casing 41.

The protrusions $411d_2$ and $412d_2$ have a columnar shape, and have upper surfaces in positions higher than the upper surface of the Fθ second lens supporting unit 72. Furthermore, in accordance with the inclination of the Fθ second lens supporting unit 72, the upper surface of the protrusion $411d_2$ is in a position higher than the upper surface of the protrusion $412d_2$.

Figure 21A:
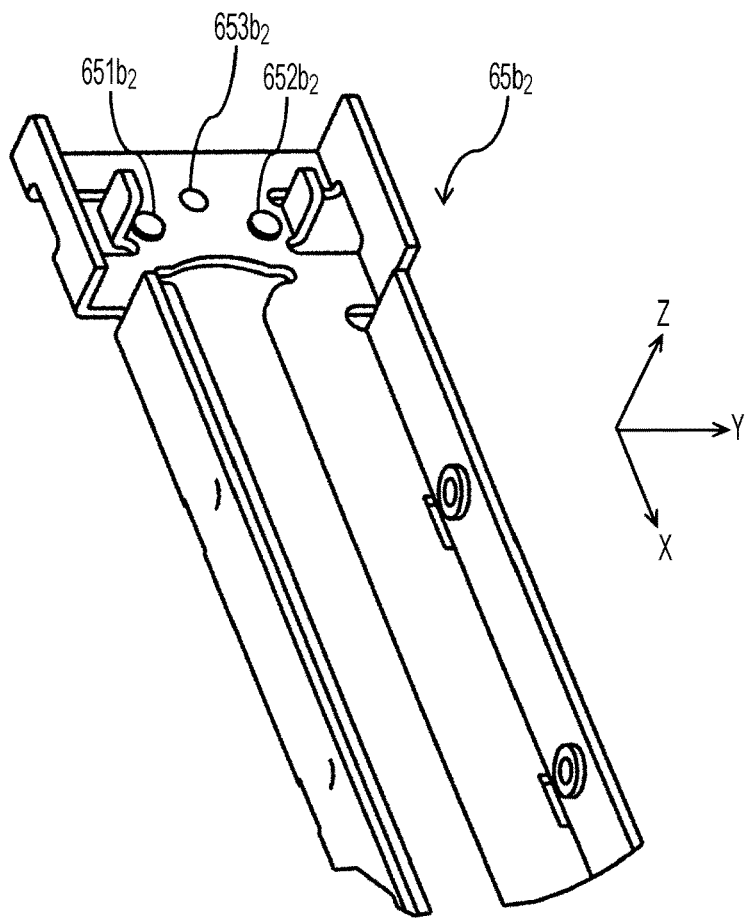
FIG. 21(A) is a main-part enlarged perspective view in which an Fθ second lens holding unit $65b_2$ depicted in FIG. 4 is seen from the upper side.
Figure 21B:
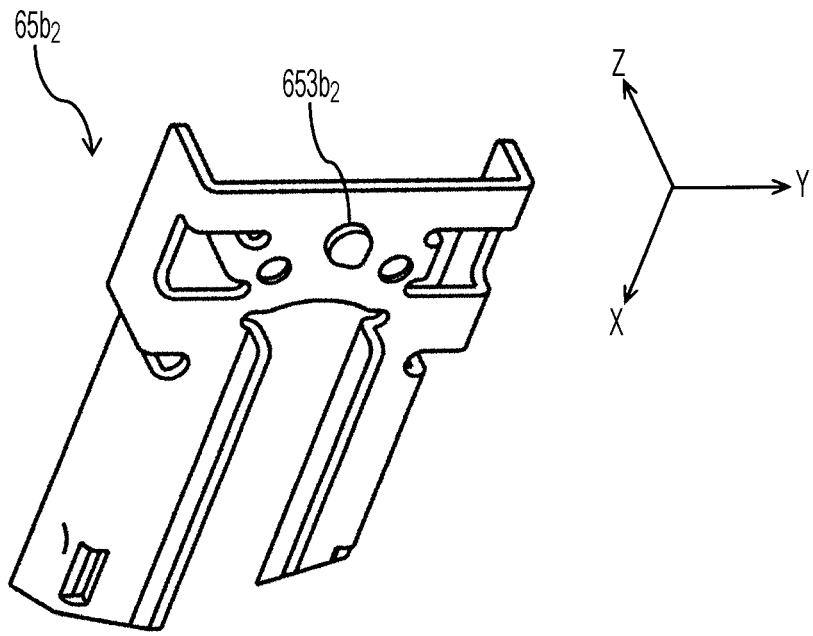
FIG. 21(B) is a main-part enlarged perspective view in which the Fθ second lens holding unit $65b_2$ depicted in FIG. 4 is seen from the lower side.

FIG. 21(A) is a main-part enlarged perspective view in which the Fθ second lens holding unit $65b_2$ depicted in FIG. 4 is seen from the upper side. FIG. 21(B) is a main-part enlarged perspective view in which the Fθ second lens holding unit $65b_2$ depicted in FIG. 4 is seen from the lower side.

As depicted in FIGS. 21(A) and (B), the lower surface of the Fθ second lens holding unit $65b_2$ having a projecting section $653b_3$ provided thereon makes contact with the upper surfaces of the protrusions $411d_2$ and $412d_2$ that are in positions higher than the upper surface of the Fθ second lens supporting unit 72, thereby defining the height of the Fθ second lens holding unit $65b_2$, in other words, the Fθ second lens $63b_2$. Thus, the Fθ second lens holding unit $65b_2$ and the Fθ second lens supporting unit 72 do not make contact.

However, a projecting section $653b_2$ is provided on the −Z direction surface of the Fθ second lens holding unit $65b_2$, and the hole section $723a_2$ in the Fθ second lens supporting unit 72 is a hole section for positioning a projecting section $723b_2$.

Thus, the Fθ second lens supporting unit 72 supports the Fθ second lens holding unit $65b_2$, in other words, the Fθ second lens $63b_2$.

The same is also true for the hole sections $721a_3$, $722a_3$, and $723a_3$ and the hole sections $721a_2$, $722a_2$, and $723a_2$ of the Fθ second lens supporting unit 72.

<<Example of Comparison with Prior Art>>

Next, an example of a comparison with the prior art will be described based on FIG. 22.

Figure 22A:
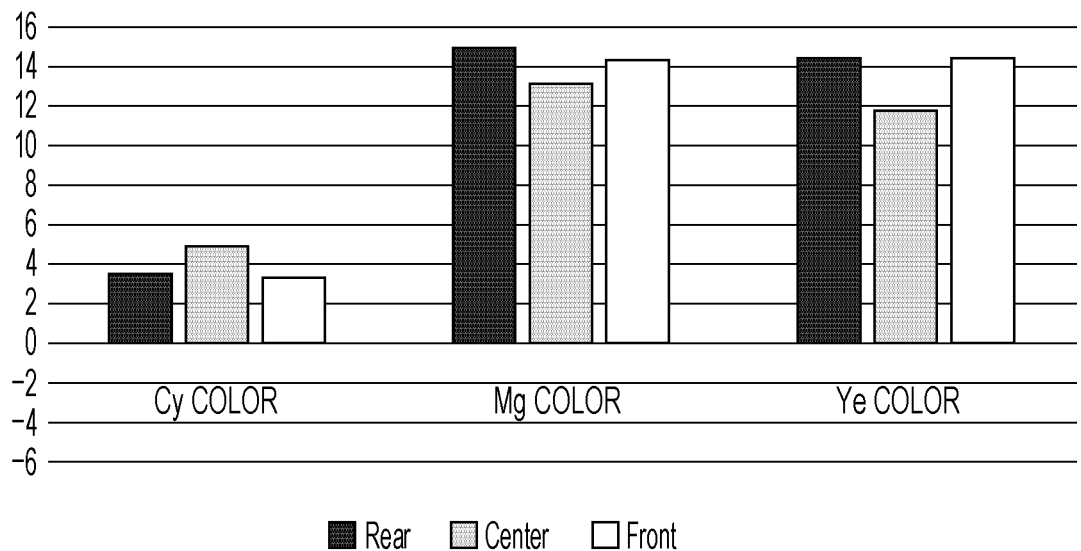
FIG. 22(A) is a graph of experiment results indicating the amount of color deviation for each color of cyan, magenta, and yellow in a sub-scanning direction for an optical scanning device of the prior art.
Figure 22B:
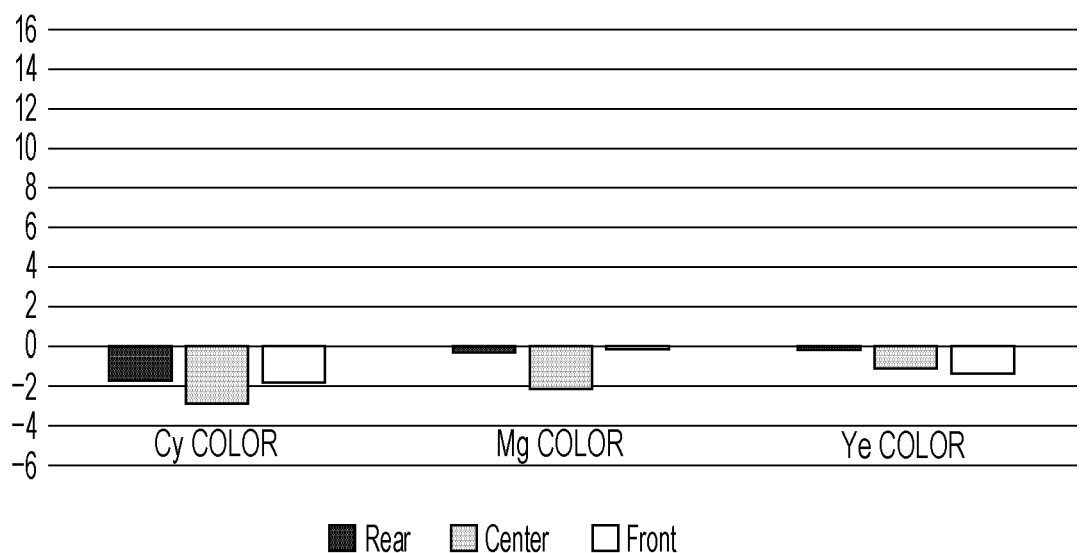
FIG. 22(B) is a graph of experiment results indicating the amount of color deviation for each color of cyan, magenta, and yellow in a sub-scanning direction for an optical scanning device according to embodiment 1 of this invention.

FIGS. 22(A) and (B) are graphs of experiment results indicating the amount of color deviation for each color of cyan, magenta, and yellow in the Y direction respectively for the optical scanning device 11 of the prior art and the optical scanning device 11 according to embodiment 1 of this invention.

These graphs indicate the amount of color deviation (μm/deg.) at the rear, center, and front of the optical scanning device 11 in the Y direction for each color of cyan (Cy), magenta (Mg), and yellow (Ye) from the left side of the horizontal axis.

It should be noted that these amounts of color deviation indicate relative differences in the amount of color deviation from the amount of color deviation for black (K).

As is clear from these graphs, the amount of color deviation in the Y direction in the optical scanning device 11 of embodiment 1 of this invention has been reduced by approximately 80% from the amount of color deviation in the Y direction in the optical scanning device 11 of the prior art.

In this way, by using the Fθ second lens supporting units 71 and 72, the amount of color deviation is greatly reduced, and therefore it becomes easy to increase the precision of electronic correction for color deviation.

Thus, even in a case where size of the casing 41 is large or a case where a heater for condensation prevention is provided, an optical scanning device 11 having high precision for color deviation correction can be realized.

Embodiment 2

Next, an optical scanning device 11 according to embodiment 2 of this invention will be described based on FIG. 23.

Figure 23:
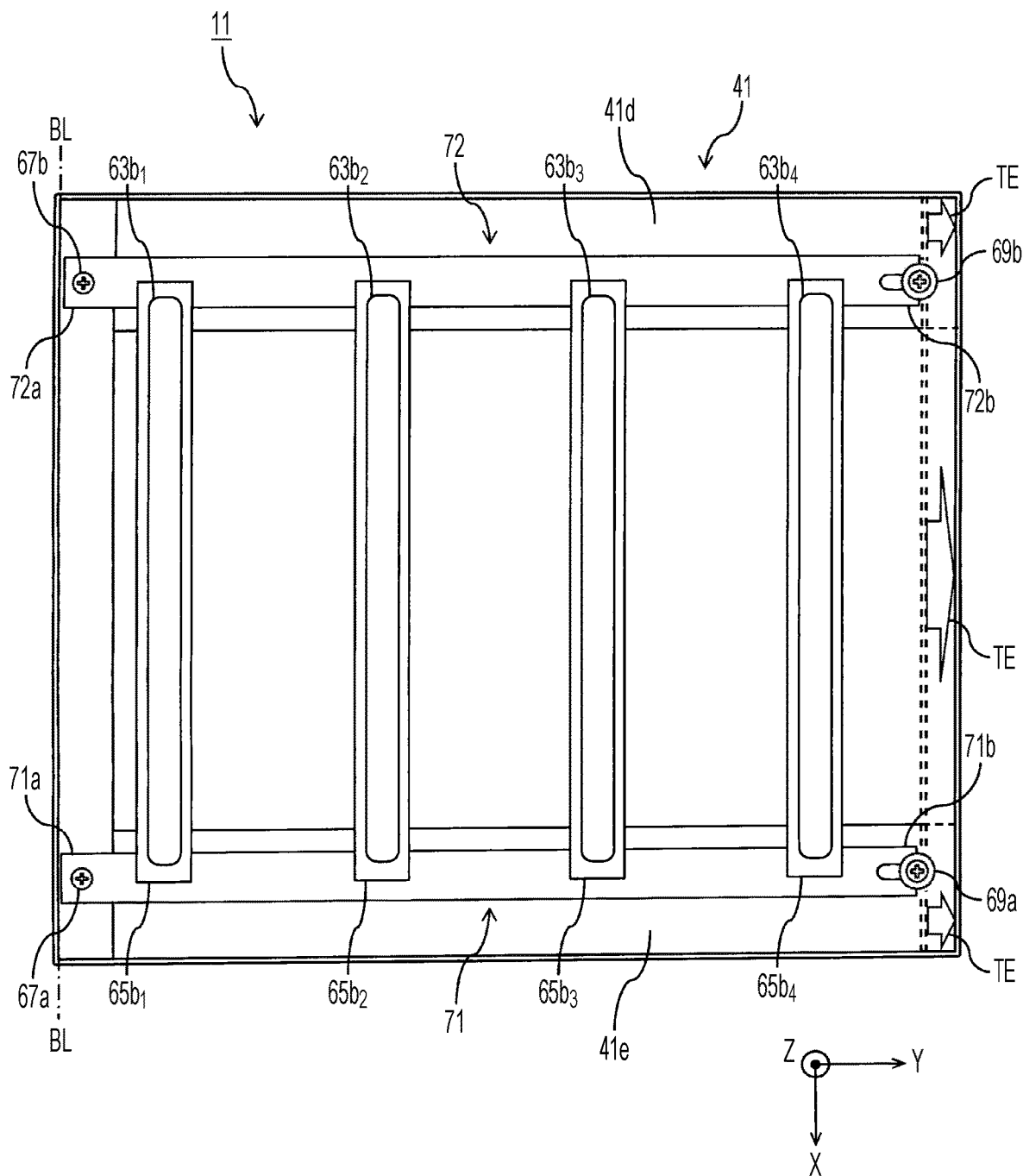
FIG. 23 is a schematic plan view of after thermal expansion of an optical scanning device according to embodiment 2 of this invention.

FIG. 23 is a schematic plan view of after thermal expansion of the optical scanning device 11 according to embodiment 2 of this invention.

The optical scanning device 11 according to embodiment 2 is different from the optical scanning device 11 according to embodiment 1 in that not only the Fθ second lenses $63b_2$, $63b_3$, and $63b_4$ but also the Fθ second lens $63b_1$ is provided on the Fθ second lens supporting units 71 and 72.

Thus, the Fθ second lenses $63b_1$, $63b_2$, $63b_3$, and $63b_4$ are all provided on the Fθ second lens supporting units 71 and 72, and therefore positioning becomes easy, and it becomes easy to predict the amount of color deviation caused by thermal expansion.

Embodiment 3

Next, an optical scanning device 11 according to embodiment 3 of this invention will be described based on FIG. 24.

Figure 24:
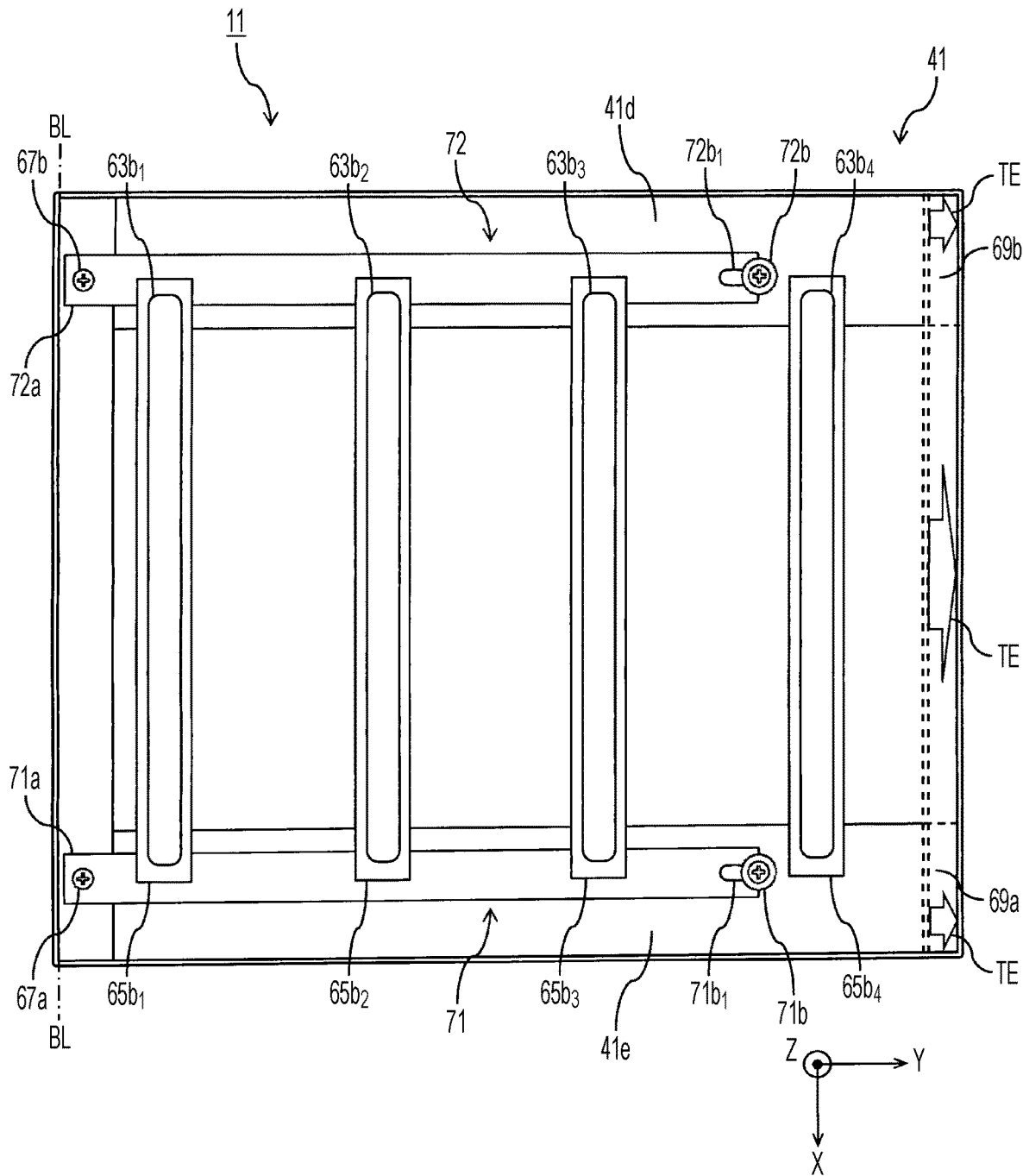
FIG. 24 is a schematic plan view of after thermal expansion of an optical scanning device according to embodiment 3 of this invention.

FIG. 24 is a schematic plan view of after thermal expansion of the optical scanning device 11 according to embodiment 3 of this invention.

The optical scanning device 11 according to embodiment 3 is different from the optical scanning devices 11 according to embodiment 1 and embodiment 2 in that the Fθ second lenses $63b_1$, $63b_2$, and $63b_3$ are provided on the Fθ second lens supporting units 71 and 72, and the Fθ second lens $63b_4$ is not provided on the Fθ second lens supporting units 71 and 72.

The problem of color deviation when printing a color image that does not use black is caused by color deviation of each color of yellow, magenta, and cyan, which are three primary colors that make up the image, and therefore, by providing the Fθ second lens $63b_1$, $63b_2$, and $63b_3$ corresponding to these colors on the Fθ second lens supporting units 71 and 72, color deviation caused by thermal expansion of the casing 41 can be reduced.

Embodiment 4

Furthermore, the Fθ second lens $63b_1$ that is closest to the baseline BL and is least affected by thermal expansion of the casing 41 may be excluded, and only the two Fθ second lenses $63b_2$ and $63b_3$ may be provided on the Fθ second lens supporting units 71 and 72.

Thus, the lengths of the Fθ second lenses $63b_2$ and $63b_3$ can be shortened compared to the optical scanning devices 11 according to embodiments 1 and 2 while reducing the effect of color deviation caused by thermal expansion, and therefore cost can be further suppressed.

Embodiment 5

Next, an optical scanning device 11 according to embodiment 5 of this invention will be described based on FIG. 25.

Figure 25:
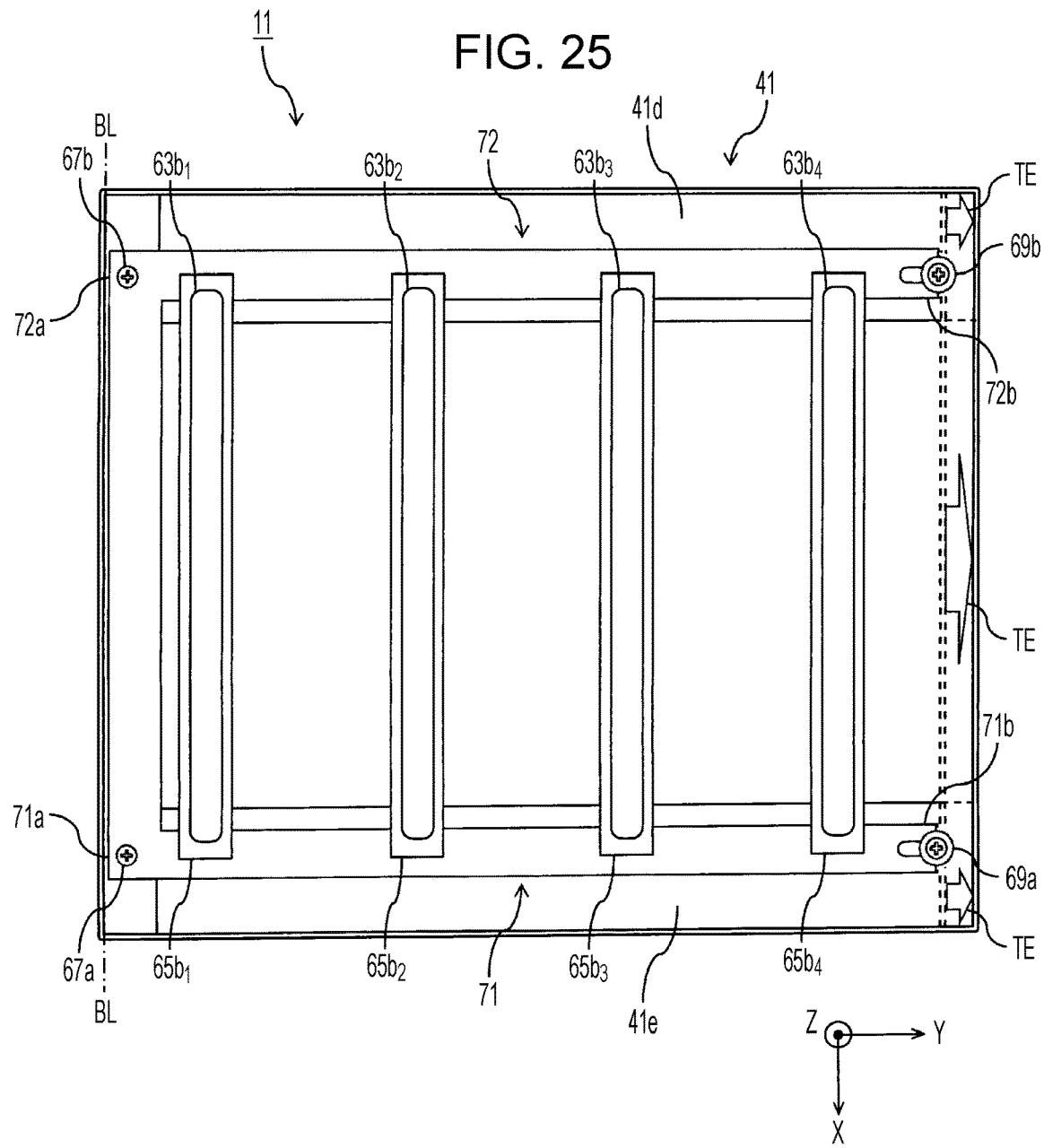
FIG. 25 is a schematic plan view of after thermal expansion of an optical scanning device according to embodiment 5 of this invention.

FIG. 25 is a schematic plan view of after thermal expansion of the optical scanning device 11 according to embodiment 5 of this invention.

As depicted in FIG. 25, the optical scanning device 11 according to embodiment 5 is different from the optical scanning device 11 according to embodiment 1 in that the Fθ second lens supporting units 71 and 72 are connected at the −Y direction end sections 71a and 72a.

Thus, it is possible to realize an optical scanning device 11 that is unlikely to be affected even in a case where the degree of elongation from thermal expansion in the Y direction of the casing 41 is different at both sides of the Fθ second lens supporting units 71 and 72.

Embodiment 6

Next, an example of a sliding (the casing 41 displaces relative to the Fθ second lens supporting unit 71) mechanism of the Fθ second lens supporting unit 71 of the optical scanning device 11 according to embodiment 6 of this invention will be described based on FIG. 26.

Figure 26A:
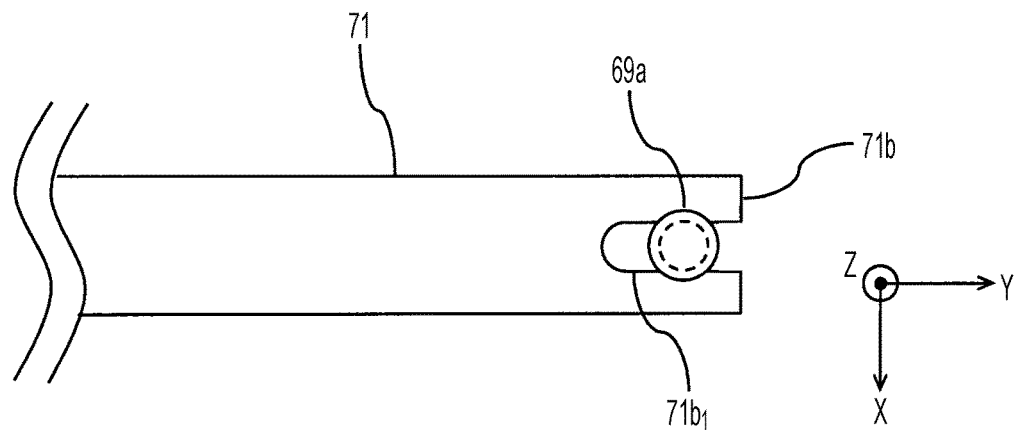
FIG. 26(A) is an explanatory diagram depicting an example of a sliding (displacement) mechanism of the Fθ second lens supporting unit of the optical scanning device according to embodiment 1 of this invention.

FIG. 26(A) is an explanatory diagram depicting an example of the sliding (the casing 41 displaces relative to the Fθ second lens supporting unit 71) mechanism of the Fθ second lens supporting unit 71 of the optical scanning device 11 according to embodiment 1 of this invention. Furthermore, FIG. 26(B) is an explanatory diagram depicting an example of a sliding (the casing 41 displaces relative to the Fθ second lens supporting unit 71) mechanism of the Fθ second lens supporting unit 71 of the optical scanning device 11 according to embodiment 6 of this invention.

As depicted in FIG. 26(A), a notch section $71b_1$ that extends in the Y direction is provided at the end section 71b of the Fθ second lens supporting unit 71, and a spring screw 69a is inserted into the casing 41 through the notch section $71b_1$, and it thereby becomes possible for the Fθ second lens supporting unit 71 to slide in the Y direction (the casing 41 displaces relative to the Fθ second lens supporting unit 71) during thermal expansion of the casing 41 inside the notch section $71b_1$ that extends in the Y direction.

Figure 26B:
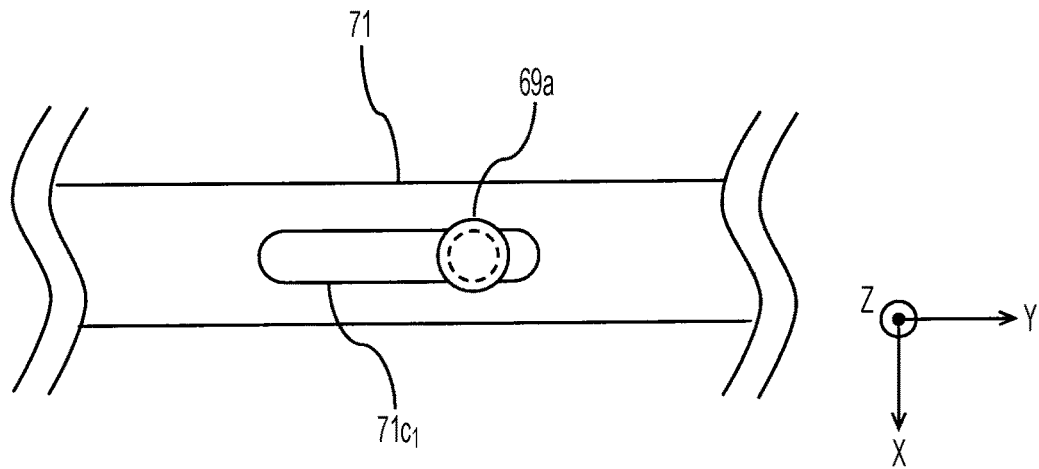
FIG. 26(B) is an explanatory diagram depicting an example of a sliding (displacement) mechanism of an Fθ second lens supporting unit of an optical scanning device according to embodiment 6 of this invention.

Furthermore, as depicted in FIG. 26(B), an elongated hole section $71c_1$ having an elliptical shape that extends in the Y direction is provided in a portion of the Fθ second lens supporting unit 71, and the spring screw 69a is inserted into the casing 41 through the elongated hole section $71c_1$, and it thereby becomes possible for the Fθ second lens supporting unit 71 to slide in the Y direction (the casing 41 displaces relative to the Fθ second lens supporting unit 71) during thermal expansion of the casing 41 inside the elongated hole section that extends in the Y direction.

Thus, deviation in the Y direction of the Fθ second lens supporting unit 71 when the casing 41 thermally expands can be prevented by means of a low cost and simple structure, and it is therefore possible to realize an optical scanning device 11 that reduces the amount of color deviation caused by thermal expansion of the casing 41.

Embodiment 7

Next, an optical scanning device 11 according to embodiment 7 of this invention will be described based on FIGS. 27 to 31.

Figure 27:
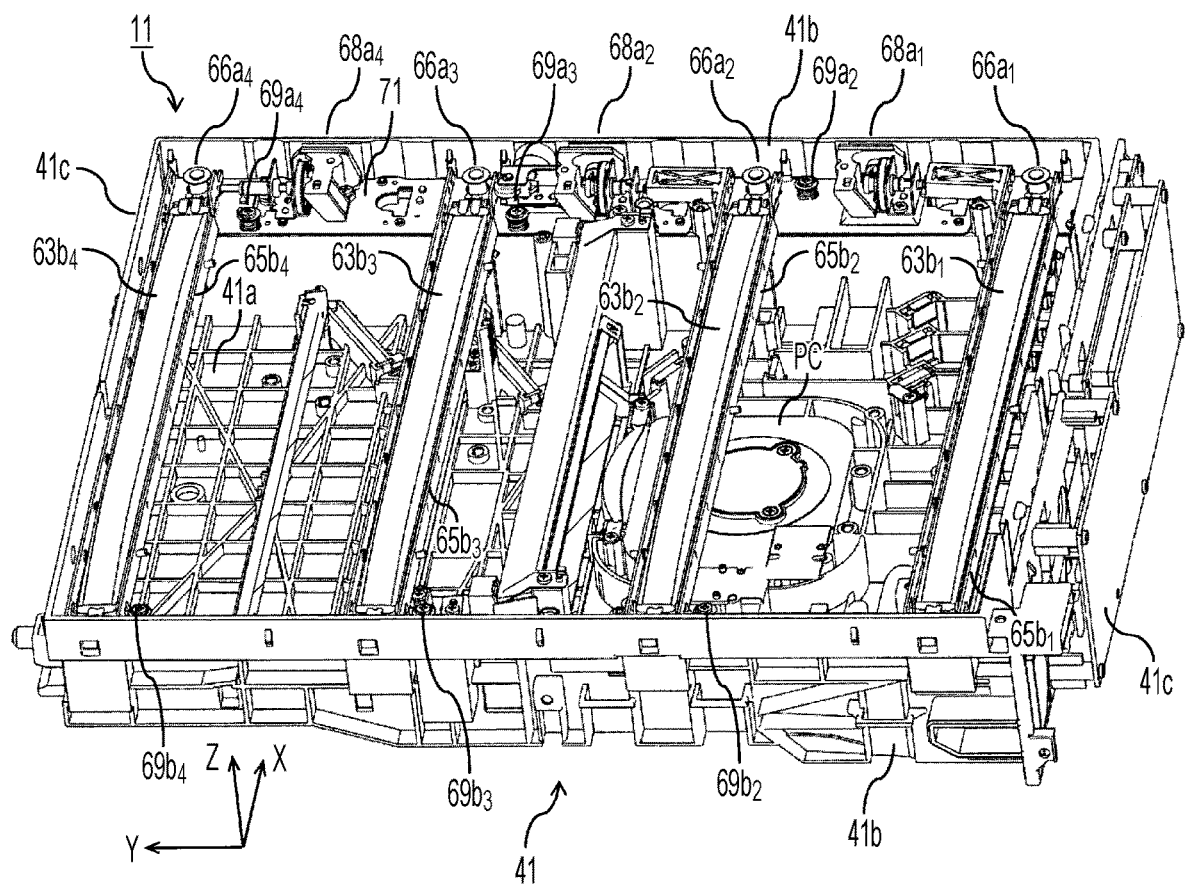
FIG. 27 is a perspective view of the interior of a casing, with an upper lid having been removed, of an optical scanning device according to embodiment 7 of this invention.
Figure 28:
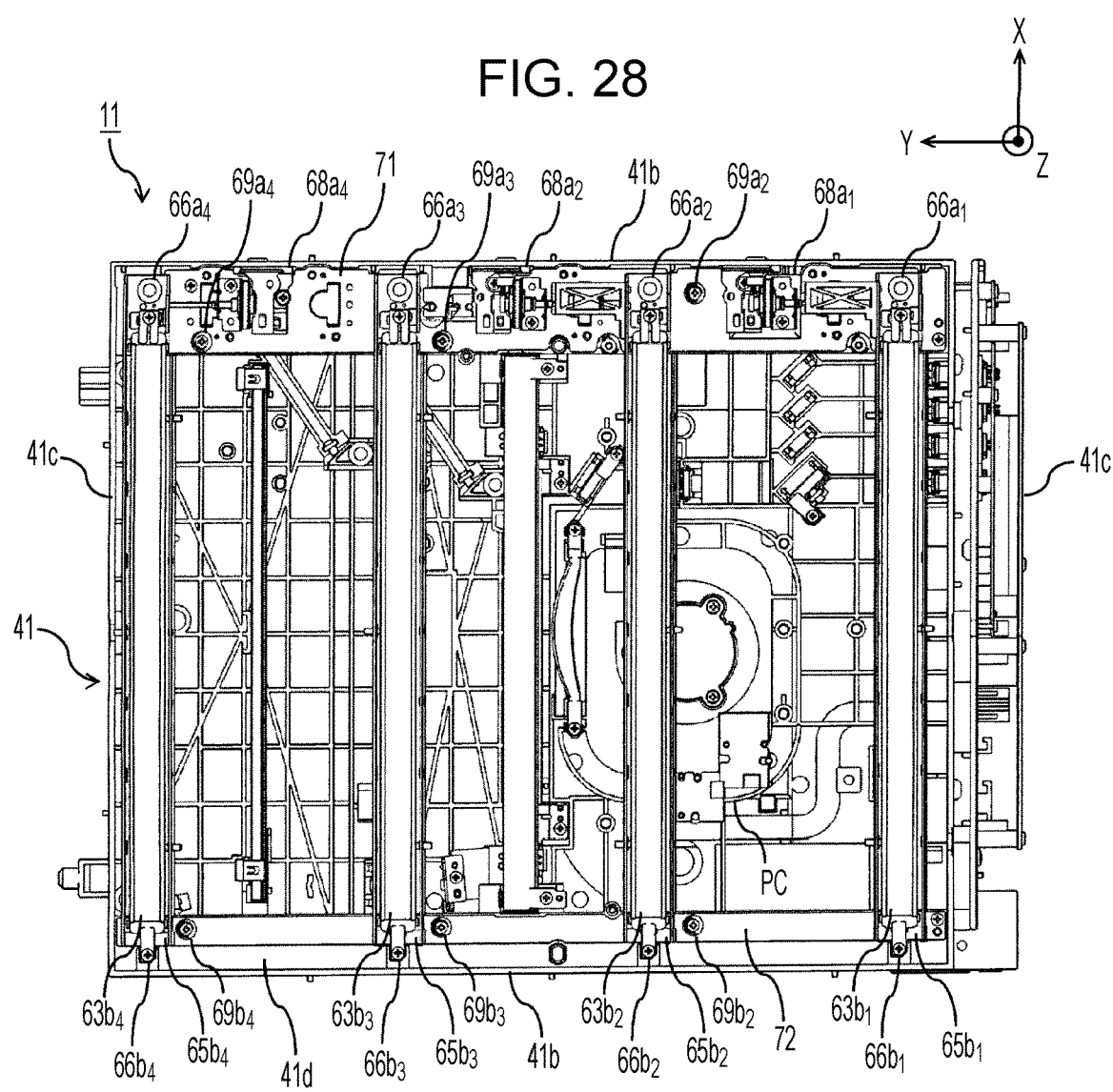
FIG. 28 is a plan view of the optical scanning device depicted in FIG. 27.
Figure 29:
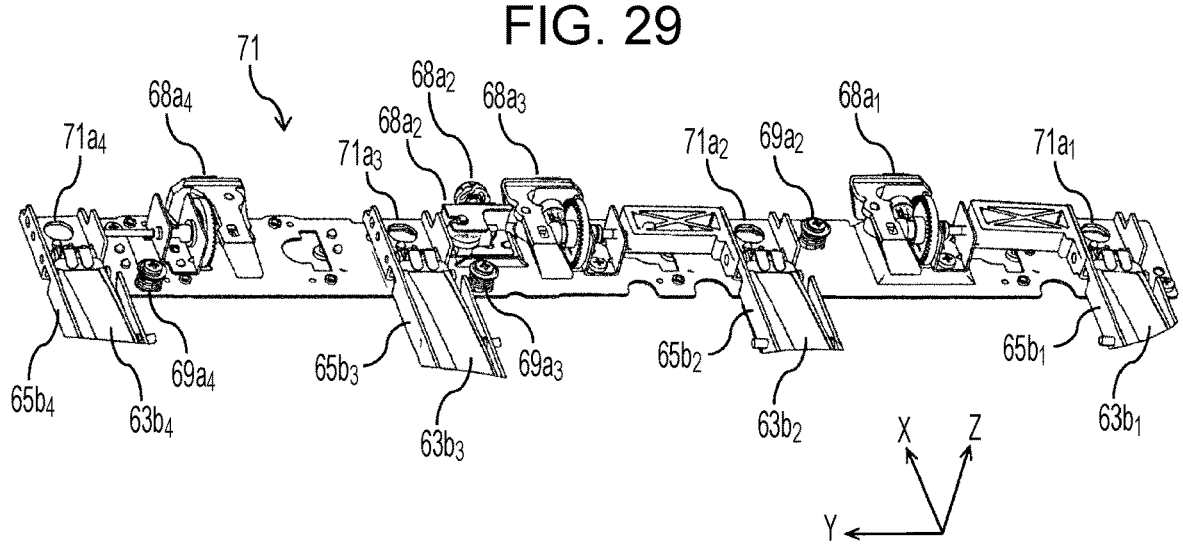
FIG. 29 is a perspective view of an Fθ second lens supporting unit depicted in FIG. 27.
Figure 30:
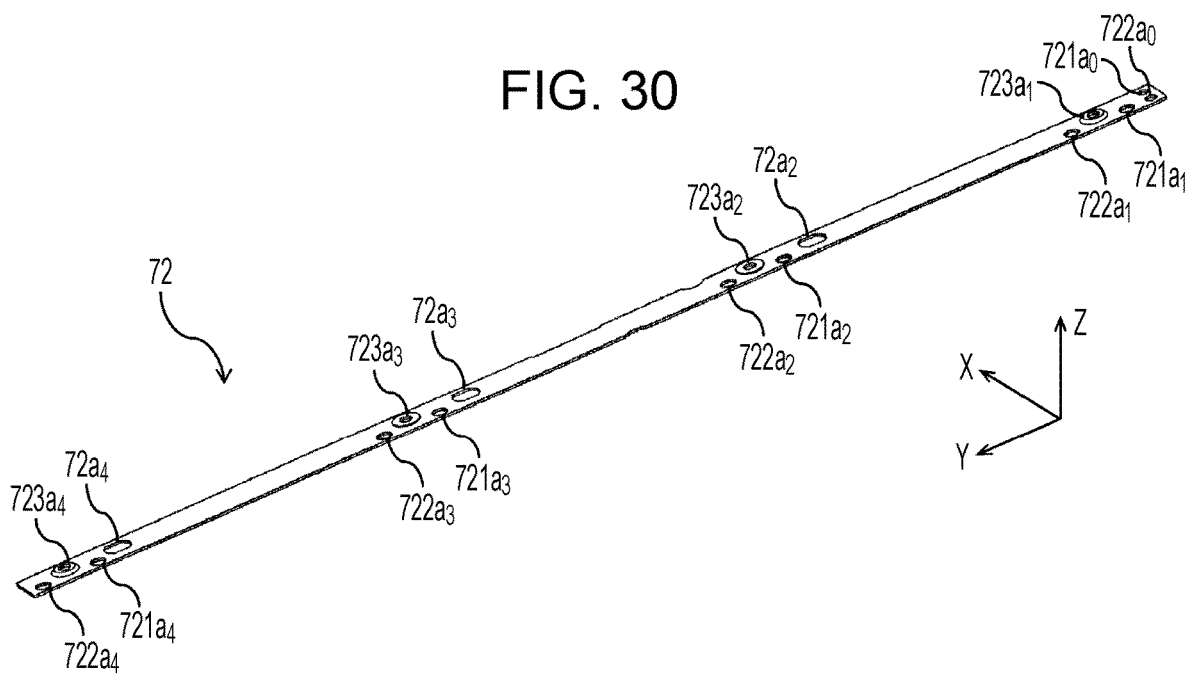
FIG. 30 is a perspective view of the Fθ second lens supporting unit depicted in FIG. 27.

FIG. 27 is a perspective view of the interior of the casing 41, with an upper lid having been removed, of the optical scanning device 11 according to embodiment 7 of this invention. Furthermore, FIG. 28 is a plan view of the optical scanning device 11 depicted in FIG. 27. Furthermore, FIG. 29 is a perspective view of the Fθ second lens supporting unit 71 depicted in FIG. 27. Furthermore, FIG. 30 is a perspective view of the Fθ second lens supporting unit 72 depicted in FIG. 27.

The optical scanning device 11 according to embodiment 7 is different from the optical scanning device 11 according to embodiment 1 in that the four Fθ second lens holding units $65b_1$ to $65b_4$ are all provided on the Fθ second lens supporting units 71 and 72.

Furthermore, as depicted in FIGS. 27 to 31, the Fθ second lens supporting unit 71 is provided with three spring screws $69a_2$, $69a_3$, and $69a_4$ near the Y direction end section and the center, which is different from the optical scanning device 11 according to embodiment 1. The same is also true for the Fθ second lens supporting unit 72.

By providing the spring screws $69a_2$ and $69a_3$ also in positions other than the Y direction end section in this way, it is possible to prevent the Fθ second lens supporting unit 71 from separating from the level difference 41e of the casing 41.

Furthermore, the lower surface of the Fθ second lens holding unit $65b_1$ makes contact with the upper surfaces of protrusions $411e_1$ and $412e_1$, which are not depicted, at positions higher than the upper surface of the Fθ second lens supporting unit 71, thereby defining the height of the Fθ second lens holding unit $65b_1$, in other words, the Fθ second lens $63b_1$. The same is also true for the Fθ second lens holding units $65b_2$ to $65b_4$.

However, the Fθ second lens supporting unit 71 supports each of the Fθ second lens holding units $65b_1$ to $65b_4$, in other words, the Fθ second lenses $63b_1$ to $63b_4$, with the lens adjustment members $68a_1$ to $68a_4$ interposed.

It should be noted that the Fθ second lens supporting unit 71 may support the Fθ second lenses $63b_1$ to $63b_4$ by making direct contact with the Fθ second lens holding units $65b_1$ to $65b_4$.

As depicted in FIG. 29, the four lens adjustment members $68a_1$ to $68a_4$ that respectively adjust the Y direction inclination of the Fθ second lens holding units $65b_1$ to $65b_4$ are provided on the Fθ second lens supporting unit 71.

Furthermore, as depicted in FIG. 30, the Fθ second lens supporting unit 72 has a hole section $721a0$ for fixing a screw to the −Y direction end section 72a.

Furthermore, a boss (protrusion) that positions the Fθ second lens supporting unit is provided on the level difference 41d of the casing 41, and the Fθ second lens supporting unit 72 is positioned by inserting the boss (protrusion) inside a hole section $722a0$.

The hole sections $721a_1$ and $722a_1$ of the Fθ second lens supporting unit 72 are relief holes to respectively allow for protrusions $411d_1$ and $412d_1$ provided on the level difference 41d of the casing 41.

Furthermore, a hole section $723a_1$ is a hole section for positioning a protrusion provided on the lower surface of the Fθ second lens holding unit $65b_1$. Due to this positioning, the Fθ second lens holding unit $65b_1$ is supported by the Fθ second lens supporting unit 72.

The same is also true for the hole sections $721a_2$ to $721a_4$ and $722a_2$ to $722a_4$ and the hole sections $723a_2$ to $723a_4$ of the Fθ second lens supporting unit 72.

Furthermore, the Fθ second lens supporting unit 72 has a hole section $72a_2$ that allows for the protruding section $691b$ of FIG. 10(B) provided on the level difference $41d$ of the casing 41. The Fθ second lens supporting unit 72 is screwed to the protruding section $691b$ by means of the spring screw $69b$ of FIGS. 10(A) and 10(B), and thereby engages with the casing 41.

The hole section $72a_2$ is formed in an elliptical shape in such a way that the protrusion $72b_2$ can slide (the casing 41 displaces relative to the Fθ second lens supporting unit 72) in the Y direction inside the hole section $72a_2$ when the casing 41 expands. The same is also true for other hole sections $72a_3$ and $72a_4$.

It should be noted that the remaining structure of the Fθ second lens supporting units 71 and 72 is similar to the Fθ second lens supporting units 71 and 72 according to embodiment 1 and are therefore not described.

Figure 31A:
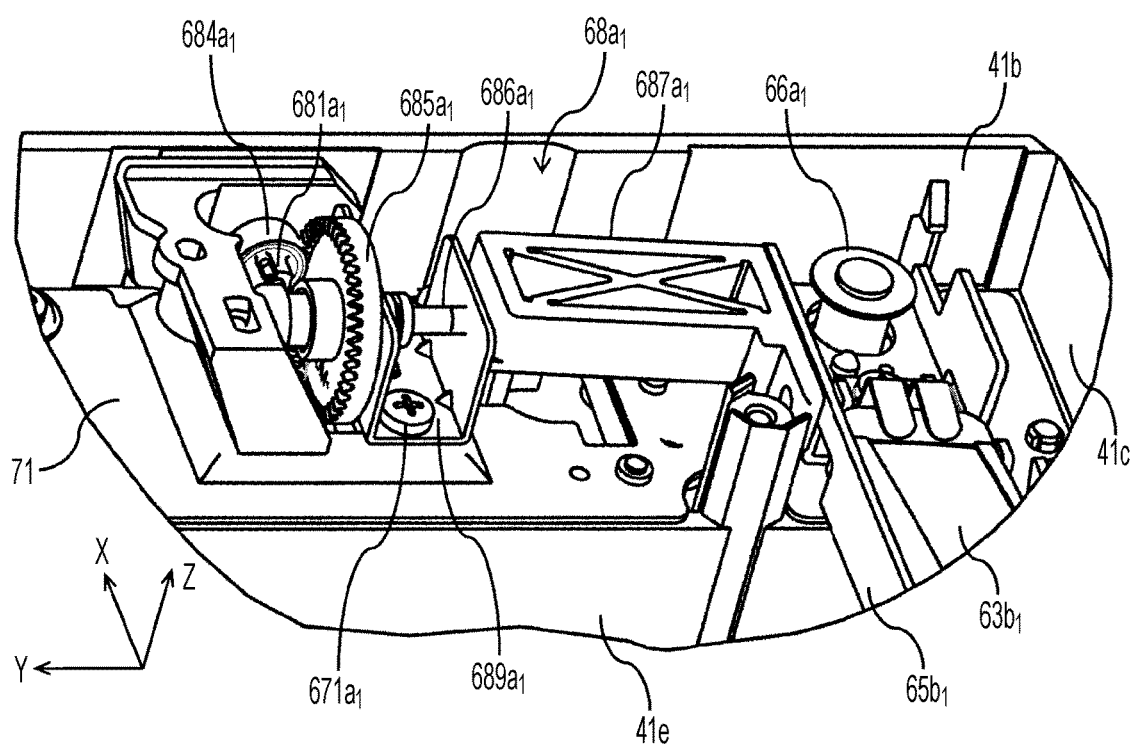
FIG. 31(A) is a partial enlarged view of a lens adjustment member depicted in FIG. 27.
Figure 31B:
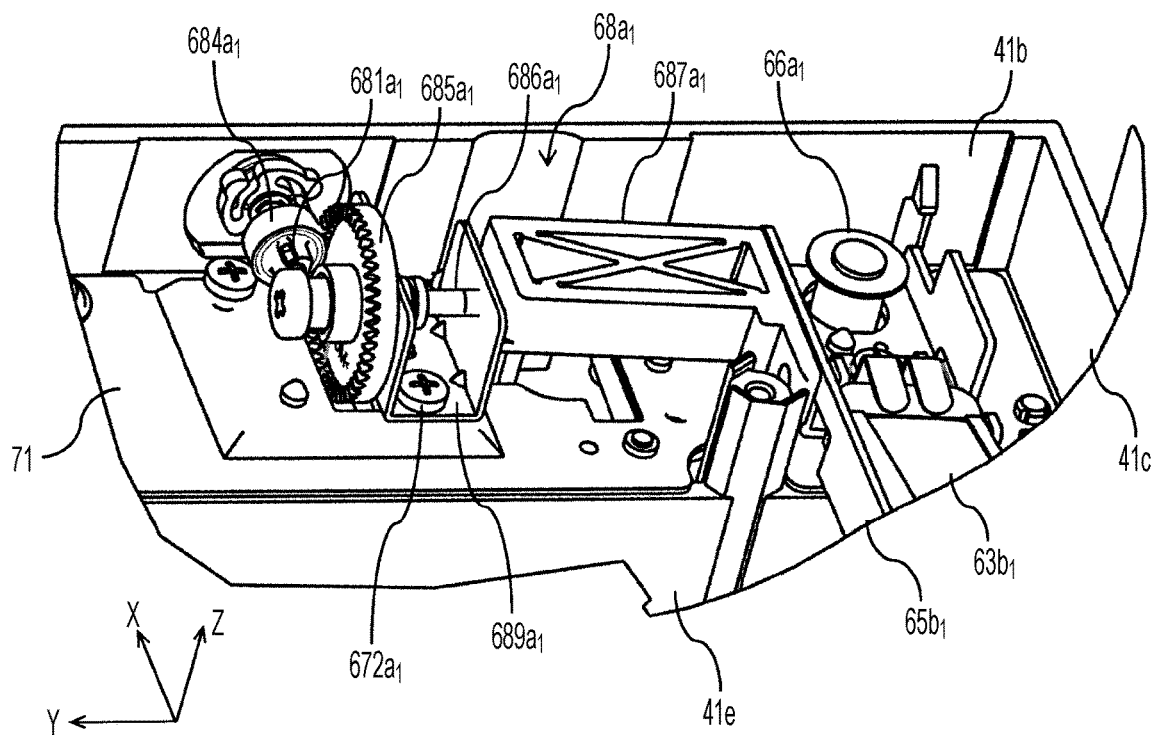
FIG. 31(B) is a partial enlarged view of the lens adjustment member depicted in FIG. 27.

FIG. 31(A) is a partial enlarged view of the lens adjustment member $68a_1$ depicted in FIG. 27. Furthermore, FIG. 31(B) is a partial enlarged view of the lens adjustment member $68a_1$ depicted in FIG. 27.

As depicted in FIGS. 31(A) and (B), when a first shaft section $681a_1$ is manually rotated clockwise in the −X direction, a second gear $685a_1$ which is engaged with a first gear $684a_1$ that is coupled with the first shaft section $681a_1$ rotates clockwise in the −Y direction.

At such time, a second shaft section $686a_1$ advances in the −Y direction and presses a side section of the Fθ second lens holding unit $65b_1$ with a linking member $687a_1$ interposed, and the Fθ second lens holding unit $65b_1$ is thereby inclined in the Y direction.

It should be noted that the lens adjustment method of the lens adjustment member $68a_3$ is similar to that in embodiment 1 and is therefore omitted.

The linking member $687a_1$ is in an adjusted position, and constantly abuts the side section of the Fθ second lens holding unit $65b_1$. In other words, the Fθ second lens holding unit $65b_1$ is constantly pressed by the linking member $687a_1$ due to an urging member (spring) such as the spring $683a_2$ of FIG. 16, for example, which is not depicted.

However, if the lens adjustment member $68a_1$ is provided directly on the casing 41, the entire lens adjustment member $68a_1$ including the linking member $687a_1$ moves when the casing 41 thermally expands, and sometimes the adjustment deviates.

In embodiment 7, in order to avoid this kind of problem, lens adjustment members $68a_1$ to $68a_4$ are provided on the Fθ second lens supporting unit 71. Specifically, as in FIGS. 31(A) and (B), a shaft section holding plate $689a_1$ is fixed to the Fθ second lens supporting unit 71 by a screw $672a_1$.

After the adjustment of the Fθ 2nd lenses $63b_1$ to $63b_4$ by the lens adjustment members $68a_1$ to $68a_4$, even if the temperature of the optical scanning device 11 has risen, the positions of the lens adjustment members $68a_1$ to $68a_4$ do not change, and therefore naturally the positions of the Fθ second lenses $63b_1$ to $63b_4$ also do not change.

Consequently, compared to when provided directly on the casing 41, it becomes unlikely that thermal expansion will have an effect.

Embodiment 8

Next, an optical scanning device 11 according to embodiment 7 of this invention will be described based on FIGS. 32 to 38.

Figure 32:
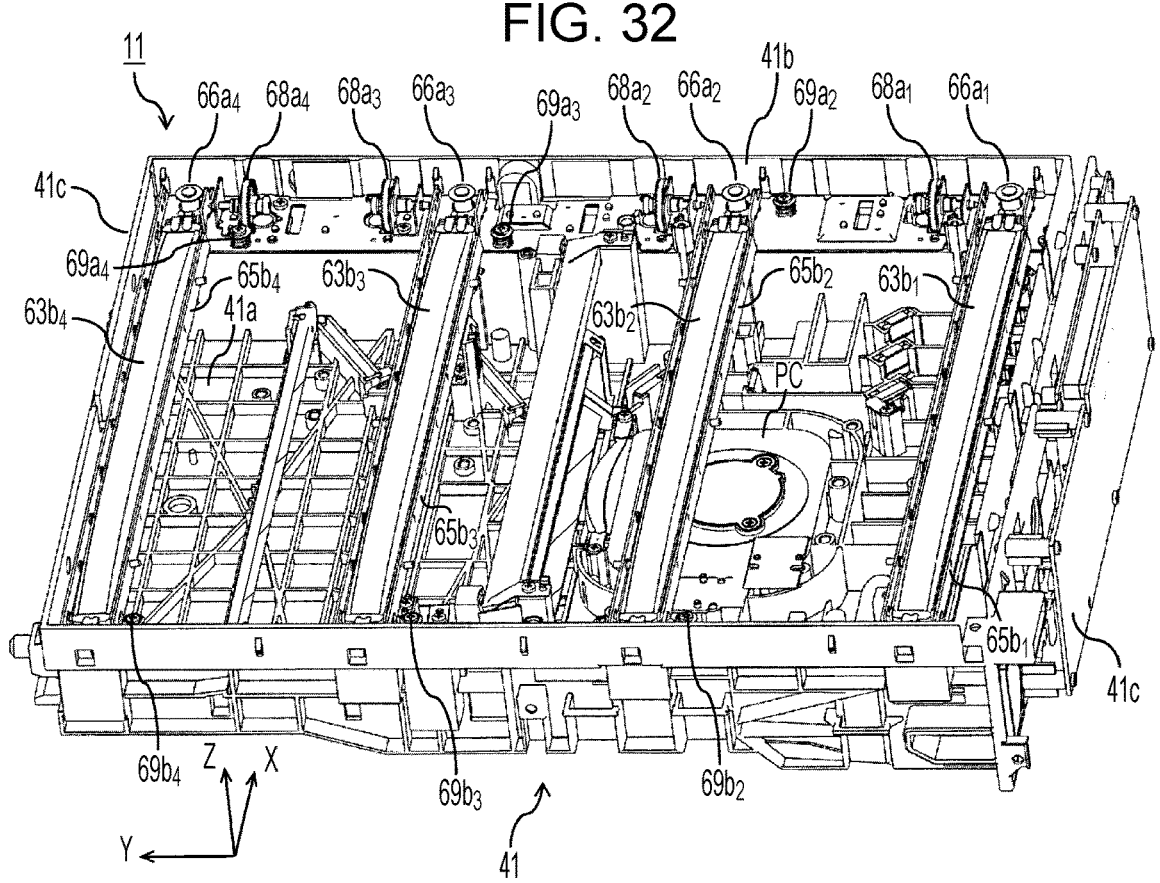
FIG. 32 is a perspective view of the interior of a casing, with an upper lid having been removed, of an optical scanning device according to embodiment 8 of this invention.
Figure 33:
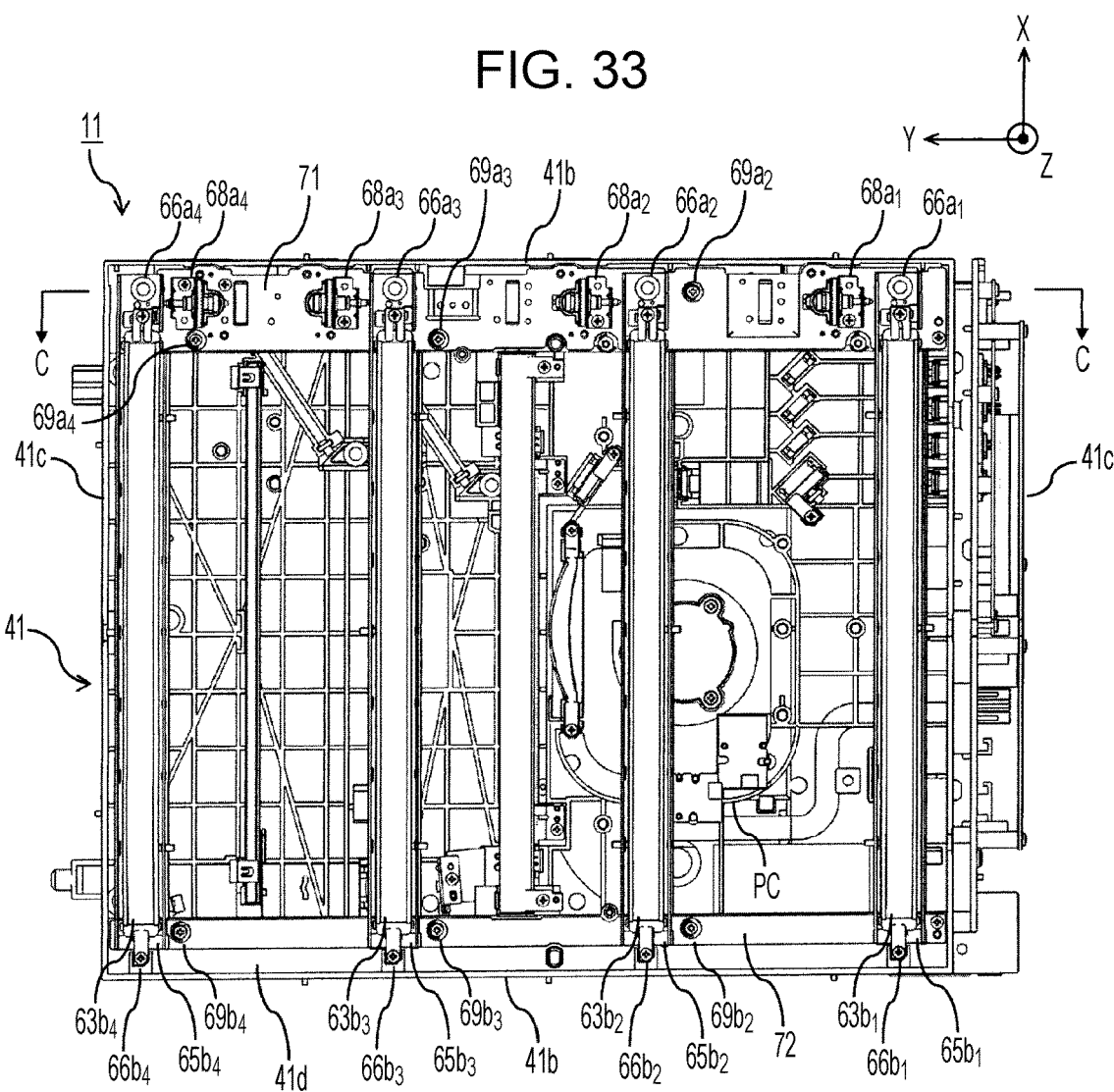
FIG. 33 is a plan view of the optical scanning device depicted in FIG. 32.
Figure 34:
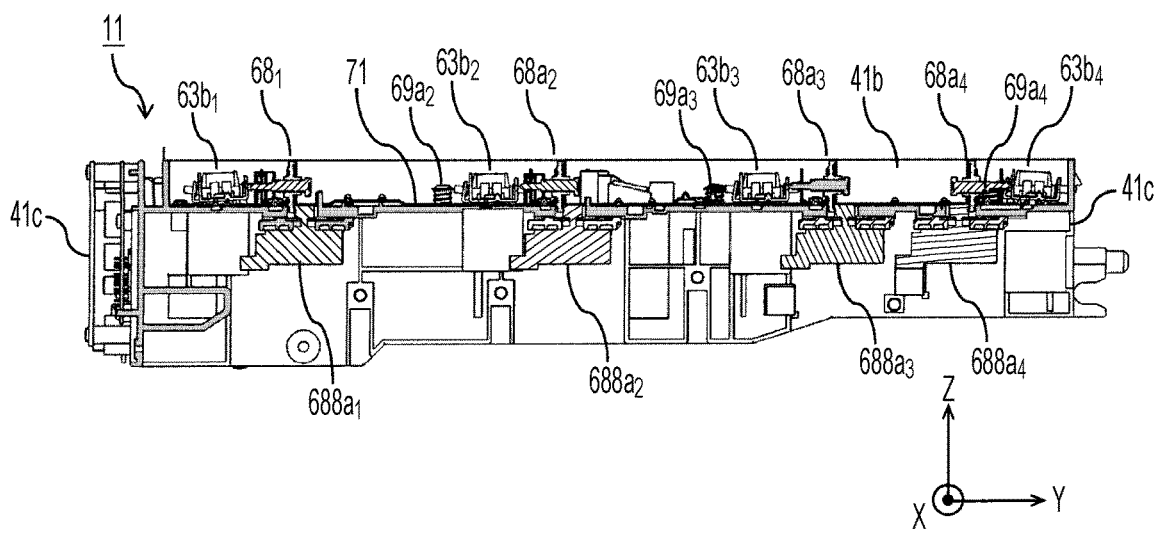
FIG. 34 is a cross-sectional view along arrow C-C of the optical scanning device depicted in FIG. 33.
Figure 35:
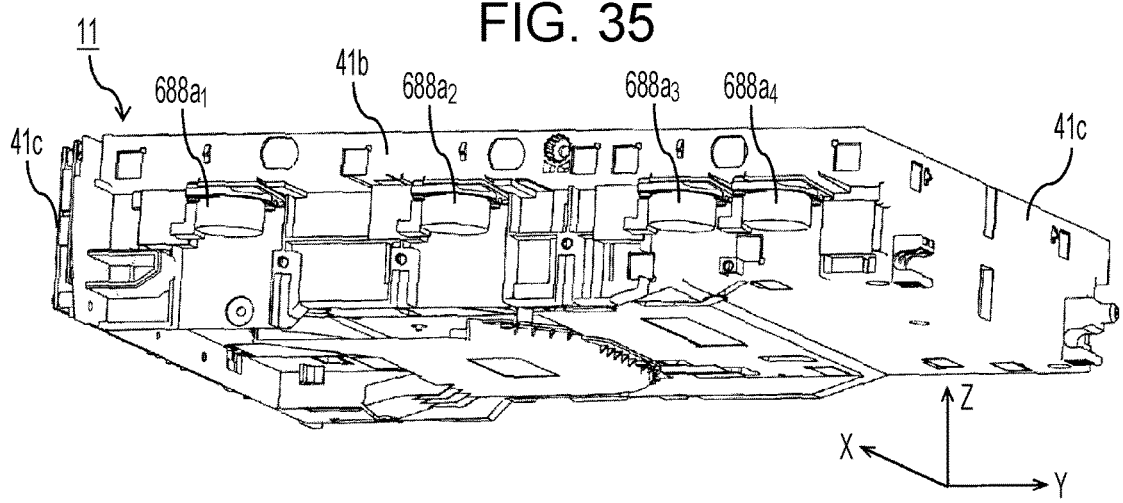
FIG. 35 is a perspective view in which the optical scanning device depicted in FIG. 32 is seen from the lower side.

FIG. 32 is a perspective view of the interior of the casing 41, with an upper lid having been removed, of the optical scanning device 11 according to embodiment 8 of this invention. Furthermore, FIG. 33 is a plan view of the optical scanning device 11 depicted in FIG. 32. Furthermore, FIG. 34 is a cross-sectional view along arrow C-C of the optical scanning device 11 depicted in FIG. 33. Furthermore, FIG. 35 is a perspective view in which the optical scanning device 11 depicted in FIG. 32 is seen from the lower side.

In the optical scanning device 11 according to embodiment 8, the lens adjustment members $68a_1$ to $68a_4$ that adjust the Y direction inclination of the Fθ second lens holding units $65b_1$ to $65b_4$ are provided on the Fθ second lens supporting unit 71.

Figure 36:
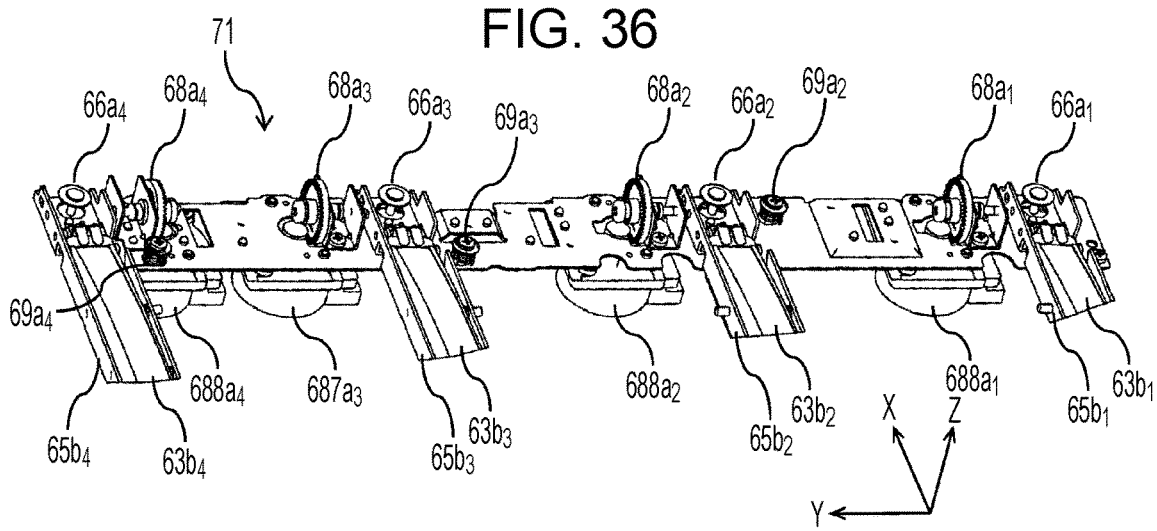
FIG. 36 is a perspective view of the Fθ second lens supporting unit depicted in FIG. 32.
Figure 37:
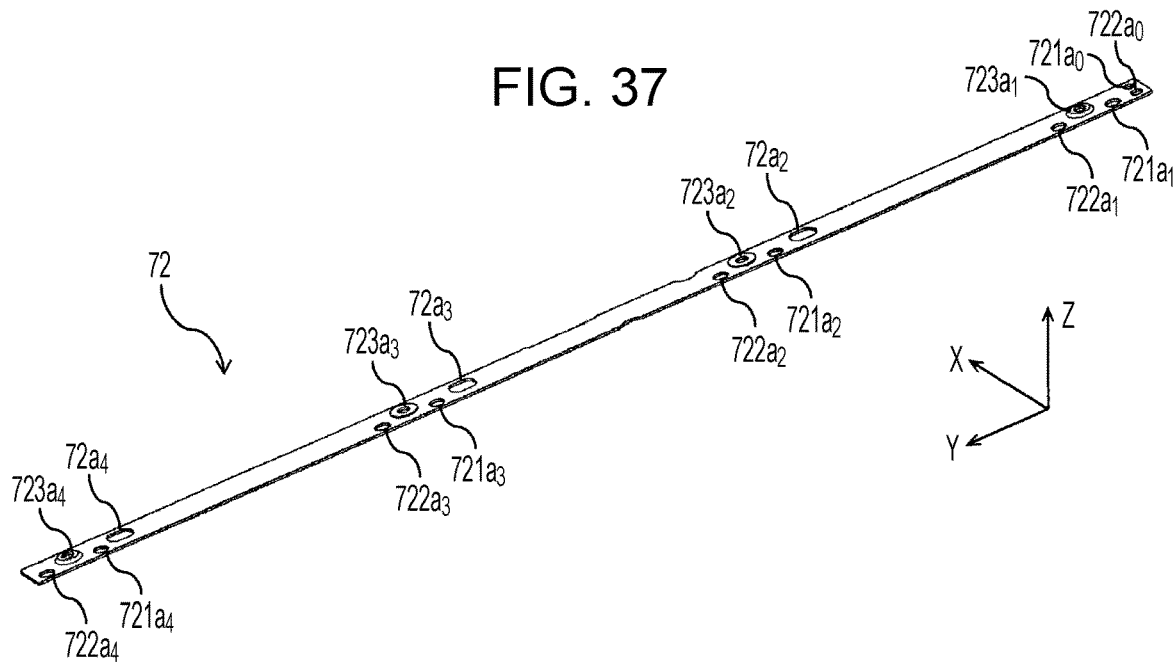
FIG. 37 is a perspective view of the Fθ second lens supporting unit depicted in FIG. 32.
Figure 38A:
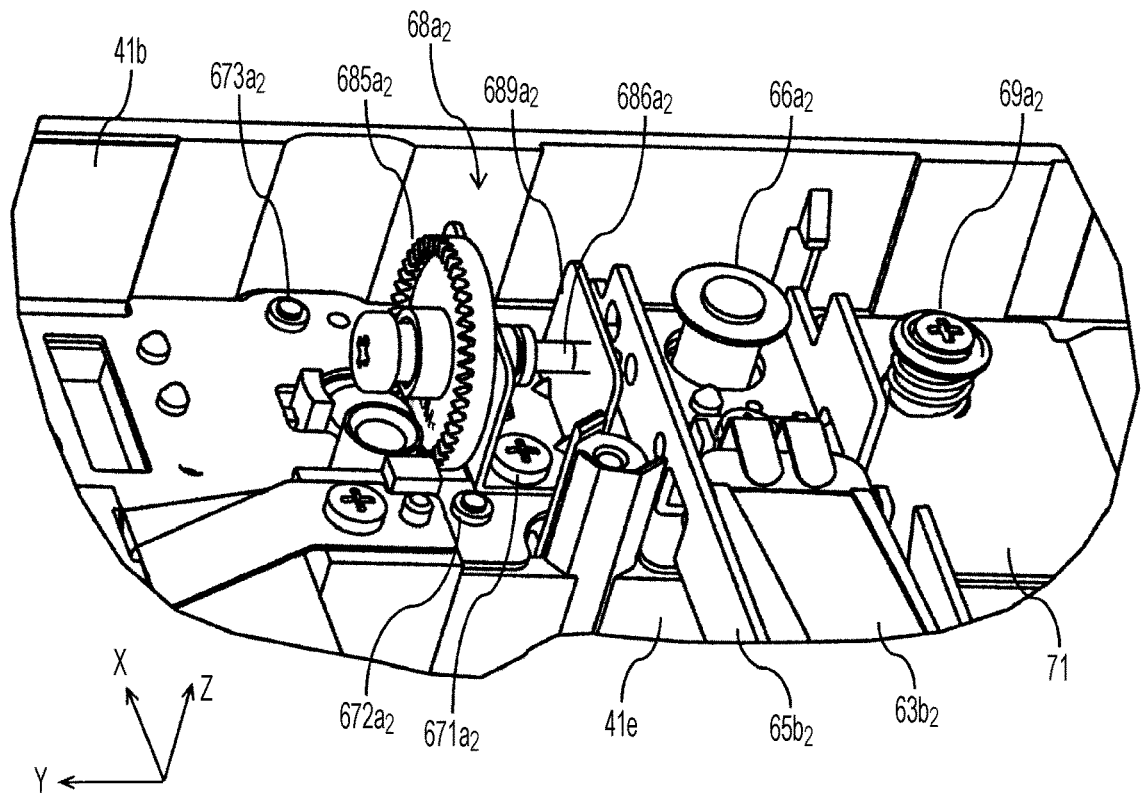
FIG. 38(A) is a partial enlarged view of a lens adjustment member depicted in FIG. 33.
Figure 38B:
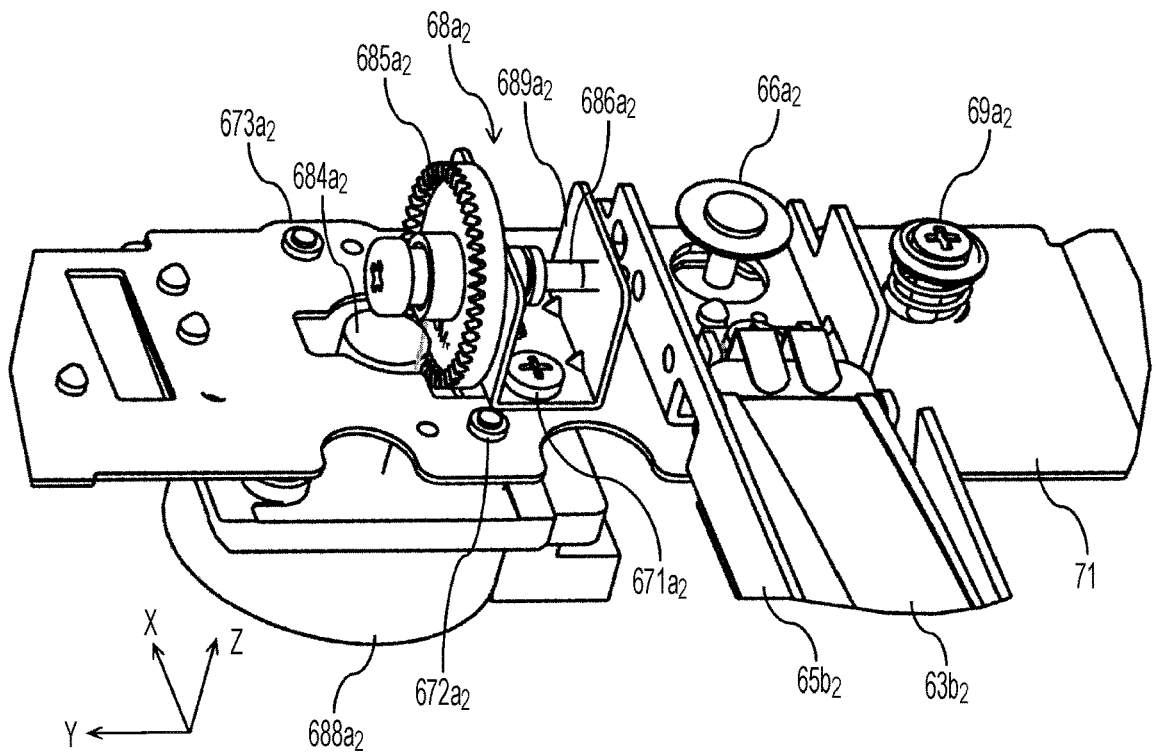
FIG. 38(B) is a partial enlarged view of the lens adjustment member depicted in FIG. 36.

FIG. 36 is a perspective view of the Fθ second lens supporting unit 71 depicted in FIG. 32. Furthermore, FIG. 37 is a perspective view of the Fθ second lens supporting unit 71 depicted in FIG. 32. Furthermore, FIG. 38(A) is a partial enlarged view of the lens adjustment member $68a_2$ depicted in FIG. 33. Furthermore, FIG. 38(B) is a partial enlarged view of the lens adjustment member $68a_2$ depicted in FIG. 36.

Furthermore, the lower surface of the Fθ second lens holding unit $65b_1$ makes contact with the upper surfaces of the protrusions $411e_1$ and $412e_1$, which are not depicted, at positions higher than the upper surface of the Fθ second lens supporting unit 71, thereby defining the height of the Fθ second lens holding unit $65b_1$, in other words, the Fθ second lens $63b_1$.

The same is also true for the Fθ second lens holding units $65b_2$ to $65b_4$.

However, the Fθ second lens supporting unit 71 supports each of the Fθ second lens holding units $65b_1$ to $65b_4$, in other words, the Fθ second lenses $63b_1$ to $63b_4$, with the lens adjustment members $68a_1$ to $68a_4$ interposed.

It should be noted that the Fθ second lens supporting unit 71 may support the Fθ second lenses $63_b$ to $63b_4$ by making direct contact with the Fθ second lens holding units $65b_1$ to $65b_4$.

In FIG. 37, the hole sections $721a_1$ and $722a_1$ of the Fθ second lens supporting unit 72 are relief holes to respectively allow for the protrusions $411d_1$ and $412d_1$ provided on the level difference $41d$ of the casing 41.

Furthermore, the hole section $723a_1$ is a hole section for positioning a protrusion, which is not depicted, provided on the lower surface of the Fθ second lens holding unit $65b_1$. Due to this positioning, the Fθ second lens holding unit $65b_1$ is supported by the Fθ second lens supporting unit 72.

The same is also true for the hole sections $721a_2$ to $721a_4$ and $722a_2$ to $722a_4$ and the hole sections $723a_2$ to $723a_4$ of the Fθ second lens supporting unit 72.

Furthermore, the lower surface of the Fθ second lens holding unit $65b_2$ makes contact with the upper surfaces of the protrusions $411d_2$ and $412d_2$, which are not depicted, at positions higher than the upper surface of the Fθ second lens supporting unit 72, thereby defining the height of the Fθ second lens holding unit $65b_2$, in other words, the Fθ second lens $63b_2$.

It should be noted that the remaining structure of the Fθ second lens supporting units 71 and 72 is similar to the Fθ second lens supporting units 71 and 72 according to embodiment 7 and are therefore not described.

As depicted in FIGS. 34 to 37 and FIG. 38(B), the lens adjustment members $68a_1$ to $68a_4$ have driving units (motors) $688a_1$ to $688a_4$ outside the casing 41, which is different from the optical scanning device 11 according to embodiment 7 that is manually powered.

As depicted in FIG. 38(B), when a first gear $684a_2$ is rotated clockwise in the Z direction by the driving unit $688a_2$, a second gear $685a_2$ that is engaged with the first gear $684a_2$ rotates clockwise in the −Y direction.

At such time, a second shaft section $686a_2$ advances in the −Y direction and presses the side section of the Fθ second lens holding unit $65b_2$, and the Fθ second lens holding unit $65b_2$ is thereby inclined in the Y direction.

As depicted in FIG. 38(B), the lens adjustment member $68a_2$ is provided on the Fθ second lens supporting unit 71 including also the driving unit $688a_2$, and is not provided on the casing 41.

The same is also true for the lens adjustment members $68a_1$, $68a_3$, and $68a_4$.

In this way, the lens adjustment members $68a_1$ to $68a_4$ are provided on the Fθ second lens supporting unit 71. Specifically, as in FIGS. 38(A) and (B), the driving unit (motor) $688a_2$ and a shaft section holding plate $689a_2$ are fixed to the Fθ second lens supporting unit 72 by a screw $671a_2$.

The linking plate $689a_2$ is in an adjusted position, and the second shaft section $686a_2$ of the linking plate $689a_2$ constantly abuts the side section of the Fθ second lens holding unit $65b_2$. In other words, the Fθ second lens holding unit $65b_2$ is constantly pressed by the second shaft section $686a_2$ of the linking plate $689a_2$ due to an urging member (spring) such as the spring $683a_2$ of FIG. 16, for example, which is not depicted.

After the adjustment of the Fθ second lenses $63b_1$ to $63b_4$ by the lens adjustment members $68a_1$ to $68a_4$, even if the temperature of the optical scanning device 11 has risen, the positions of the lens adjustment members $68a_1$ to $68a_4$ do not change, and therefore naturally the positions of the Fθ second lenses $63b_1$ to $63b_4$ also do not change.

In addition, the distance between the first gears $684a_1$ and $684a_2$ of a driving unit (motor) also do not change, and therefore the backlash between the first gears $684a_1$ and $684a_2$ does not become large.

Consequently, compared to when provided directly on the casing 41, it becomes unlikely that thermal expansion will have an effect.

Preferred aspects of this invention also include combinations of any of the aforementioned plurality of aspects.

Other than the aforementioned embodiments, various modified examples are possible in relation to this invention.

Those modified examples shall not be construed as not belonging to the scope of this invention. All modifications within the meaning and the range of equivalency of the claims shall be included in this invention.

REFERENCE SIGNS LIST 11, 11c Optical scanning device
13, 13Y, 13M, 13C, 13K photoreceptor drum
41 casing
41b, 41c side plate
41d, 41e level difference
42 polygon mirror
42a reflective surface
43 polygon motor
44a first semiconductor laser
44b second semiconductor laser
44c third semiconductor laser
45d fourth semiconductor laser
$411d_1$, $412d_1$, $411d_2$, $412d_2$, $411d_3$, $412d_3$, $411d_4$, $412d_4$, $411e_1$, $412e_1$, $411e_2$, $412e_2$, $411e_3$, $412e_3$, $411e_4$, $412e_4$ protrusion
$413d_1$, $413d_2$, $413d_3$, $413d_4$ recessed section
53a, 53b, 53c, 53d collimator lens
54a, 54b, 54c, 54d aperture
55a, 55b, 55c, 55d mirror
56 cylindrical lens
63a Fθ first lens
$63b_1$ to $63b_4$ Fθ second lens
$63c_1$ to $63c_4$, $63d_1$ to $63d_4$ plate spring
$64a_1$, $64a_2$, $64b_1$, $64b_2$, $64c_1$, $64c_2$, 64d reflective mirror
$65b_1$, $65b_2$, $65b_3$, $65b_4$ Fθ second lens holding unit 67a, $67a_4$, $67b$, $67b_4$ screw
$66a_2$ to $66a_4$, $66b_2$ to $66b_4$ boss
$68a_1$, $68a_2$, $68a_3$, $68a_4$ lens adjustment member
$69a$, $69a_2$ to $69a_4$, $69b$, $69b_2$ to $69b_5$ spring screw
$69c$ hook $651b_1$, $652b_1$, $651b_2$, $652b_2$, $651b_3$, $652b_3$, $651b_4$, $652b_4$ recessed section
$653b_1$, $653b_2$, $653b_3$, $653b_4$ projecting section
$661a_1$ to $661a_4$, $661b_1$ to $661b_4$ hole section
$671a_1$, $671a_2$, $672a_2$, $673a_2$ screw
$680a_1$, $680a_2$, $680a_4$ cover
$681a_1$, $681a_2$, $681a_4$ shaft section
$682a_1$, $682a_2$, $682a_4$ cam
$683a_1$, $683a_2$, $683a_4$ spring
$684a_1$ to $684a_4$ first gear
$685a_1$ to $685a_4$ second gear
$686a_1$ to $686a_4$ second shaft section
$687a_1$, $687a_2$, $687a_4$ linking member
$688a_1$ to $688a_4$ driving unit
$689a_1$, $689a_2$ shaft section holding plate
691b, 691c protruding section
692b kick spring
692c plate section
693b washer
694b screw $6801a$, $6803a_1$, $6804a_1$, $6801a_2$, $6803a_2$, $6804a_2$, $6801a_3$, $6803a_3$, $6804a_3$, $6801a_4$, $6803a_4$, $6804a_4$ hole section
$6802a$, $6802a_2$, $6802a_3$, $6802a_4$ notch section
71, 72 Fθ second lens supporting unit
71a, 71b, 72a, 72b end section
$71a_1$ to $71a_4$, $72a_1$ to $72a_5$ hole section
$71b_1$ to $71b_4$, $72b_1$ to $72b_4$ notch section
$71c_1$ elongated hole section
$71c_2$ to $71c_4$, $71e_2$ to $71e_4$ screw hole
$71d_2$ to $71d_4$, $71f_2$ to $71f_4$, $72b_5$, $72c_2$ to $72c_4$ protrusion
$711a_1$, $712a_1$, $711a_2$, $712a_2$, $711a_3$, $712a_3$, $711a_4$, $712a_4$ hole section
$722a0$, $721a0$, $721a_1$, $722a_1$, $723a_1$, $721a_2$, $722a_2$, $723a_2$, $721a_3$, $722a_3$, $723a_3$, $721a_4$, $722a_4$, $723a_4$ hole section
100 image forming device
BL baseline
C arrow
L1, L2, L3, L4 light beam
Pa, Pb, Pc, Pd image forming station
R1 sheet conveyance path
TE elongation due to thermal expansion
X main scanning direction
Y sub-scanning direction
Z height direction

The invention claimed is:

1. An optical scanning device provided with a casing, a plurality of light sources, a deflection scanning unit that deflects and scans light beams from the plurality of light sources onto a plurality of bodies to be scanned, and a plurality of optical units arranged between the deflection scanning unit and the bodies to be scanned,
wherein an optical unit supporting member that supports the optical units is provided,
the optical unit supporting member supports the plurality of optical units arranged at predetermined intervals,
a thermal expansion coefficient of the optical unit supporting member is lower than a thermal expansion coefficient of the casing,
the optical units are composed of a lens and a lens holding member that holds the lens,
the optical unit supporting member has an insertion hole into which a protrusion provided on the casing is inserted, and
when one end in the first direction in which the light beams scan the bodies to be scanned, of the optical units is arranged on the optical unit supporting member, a lower surface of the lens holding member makes contact with a tip end of the protrusion inserted into the insertion hole.

2. The optical scanning device according to claim 1,
wherein the optical unit supporting member supports the plurality of optical units at both end sections thereof in a first direction in which the light beams scan the bodies to be scanned.

3. The optical scanning device according to claim 1,
wherein the casing displaces relative to the optical unit supporting member.

4. The optical scanning device according to claim 1, further provided with:
a fixing unit that fixes a predetermined first portion of the optical unit supporting member to the casing; and
an engaging unit that engages a predetermined second portion of the optical unit supporting member to the casing in such a way that displacement is possible relative to a second direction in which the plurality of optical units are arranged.

5. The optical scanning device according to claim 4,
wherein the fixing unit is provided nearer to the plurality of light sources than the engaging unit.

6. The optical scanning device according to claim 4,
wherein the fixing unit is configured by inserting a first screw into a first screw hole provided in the casing, via a first insertion section provided in the first portion of the optical unit supporting member.

7. The optical scanning device according to claim 4,
wherein the engaging unit is configured by inserting a second screw into a second screw hole provided in the casing, via a second insertion section provided in the second portion of the optical unit supporting member, and
the second screw has a spring that presses the second portion of the optical unit supporting member when the second screw is inserted into the second screw hole via the second insertion section.

8. The optical scanning device according to claim 4,
wherein the engaging unit has a hook that engages with the casing, via the second insertion section provided in the second portion of the optical unit supporting member.

9. The optical scanning device according to claim 7,
wherein the second insertion section has an elongated hole or a notch that extends in the second direction.

10. The optical scanning device according to claim 1,
wherein the optical unit supporting member has mounted thereon an adjustment unit that adjusts a position in the second direction in which the plurality of optical units are arranged, of one end in the first direction in which the light beams scan the bodies to be scanned, of the optical units when the one end of the optical units is arranged on the optical unit supporting member.

11. The optical scanning device according to claim 10,
wherein a driving unit that drives the adjustment unit is mounted on the optical unit supporting member.

12. The optical scanning device according to claim 1,
wherein the optical unit supporting member supports the optical units for black, cyan, and magenta, or the optical units for black, cyan, magenta, and yellow, from among the plurality of optical units.

13. The optical scanning device according to claim 1,
wherein the optical unit supporting member is composed of a metal material, and the casing is composed of a resin material.

14. An image forming device provided with the optical scanning device according to claim 1.

15. An optical scanning device provided with a casing, a plurality of light sources, a deflection scanning unit that deflects and scans light beams from the plurality of light sources onto a plurality of bodies to be scanned, and a plurality of optical units arranged between the deflection scanning unit and the bodies to be scanned,
wherein an optical unit supporting member that supports the optical units is provided,
the optical unit supporting member supports the plurality of optical units arranged at predetermined intervals,
a thermal expansion coefficient of the optical unit supporting member is lower than a thermal expansion coefficient of the casing, and
the optical unit supporting member has mounted thereon an adjustment unit that adjusts a position in the second direction in which the plurality of optical units are arranged, of one end in the first direction in which the light beams scan the bodies to be scanned, of the optical units when the one end of the optical units is arranged on the optical unit supporting member.

16. The optical scanning device according to claim 15,
wherein the optical unit supporting member supports the plurality of optical units at both end sections thereof in a first direction in which the light beams scan the bodies to be scanned.

17. The optical scanning device according to claim 15,
wherein the casing displaces relative to the optical unit supporting member.

18. The optical scanning device according to claim 15,
wherein a driving unit that drives the adjustment unit is mounted on the optical unit supporting member.

19. An image forming device provided with the optical scanning device according to claim 15.

* * * * *